(12) United States Patent
Tsutsumi

(10) Patent No.: US 9,521,320 B2
(45) Date of Patent: Dec. 13, 2016

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Shohei Tsutsumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/984,071

(22) Filed: Dec. 30, 2015

(65) Prior Publication Data
US 2016/0134807 A1  May 12, 2016

Related U.S. Application Data

(62) Division of application No. 14/195,951, filed on Mar. 4, 2014, now Pat. No. 9,270,902.

(30) Foreign Application Priority Data

Mar. 5, 2013 (JP) .................................. 2013-043264
Jun. 26, 2013 (JP) .................................. 2013-134111

(51) Int. Cl.
*H04N 13/00* (2006.01)
*G06K 9/00* (2006.01)
(Continued)

(52) U.S. Cl.
CPC .......... *H04N 5/23232* (2013.01); *H04N 5/142* (2013.01); *H04N 5/23212* (2013.01);
(Continued)

(58) Field of Classification Search
CPC .............................................. H04N 2013/0081
(Continued)

(56) References Cited

U.S. PATENT DOCUMENTS 9,253,390 B2   2/2016  Tsutsumi
2007/0025074 A1   2/2007  Sone
(Continued)

FOREIGN PATENT DOCUMENTS

CN   102025914 A   4/2011
CN   102172031 A   8/2011
(Continued)

OTHER PUBLICATIONS

Ren Ng, "Fourier Slice Photography", 2005 ACM Trans. Graph. 24, p. 735 to 744.
(Continued)

*Primary Examiner* — Joel Fosselman
(74) *Attorney, Agent, or Firm* — Carter, DeLuca, Farrell & Schmidt, LLP

(57) ABSTRACT

Conventionally, on a subject in which range, refocus can be performed at the time of image capturing or at the time of editing an image is not specified clearly, and therefore, it is difficult for a user to capture an image or to edit an image in a manner the user intends. An image processing apparatus has an acquisition unit configured to acquire an image including a plurality of subject areas and distance information corresponding to the plurality of subject areas and a generation unit configured to generate a shifted image in which positions of the plurality of subject areas are shifted in the image based on the distance information.

15 Claims, 37 Drawing Sheets

(51) Int. Cl.
*H04N 5/232* (2006.01)
*H04N 5/14* (2006.01)
*H04N 5/262* (2006.01)
*H04N 5/265* (2006.01)
*H04N 5/272* (2006.01)
*G01S 17/08* (2006.01)

(52) U.S. Cl.
CPC ..... *H04N 5/23216* (2013.01); *H04N 5/23293* (2013.01); *H04N 5/265* (2013.01); *H04N 5/2624* (2013.01); *H04N 5/2628* (2013.01); *H04N 5/272* (2013.01); *G01S 17/08* (2013.01); *H04N 2013/0081* (2013.01)

(58) Field of Classification Search
USPC ...................................... 348/345, 239, 222.1
See application file for complete search history.

(56) References Cited

U.S. PATENT DOCUMENTS

| | | | | |
|---|---|---|---|---|
| 2008/0089557 | A1* | 4/2008 | Iwaki | G01C 3/06 382/106 |
| 2008/0131019 | A1 | 6/2008 | Ng | |
| 2013/0194385 | A1* | 8/2013 | Noguchi | H04N 13/0022 348/43 |
| 2014/0198230 | A1 | 7/2014 | Tsutsumi | |

FOREIGN PATENT DOCUMENTS

| | | |
|---|---|---|
| CN | 102422630 A | 4/2012 |
| CN | 102472619 A | 5/2012 |
| JP | H09186931 | 7/1997 |
| JP | 2001169308 A | 6/2001 |
| JP | 2008-515110 A | 5/2008 |
| JP | 2009124213 A | 6/2009 |
| JP | 2010177741 A | 8/2010 |
| JP | 201139457 A | 2/2011 |
| WO | 2008050904 A | 5/2008 |
| WO | 2012133286 A1 | 10/2012 |

OTHER PUBLICATIONS

Chinese Office Action issued in connection with corresponding Chinese Application No. 201410078684.7, dated Sep. 30, 2016 (17 pages including English translation).

\* cited by examiner

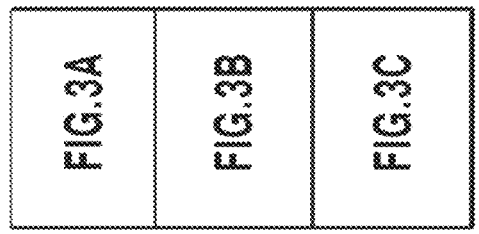
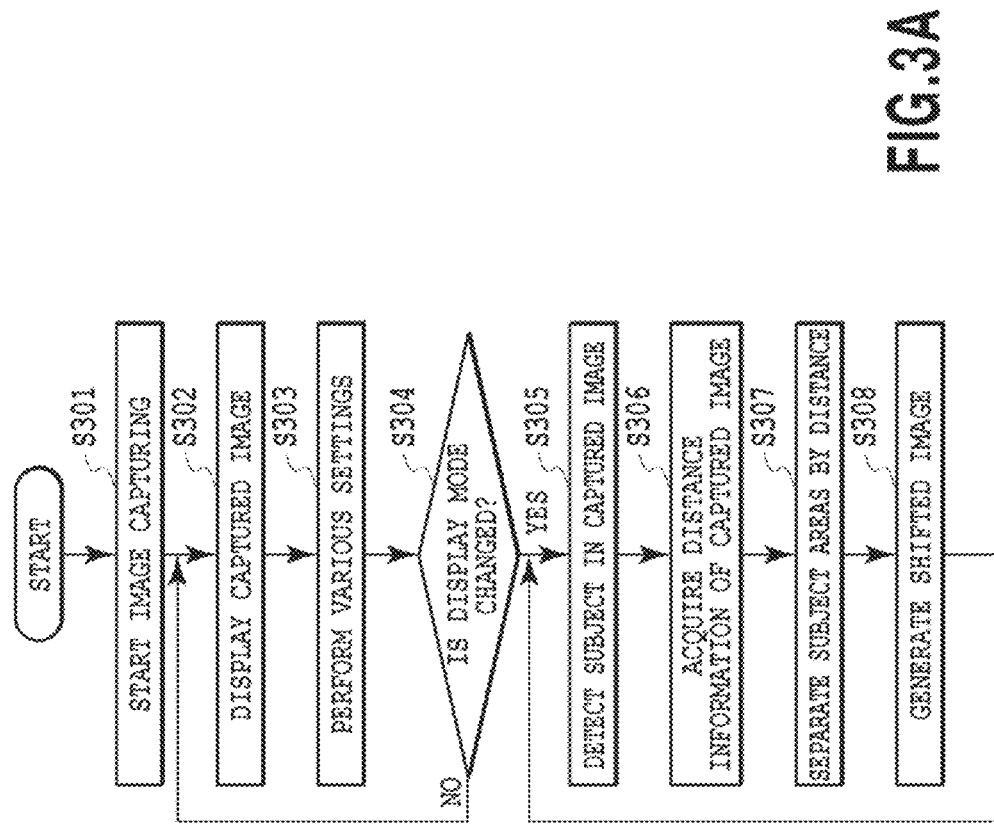

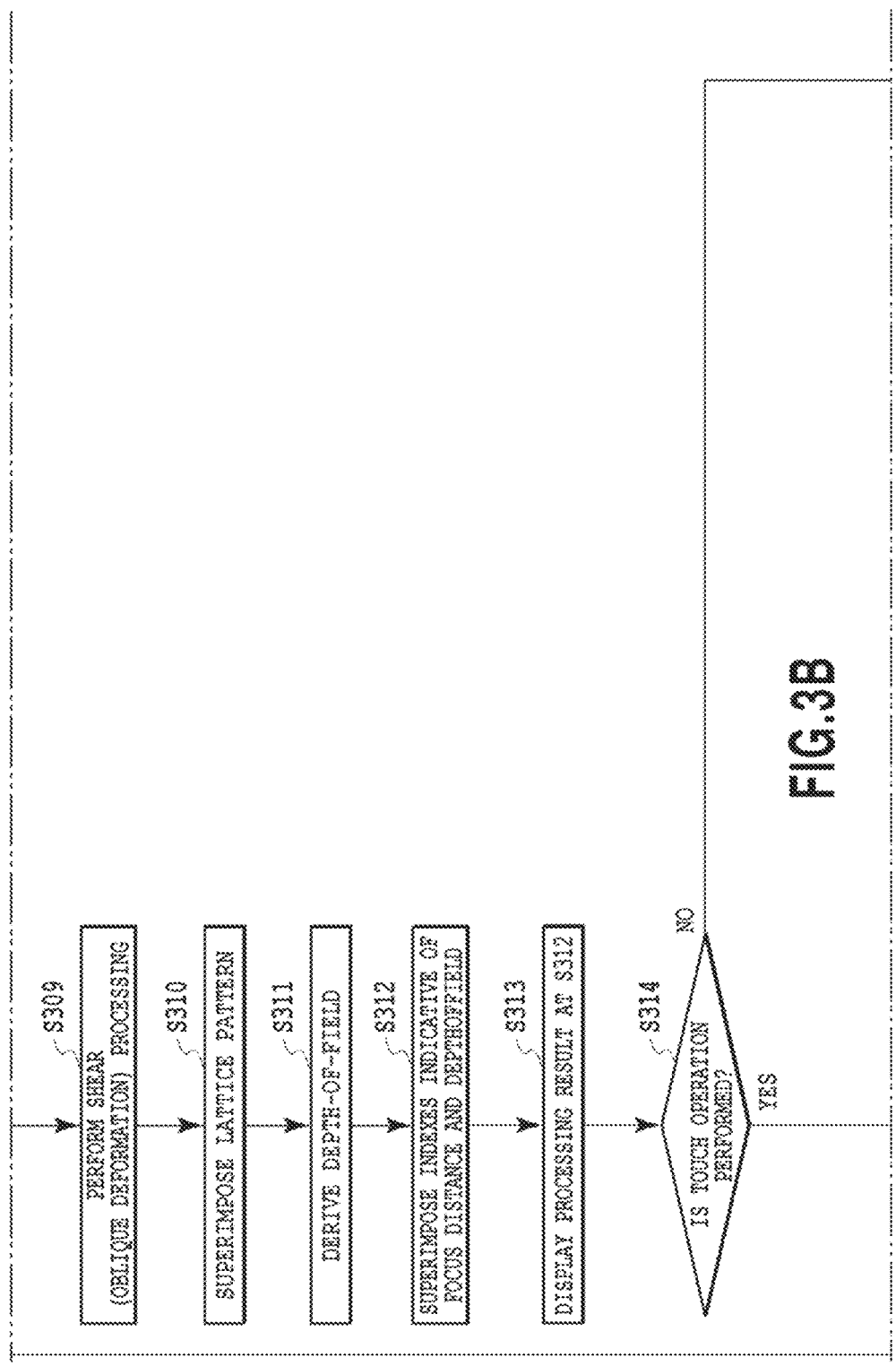

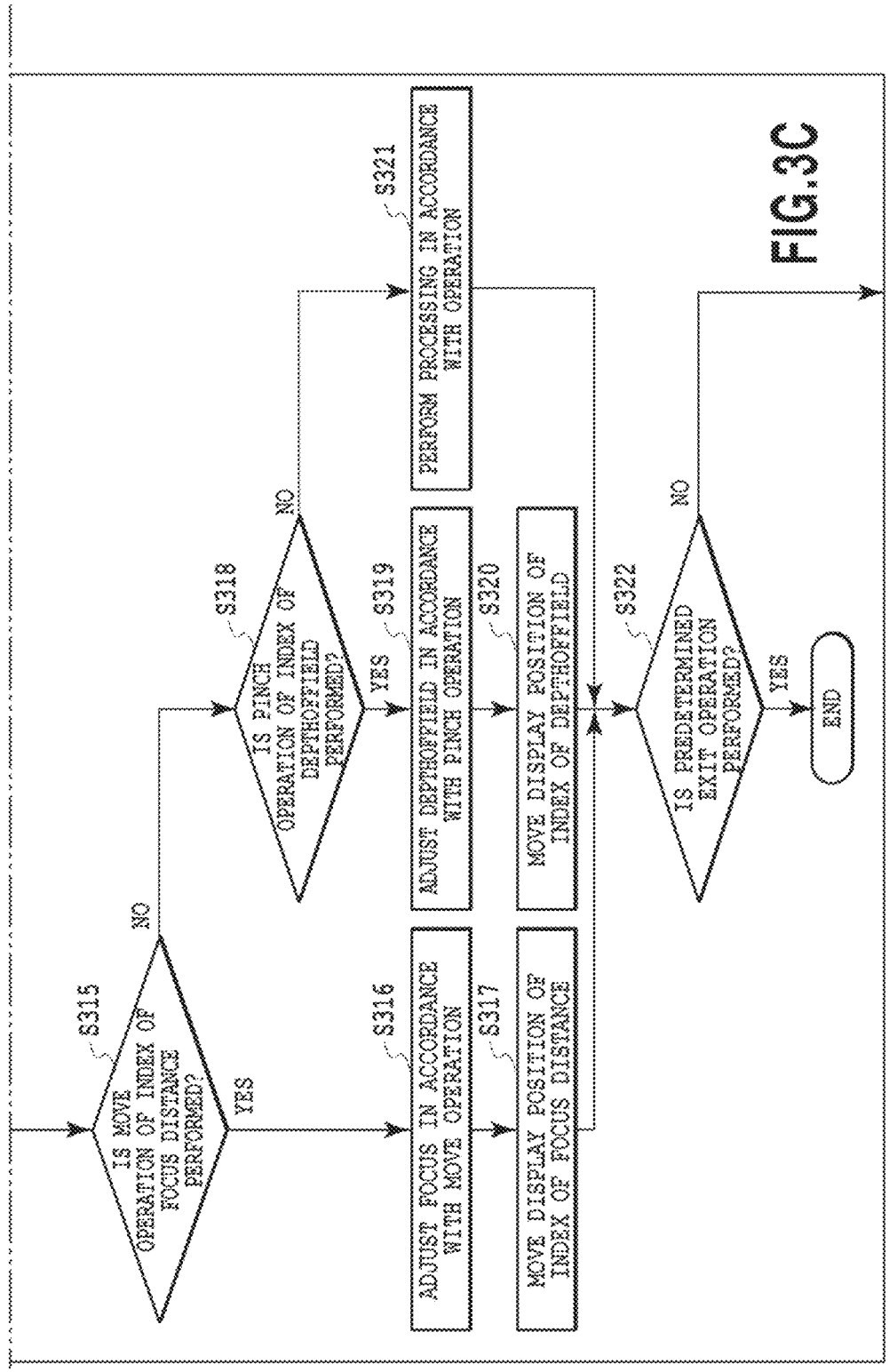

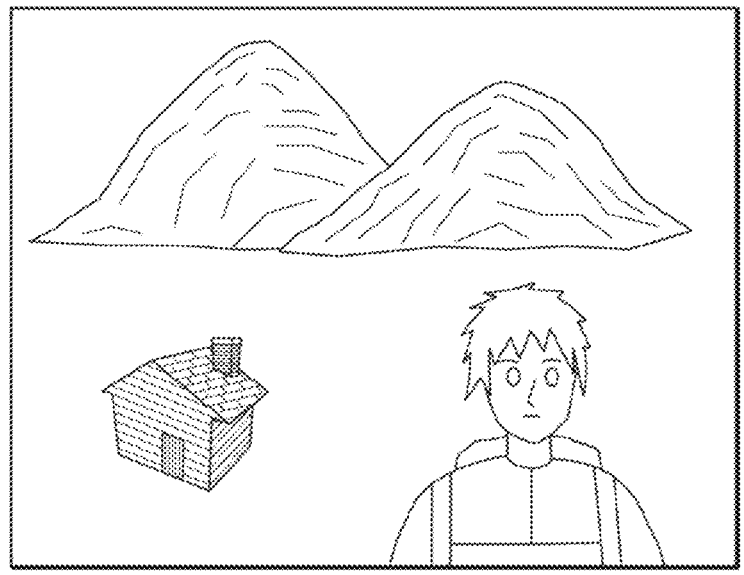
SINGLE-VIEWPOINT IMAGE
FIG.24A
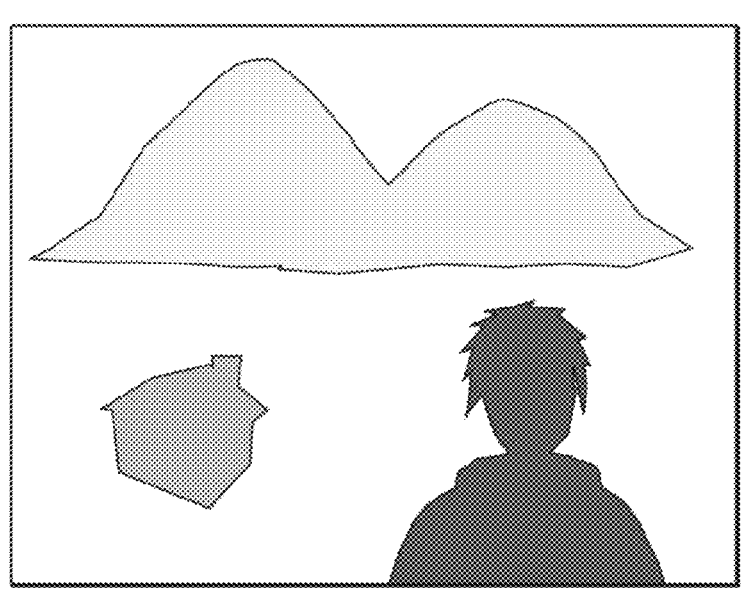 
DISTANCE MAP
FIG.24B

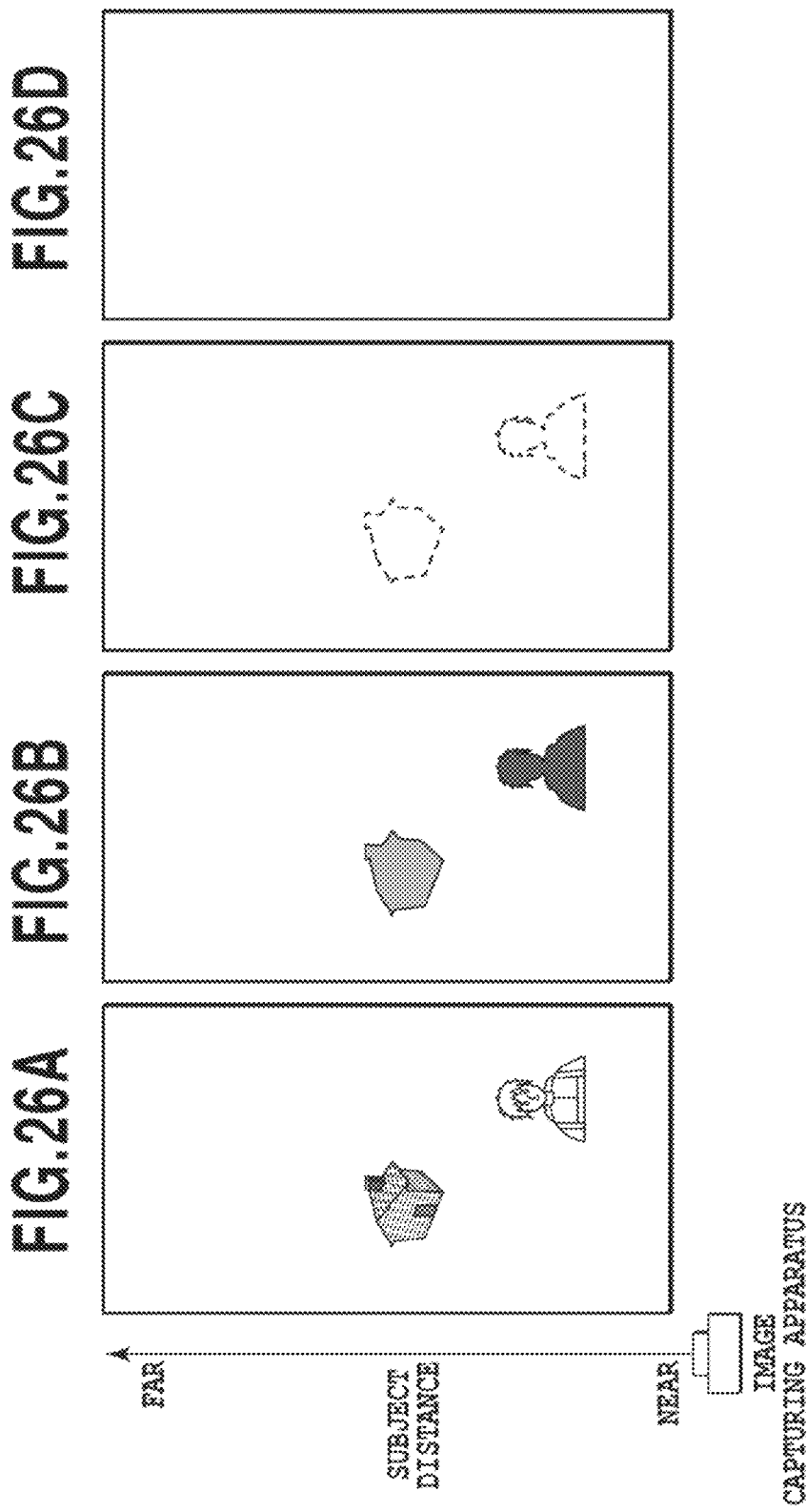

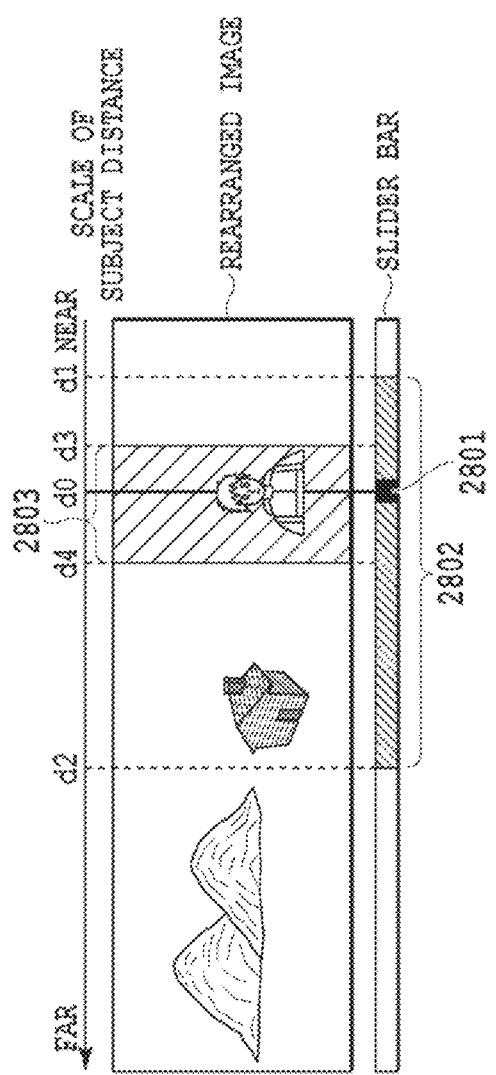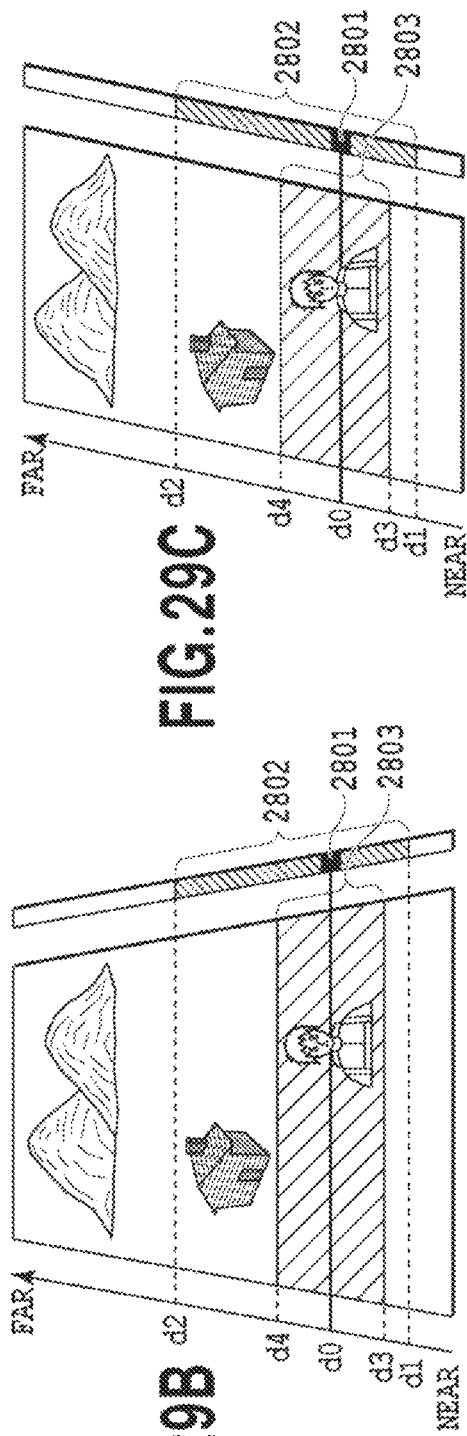
FIG.29A
FIG.29B
FIG.29C

IMAGE PROCESSING APPARATUS, IMAGE CAPTURING APPARATUS, IMAGE PROCESSING METHOD, AND STORAGE MEDIUM

CROSS REFERENCE TO RELATED APPLICATIONS

This application is a divisional of U.S. patent application Ser. No. 14/195,951 filed on Mar. 4, 2014, which claims the benefit of and priority to Japanese Patent Application Nos. 2013-134111, filed Jun. 26, 2013, and 2013-043264, filed Mar. 5, 2013, each of which are hereby incorporated by reference herein in their entirety.

BACKGROUND OF THE INVENTION

1. Field of the Invention

The present invention relates to an image processing apparatus, an image capturing apparatus, an image processing method, and a storage medium for obtaining information on focus control of a subject.

2. Description of the Related Art

As an image capturing apparatus, such as a digital camera, there is known an apparatus that makes focus adjustment of a subject included in a captured image by a user specifying the subject by a touch panel operation etc. (for example, Japanese Patent Laid-Open No. 2011-39457).

Further, the technique is also proposed, which makes it possible for a user to easily grasp an object in focus the image of which is to be captured (subject) by displaying a map image for indicating a depth position representing a position of the object the image of which is to be captured in the depth direction and a focus position representing the position of focus (for example, Japanese Patent Laid-Open No. 2010-177741).

In recent years, the light field photography technique is also known, which acquires information of the orientation and intensity of a light ray (light field data) and makes adjustment of the focus position (refocus) and adjustment of the depth of field by the later image processing (for example, Japanese Patent Laid-Open No. 2008-515110).

By using this technique, there is an advantage that a failure in focus adjustment at the time of image capturing can be made up by image processing because it is possible to make focus adjustment after image capturing. Further, there is also an advantage that it is possible to obtain a plurality of images in which arbitrary subjects are brought into focus in an image from one captured image by changing the image processing method, and therefore, it is possible to reduce the number of times of image capturing.

In light field photography, from data of images captured from a plurality of viewpoints, the direction and intensity of a light ray that passes through each position (light field) in a plurality of positions in the space are calculated. Then, by using the information of the obtained light field, an image on the assumption that light passes through a virtual optical system and forms the image on a virtual sensor is calculated. By appropriately setting such a virtual optical system and a virtual sensor, refocus described previously is enabled. As an image capturing apparatus for acquiring the light field, a plenoptic camera (for example, Japanese Patent Laid-Open No. 2009-124213) in which a microlens array is arranged behind a main lens and a camera array in which compact cameras are arranged side by side are known. It is possible for both to obtain data of subject images from a plurality of viewpoints captured from different directions by one-time image capturing. In other words, it is possible to represent the light field photography as calculation of an image to be acquired by a virtual sensor under virtual optical conditions from data of images from a plurality of viewpoints. In the following, the processing to calculate an image acquired by the virtual sensor is referred to as "refocus processing". As refocus processing, there is known a method in which acquired data of images from a plurality of viewpoints is subjected to projective transformation onto a virtual sensor, and added and averaged (for example, WO2008050904).

As a method for displaying an image having been subjected to refocus processing (hereinafter, a refocus image) while changing the focus position, mention is made of, for example, the method disclosed in U.S. Pat. No. 8,559,705. In the method disclosed in U.S. Pat. No. 8,559,705, the user interface (UI) to adjust the focus position is prepared on the screen on which a refocus image is displayed and the focus position is changed via the UI. Further, in U.S. Pat. No. 8,559,705, the method is disclosed, which displays a refocus image whose focus position is adjusted to a subject which a user desires to put to a focus position and has given instructions through a screen on which the refocus image is displayed.

In the display of captured image data or light field data, an object to be brought into focus exists on a plane at a fixed distance from the position of image capturing. However, in the case where focusing is performed by specifying a specific subject, it is not possible for a user to grasp which subject other than the specific subject is brought into focus.

Further, by the technique disclosed in Japanese Patent Laid-Open No. 2010-177741, it is possible to grasp which subject is brought into focus by the map image in which marks indicating objects the image of which is to be captured are arranged in order in the depth direction, however, the map image is quite different from the captured image (actual image), and therefore, it is difficult to grasp the subject intuitively.

That is, by the conventional methods disclosed in the above-described Patent Literatures etc., on a subject in which range, refocus can be performed is not specified clearly at the time of photographing or at the time of editing an image, and therefore, there is such a problem that it is difficult for a user to perform image capturing or image edition in a manner the user intends.

SUMMARY OF THE INVENTION

The image processing apparatus according to the present invention has an acquisition unit configured to acquire an image including a plurality of subject areas and distance information corresponding to the plurality of subject areas, and a generation unit configured to generate a shifted image in which positions of the plurality of subject areas are shifted in the image.

Alternatively, the image processing apparatus has an acquisition unit configured to acquire an image including a plurality of subject areas and distance information corresponding to the plurality of subject areas, a first generation unit configured to generate a rearranged image in which the plurality of subject areas is rearranged in the image based on the distance information, and a second generation unit configured to generate an image in which information on a focus state is reflected in the rearranged image at the time of performing image combination processing to change the focus state of the image including the plurality of subject areas.

According to the present invention, it is possible for a user to intuitively grasp the focus state of a subject at the time of photographing or at the time of editing an image.

Further features of the present invention will become apparent from the following description of exemplary embodiments (with reference to the attached drawings).

BRIEF DESCRIPTION OF THE DRAWINGS

FIG. 3 is a diagram showing a relationship between FIGS. 3A to 3C, and FIGS. 3A to 3C are flowcharts showing a flow of image processing performed in the digital camera according to a first embodiment;

FIG. 24A is a diagram showing an example of a single-viewpoint image and FIG. 24B is a diagram showing a distance map as distance information derived from the single-viewpoint image;

FIGS. 26A to 26D are each a diagram showing an example of a rearranged image in the case where the scene of the single-viewpoint image is looked down upon from directly above;

FIGS. 29A to 29C are each a diagram showing a variation of the focus information display image;

DESCRIPTION OF THE EMBODIMENTS

Hereinafter, with reference to drawings, embodiments of the present invention are explained in detail.

First Embodiment

Here, an aspect in which an image processing apparatus according to the present invention is applied to a digital camera is explained as a first embodiment.

Figure 1:
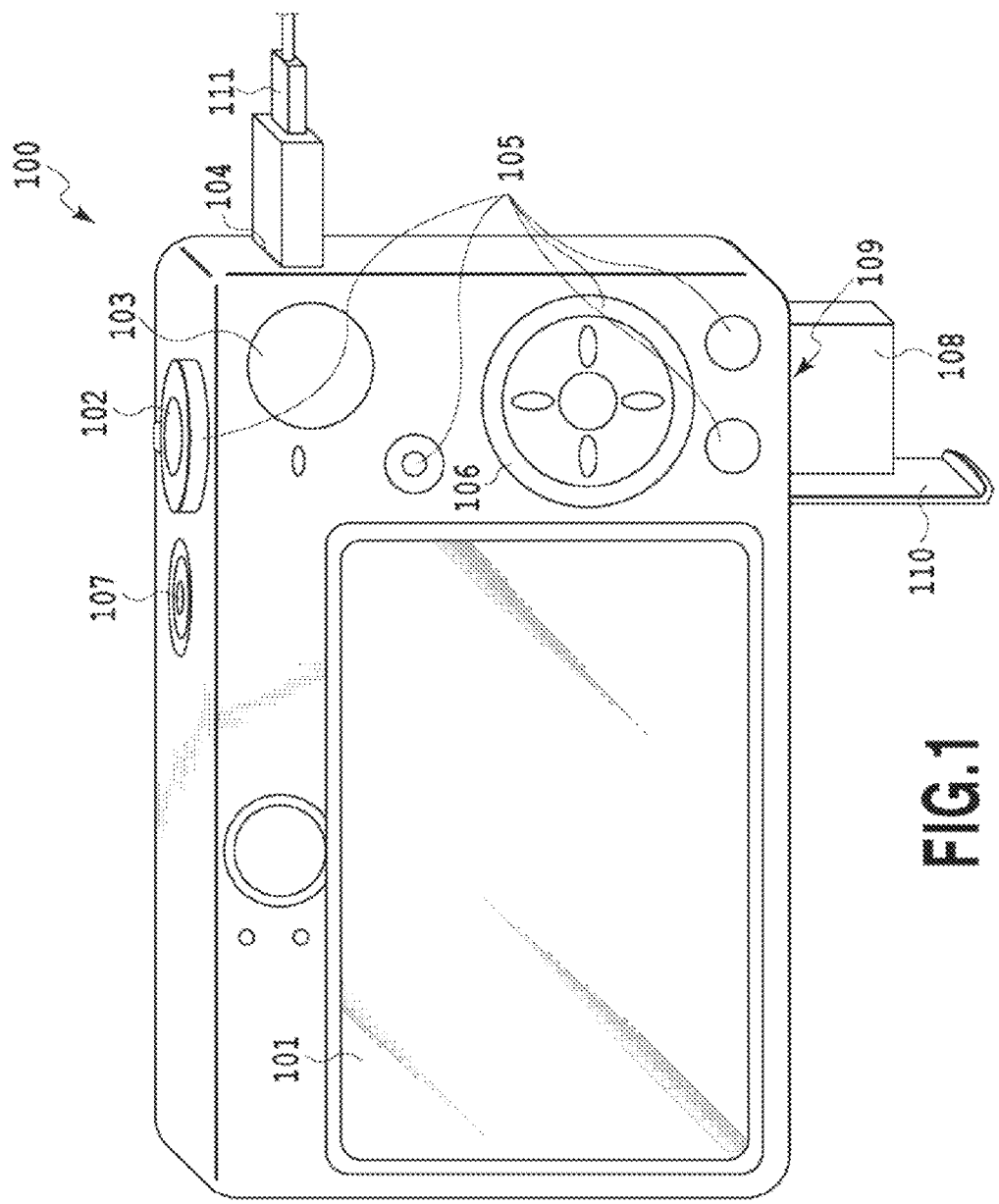
FIG. 1 is a diagram showing an example of an external appearance of a digital camera.

FIG. 1 is a diagram showing an example of an external appearance of a digital camera.

In a display unit 101, for example, a liquid crystal display is used and images and various kinds of information are displayed. The display unit 101 has a touch screen function and is capable of detecting a touch on the display unit 101. For example, a touch panel is configured so that the transmittance of light does not affect the display of the display unit 101 and the touch panel is attached to an upper layer of the display surface of the display unit 101. Then, the input coordinates on the touch panel and the display coordinates on the display unit 101 are associated with each other. Due to this, a GUI with which it seems possible for a user to directly operate a screen displayed on the display unit 101 can be configured.

A shutter button 102 is an operation unit for giving instructions to perform image capturing.

A mode dial 103 is an operation unit for switching various kinds of modes.

A connector 104 is a connector between a connection cable 111 and a digital camera 100.

An operation unit 105 includes various kinds of switches, buttons, etc., to receive various kinds of operations from a user.

A controller wheel 106 is an operating member included in the operation unit 105 and capable of being operated to rotate.

A power source switch 107 switches between on and off of a power source of the digital camera 100.

A storage medium 108 is an information storage medium, such as a memory card and a hard disc, for storing captured image data and light field data.

A storage medium slot 109 is a slot for housing the storage medium 108. It is made possible for the storage medium 108 housed in the storage medium slot 109 to communicate with the digital camera 100.

A lid 110 is a lid of the storage medium slot 109.

Figure 2:
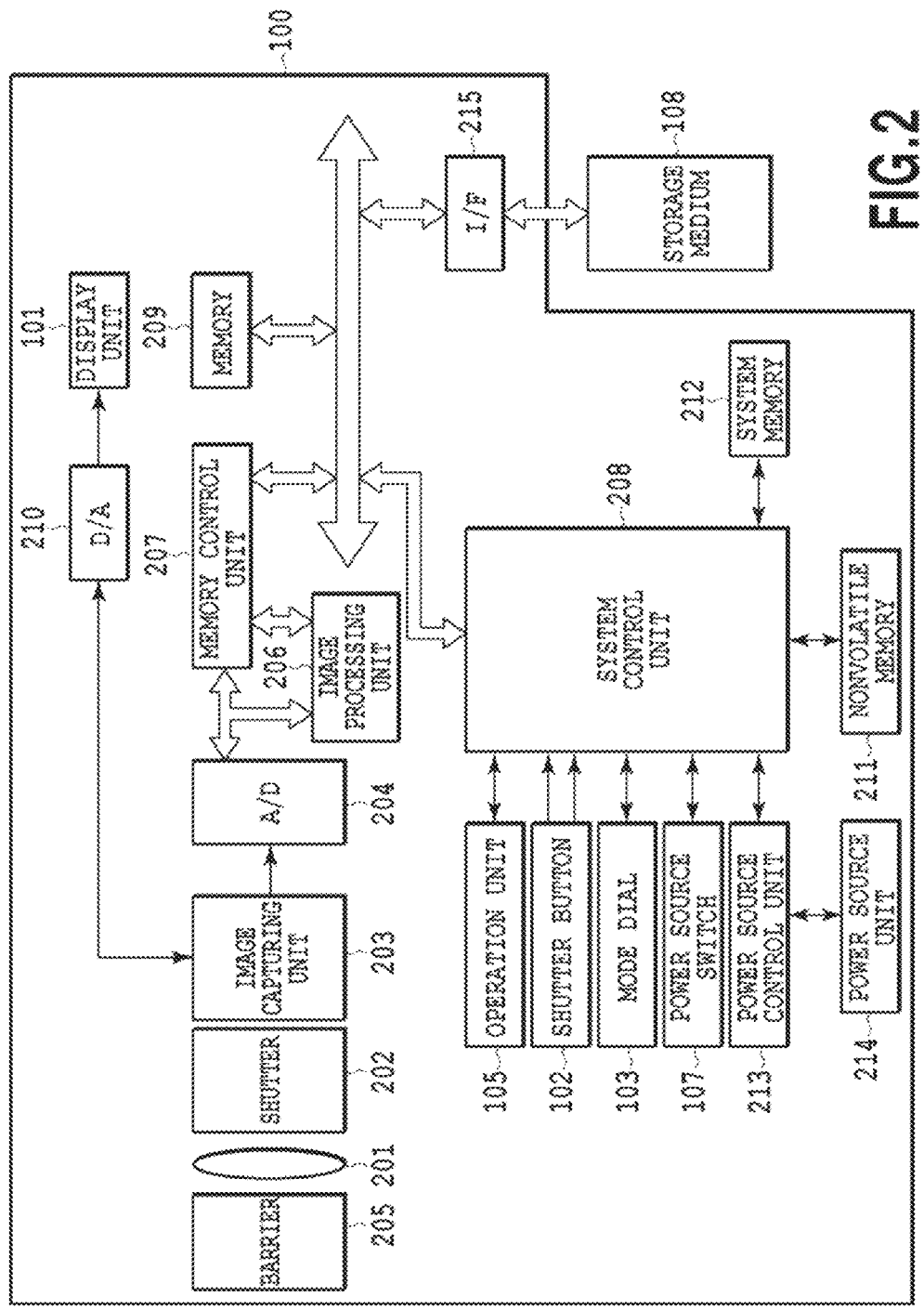
FIG. 2 is a block diagram showing an internal configuration of the digital camera.

FIG. 2 is a block diagram showing an internal configuration of the digital camera 100.

An image capturing lens 201 includes a focus lens.

A shutter includes an aperture function and controls exposure in an interlocking manner with the shutter button 102.

An image capturing unit 203 includes a CCD that converts an optical image into an electric signal, a CMOS element, etc.

An A/D converter 204 converts an analog signal output from the image capturing unit 203 into a digital signal.

A barrier 205 prevents stain and breakage of the image capturing system by covering the image capturing unit 203 including the image capturing lens 201 and the shutter 202.

An image processing unit 206 performs resize processing, such as predetermined pixel interpolation and reduction, and color conversion processing on image data from the A/D conversion unit 204 or image data from a memory control unit 207. In the image processing unit 206, predetermined arithmetic operation processing is performed using captured image data and a system control unit 208 performs exposure control and distance measuring control based on the obtained arithmetic operation results. Due to this, TTL (Through The Lens) AF (Auto Focus) processing, AE (Auto Exposure) processing, and EF (pre-flash) processing are performed. In the image processing unit 206, predetermined arithmetic operation processing is further performed using captured image data and TTL AWB (Auto White Balance) processing is also performed based on the obtained arithmetic operation results. The image data from the A/D converter 204 is directly written to a memory 209 via the image processing unit 206 and the memory control unit 207, or via the memory control unit 207.

The memory 209 stores image data obtained by the image capturing unit 203 and converted into digital data by the A/D converter 204, and image data to be displayed on the display unit 101. The memory 209 includes a storage capacity sufficient to store a predetermined number of still images, moving images for a predetermined period of time, and voice. By sequentially displaying captured image data using the display unit 101, it is possible to implement an electronic finder function (through-image display). Further, the memory 209 serves also as a memory for displaying images (video memory). A D/A converter 210 converts the data for displaying images stored in the memory 209 into analog signals and supplies the signals to the display unit 101. In this manner, the image data to be displayed written to the memory 209 is displayed on the display unit 101 via the D/A converter 210.

The display unit 101 produces a display on a display, such as an LCD, in accordance with the analog signal from the D/A converter 210.

A nonvolatile memory 211 is an electrically erasable/programmable memory and, for example, an EEPROM etc. is used. The nonvolatile memory 211 stores constants for the operation of the system control unit 208, programs, etc. Programs referred to here are programs used to perform various kinds of flowcharts, to be described later.

The system control unit 208 controls the whole of the digital camera 100. The system control unit 208 implements each piece of processing, to be described later, by executing the programs stored in the nonvolatile memory 211 described previously. As a system memory 212, a RAM is used and on which constants, variables for the operation of the system control unit 208, programs read from the nonvolatile memory 211, etc., are developed. Further, the system control unit 208 also performs display control by controlling the memory 209, the D/A converter 210, the display unit 101, etc. Furthermore, it is possible for the system control unit 208 to detect operations below to a touch panel.

Operation to touch the touch panel with a finger or a pen (hereinafter, referred to as touch down)

State where a finger or a pen is in touch with the touch panel (hereinafter, referred to as touch on)

Operation to move a finger or a pen in the state where it is kept in touch with the touch panel (hereinafter, referred to as move)

Operation to touch the touch panel with two fingers and to move the fingers so as to narrow the interval therebetween (hereinafter, referred to as pinch in)

Operation to touch the touch panel with two fingers and to move the fingers so as to increase the interval therebetween (hereinafter, referred as pinch out)

Operation to let go a finger or a pen in touch with the touch panel (hereinafter, referred to as touch up)

State where nothing is in touch with the touch panel (hereinafter, referred to as touch off)

The above-mentioned various kinds of operations and the coordinates of the position where a finger or a pen is in touch with the touch panel are notified to the system control unit 208 and the system control unit 208 determines which operation is performed on the touch panel based on the notified information. With regard to move, it is also possible to determine the moving direction of the finger or the pen that moves on the touch panel for each of the vertical composition and the horizontal composition on the touch panel based on the change in the coordinates of the position. It is assumed that a stroke is described in the case where the series of operations from touch down on the touch panel to touch up after constant move is performed. The operation to quickly describe a stroke is called flick. Flick is the operation to quickly move a finger in touch with the touch panel a certain distance and then let the finger go. In other words, flick is the operation to quickly slide a finger on the touch panel so as to flick it. In the case where move of a predetermined distance or more at a predetermined speed or higher is detected and then touch up is detected, it is possible to determine that flick is performed. It is assumed that in the case where move of a predetermined distance or more at less than a predetermined speed is detected, it is determined that drag is performed. As a touch panel, it may also be possible to use any of various kinds of systems, such as the resistance film system, the electrostatic capacitance system, the surface acoustic wave system, the infrared system, the electromagnetic induction system, the image recognition system, and the optical sensor system.

The mode dial 103 switches the operation mode of the system control unit 208 to any of the image capturing mode capable of recording still images and moving images, the reproduction mode, etc. The shutter button 102 includes a first shutter switch and a second shutter switch, not shown schematically. The first shutter switch turns on during the operation of the shutter button 102, i.e. by the so-called half-press operation (instructions to perform the image capturing preparation) and generates a first shutter switch signal SW1. The first shutter switch signal SW1 causes the operations, such as AF (Auto Focus) processing, AE (Auto Exposure) processing, AWB (Auto White Balance) processing, and EF (pre-flash) processing (hereinafter, at least one of these operations is referred to as an image capturing preparation operation). These pieces of processing are performed under control of the system control unit 208. The second shutter switch turns on at the time of completion of the operation of the shutter button 102, i.e. by the so-called full-press operation (instructions to perform image capturing) and generates a second shutter switch signal SW2. In response to the second shutter switch signal SW2, the system control unit 208 starts a series of operations of image capturing processing from reading a signal from the image capturing unit 203 to writing image data to the storage medium 108.

To each operating member of the operation unit 105, a function is allocated appropriately for each scene by performing the operation to select various kinds of function icons displayed on the display unit 101 and each operating member acts as each of the various kinds of function buttons. Function buttons include, for example, an end button, a return button, an image forward button, a jump button, a narrow-down button, an attribute change button, etc. For example, in the case where a menu button is pressed, a menu screen on which various kinds of settings can be performed is displayed on the display unit 101. It is possible for a user to intuitively perform various kinds of settings using the menu screen displayed on the display unit 101, a four-direction button, and a SET button. The controller wheel 106 is an operating member included in the operation unit 105 and capable of being operated to rotate and is used at the time of specifying a selected item together with the direction button.

A power source control unit 213 includes a battery detection circuit, a DC-DC converter, a switch circuit that switches blocks to be energized, etc., and detects whether or not a battery is attached, the kind of a battery, and the remaining battery life. Further, the power source control unit 213 controls the DC-DC converter based on the detection results and the instructions of the system control unit 208 and supplies a necessary voltage for a necessary period of time to each unit including the storage medium 108.

A power source unit 214 includes a primary battery, such as an alkali battery and a lithium battery, a secondary battery, such as a NiCd battery, a NiMH battery, and a Li battery, an AC adaptor, etc.

An interface 215 is an interface with the storage medium 108, such as a memory card and a hard disc.

FIGS. 3A to 3C are flowcharts showing a flow of image processing performed in the digital camera according to the present embodiment. The series of processing is implemented by the system control unit 208 developing programs stored in the nonvolatile memory 211 in the system memory 212 and executing the programs.

By a user turning on the power source, the system control unit 208 starts image capturing under predetermined image capturing conditions (focus, exposure, white balance, etc.) at step 301. The image capturing conditions depend on the specifications of the apparatus, such as that the value before the power source is turned off is recovered and used.

Figure 4:
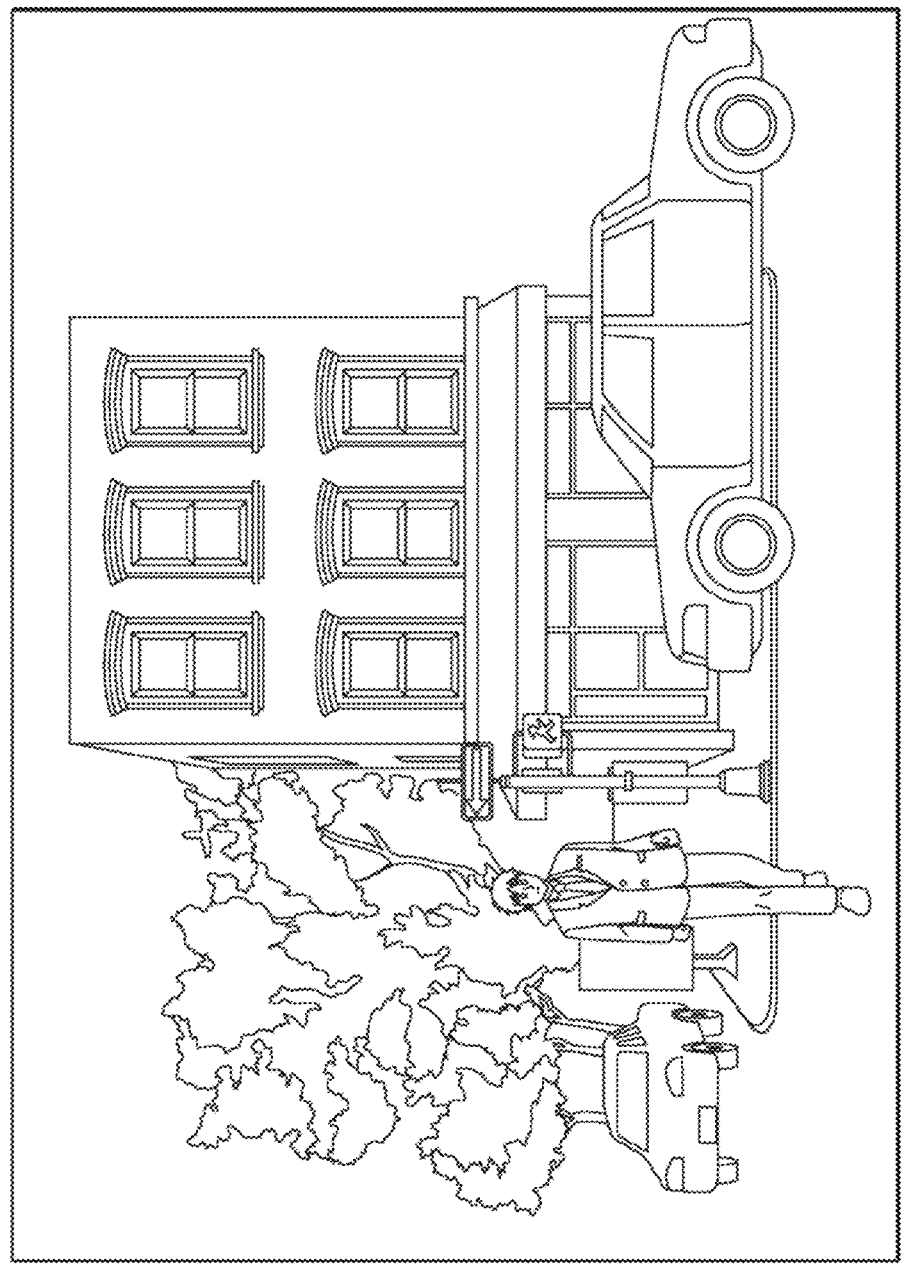
FIG. 4 is a diagram showing an example of a two-dimensional image displayed on a display unit of the digital camera.

At step 302, the system control unit 208 displays a two-dimensional image acquired by the image capturing unit 203 on the display unit 101. FIG. 4 is a diagram showing an example of a two-dimensional image displayed on the display unit 101. The two-dimensional image in FIG. 4 is an image captured outdoors and the sky is photographed, and therefore, the distance to the farthest subject is an infinity. At this time, in the case where the "sky", the farthest subject, is brought into focus (the focus distance is an infinity), the forward depth of field thereof becomes equal to ½ of the so-called "hyperfocal distance". The value of the hyperfocal distance is obtained by expression (1) below.

$$(f^2)/(\delta \cdot F) \qquad \text{expression (1)}$$

Here, f denotes the focal length (mm) of the lens, F denotes the f-stop of the lens, and δ denotes the diameter of the permissible circle of confusion (mm).

For example, in the case where the focal length of the lens is taken to be 50 mm, the f-stop of the lens at the time of full-aperture to be 2.8, and the diameter of the permissible circle of confusion to be 0.03328 mm, the hyperfocal distance is about 26.8 m and the forward depth of field is about 13.4 m. In this case, an area whose distance is greater than about 13.4 m is the "background area". In the case where the farthest subject is brought into focus with full-aperture and a certain subject in the forward depth of field is brought into focus, all the subjects in this range are brought into focus as a result. Because of this, by displaying the areas of these subjects as one "background area", it is possible to clearly demonstrate to a user that the subjects in this area cannot be classified into those which are brought into focus and those which are not brought into focus.

At step 303, in the case where there is a predetermined user's operation as to the various kinds of settings, such as forced flash/flash inhibited/automatic, the system control unit 208 performs the setting.

At step 304, the system control unit 208 determines whether there are instructions to change the display mode from a user. In the case where there are instructions to change the display mode, the procedure proceeds to step 305. On the other hand, in the case where there are not instructions to change the display mode, the procedure returns to step 302.

Figure 5:
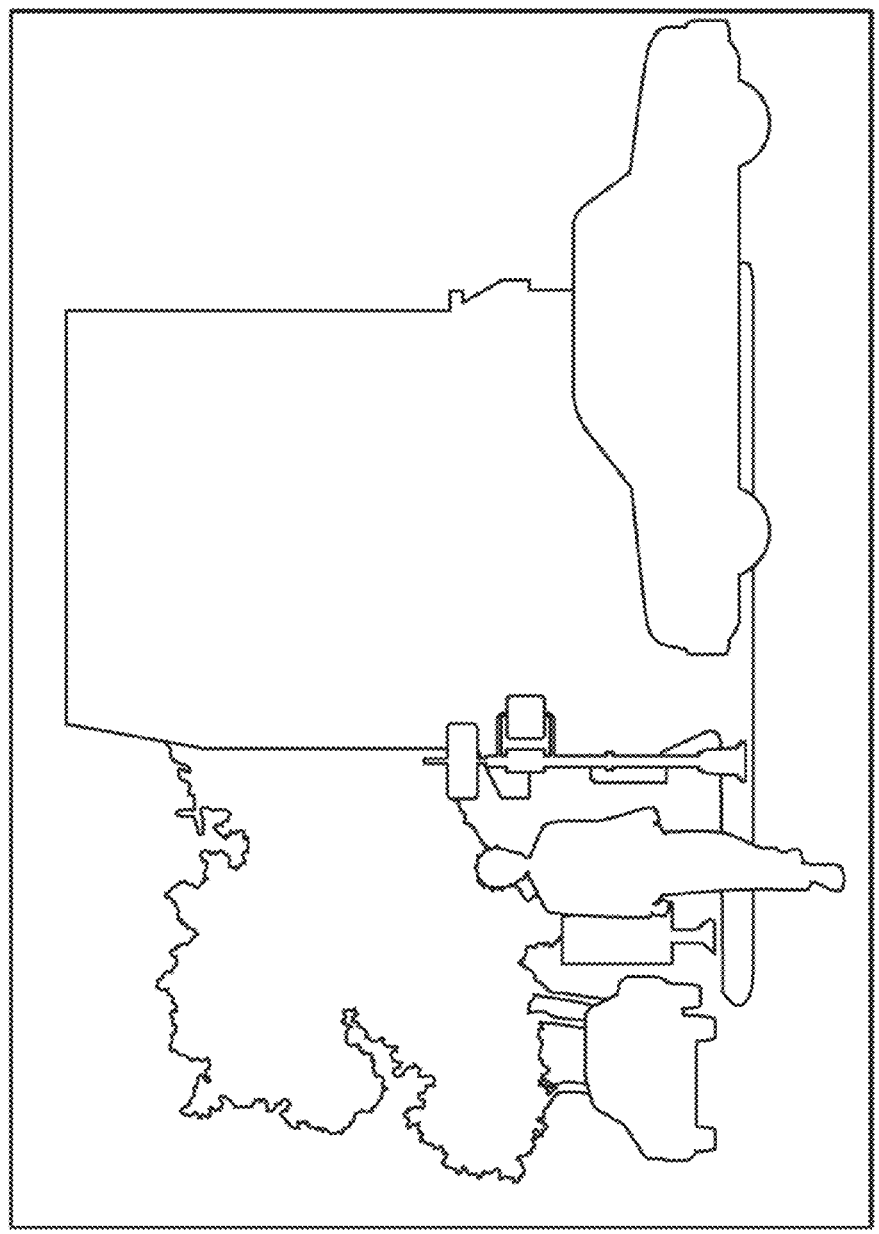
FIG. 5 is a diagram showing a state where subjects are detected from the two-dimensional image.

At step 305, the system control unit 208 detects subjects included in a captured image. As the method for detecting subjects within a captured image, it may be possible to apply various kinds of methods, such as, for example, the method disclosed in Japanese Patent Laid-Open No. 1997-186931. FIG. 5 is a diagram showing a state where a person, an automobile in profile, a traffic sign, and a building are detected, respectively, as subjects from the two-dimensional image shown in FIG. 4. In FIG. 5, each subject of a clump of trees, a mailbox, and an automobile facing the front is regarded to be at a distance of ½ of the hyperfocal distance at the time of the aperture being fully open or farther, and therefore, is included in the above-described "background area" together with the "sky", which is the farthest subject.

Figure 6:
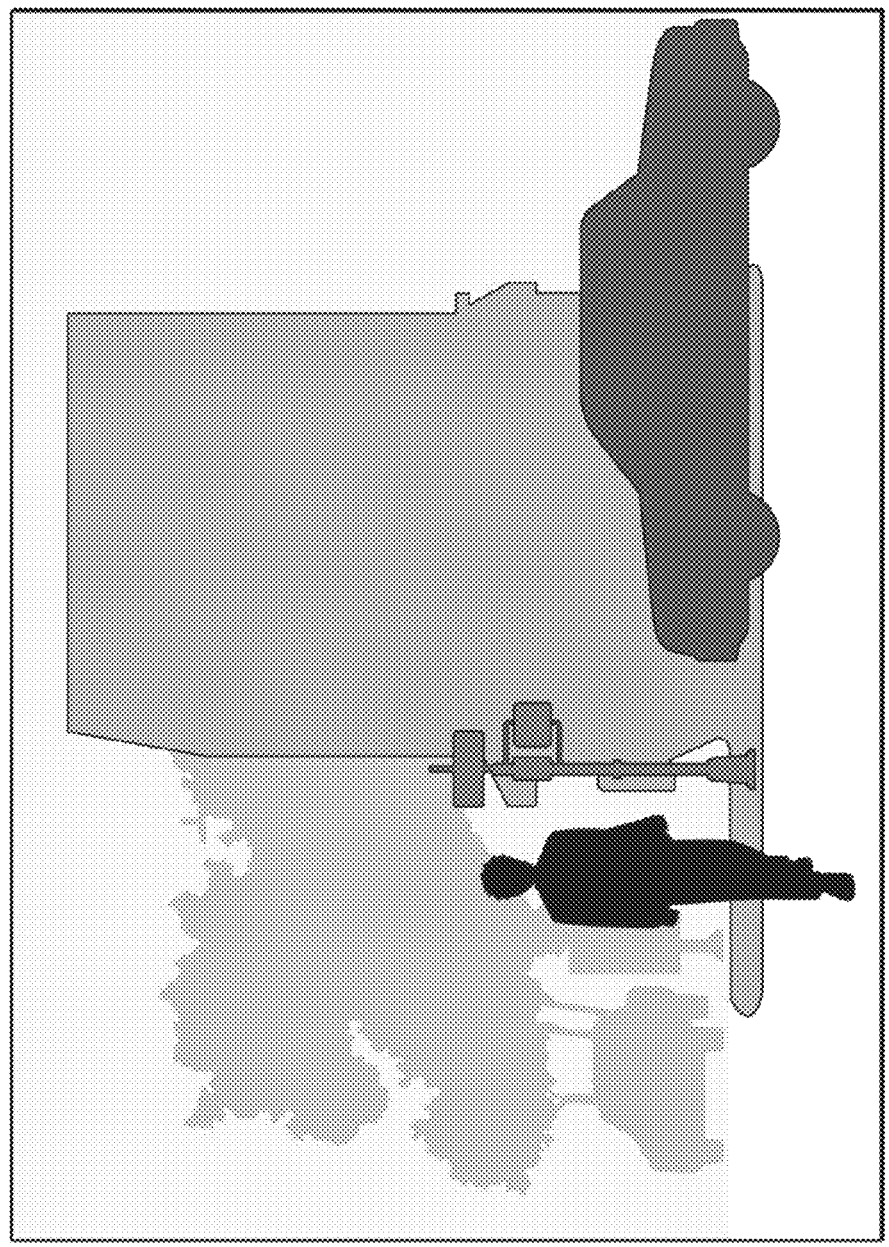
FIG. 6 is a diagram showing an example of a distance image.

As step 306, the system control unit 208 acquires distance information (information of the distance to each subject detected from the two-dimensional image) of the captured two-dimensional image. Here, the distance information is information of the distance to each subject in the two-dimensional image recorded in association with the coordinates of the two-dimensional image, and for example, corresponds to a "distance image (distance map)" in which the magnitude of the depth of the coordinates (the distance from the camera) are represented by a shade of gray. As the method for obtaining distance information of a captured image, it may be possible to apply the various kinds of methods, such as, for example, the method disclosed in Japanese Patent Laid-Open No. 2001-169308. FIG. 6 shows an example of a distance image generated for the two-dimensional image shown in FIG. 4. In the distance image in FIG. 6, the areas of the four subjects of the person, the automobile in profile, the traffic sign, and the building are expressed by images in a gray scale different in density according to each distance (the person whose distance is the shortest is expressed in the darkest shade of gray and the building in the lightest shade of gray). Those such as a clump of trees farther than the building are included in part of the background as described above, and therefore, they are not treated as "subjects" here.

Figure 7:
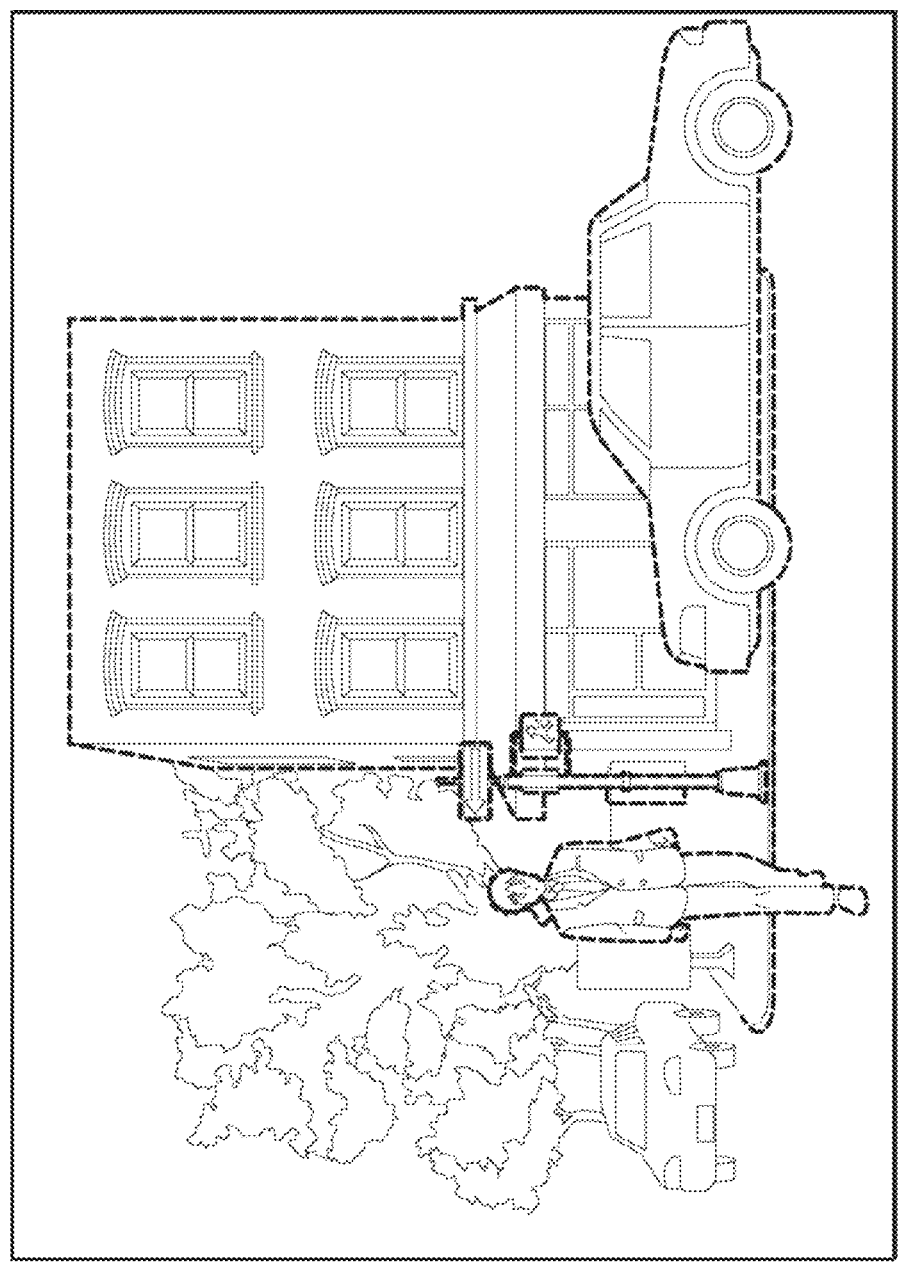
FIG. 7 is a diagram showing a state where subject areas are extracted.

At step 307, the system control unit 208 performs processing to extract subject areas to be subjected to shift processing at the next step 308 based on the subjects detected at step 305 and the distance information acquired at step 306. The subject area extraction processing can also be said as processing to separate subject areas for each fixed distance. For example, among the subjects detected at step 305 but not included in the background area, the portion within a range of a fixed distance (for example, 1 m±50 cm) is extracted as one of units of subject areas. FIG. 7 is a diagram showing a state where the subject areas are extracted from the two-dimensional image shown in FIG. 4 and the portion (each area of the person, the automobile in profile, the traffic sign, and the building) indicated by the broken line represents each extracted subject area.

At step 308, the system control unit 208 generates a "shifted image" in which each subject area is shifted in a fixed direction by performing processing to change (shift) the position (coordinates) of each subject area extracted at step 307 in accordance with the distance information acquired at step 306. For example, in the case where the distances to the four subject areas shown in FIG. 7 correspond to 1 m, 3 m, 5 m, and 8 m, respectively, an image is generated in which the coordinates of each subject area are shifted in the horizontal direction and in the vertical direction by predetermined amounts, respectively, (for example, 100 pixels, 33 pixels, 20 pixels, and 13 pixels, respectively). The amount of shift in the "shifted image generation" does not necessarily needs to be in inverse proportion to the distance and they may be in a logarithmic ratio or a correspondence table of the distance and the amount of shift is prepared in advance and the amount of shift may be determined by applying the table. At this time, in order to make the same the shift direction of each area, the rate between the amount of shift in the horizontal direction and the amount of shift in the vertical direction is made constant. Alternatively, it may also be possible to determine the rate of amount of shift between the horizontal direction and the vertical direction by processing as shown below.

Figure 8:
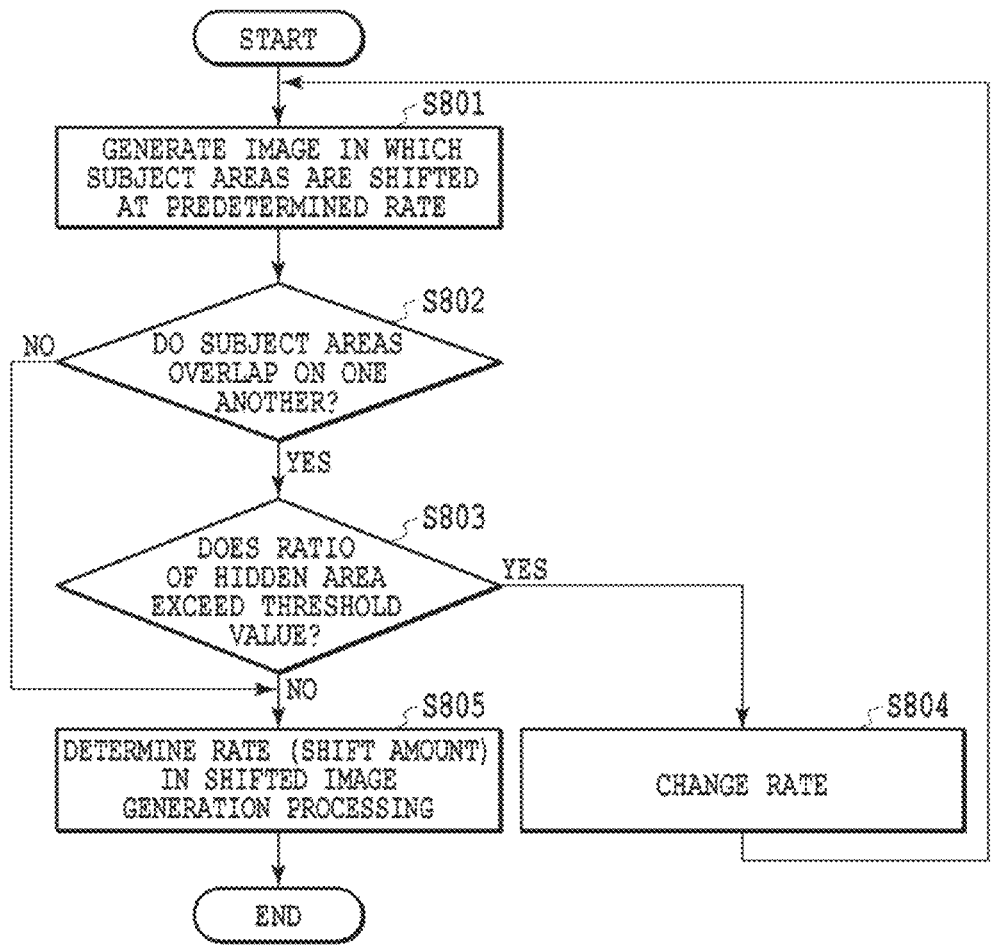
FIG. 8 is a flowchart showing a flow of processing to determine a rate of amount of shift between the horizontal direction and the vertical direction.

FIG. 8 is a flowchart showing a flow of processing to determine a rate of amount of shift between the horizontal direction and the vertical direction.

At step 801, the system control unit 208 generates an image in which a shift is caused at a predetermined rate. In the stage immediately after the processing starts, a shifted image in which a shift is caused by a predetermined initial value (for example at a rate of 1:1) is generated.

At step 802, the system control unit 208 determines whether there is an overlap of subject areas within the shifted image obtained at step 801. In the case where there is an overlap of subject areas, the procedure proceeds to step 803. On the other hand, in the case where there is no overlap of subject areas, the procedure proceeds to step 805.

At step 803, the system control unit 208 determines whether the ratio between the area of the hidden portion of a subject area to be displayed behind another subject area overlapping thereon and the area of the subject area to be displayed behind the other subject area exceeds a predetermined threshold value (for example, 50%). In this case, the smaller the ratio of the area of the hidden portion of the subject area to be displayed behind, the more appropriately it is made possible for a user to grasp the subjects. The predetermined threshold value is determined in advance in view of this point. In the case where the ratio of the area of the hidden portion exceeds the threshold value, the procedure proceeds to step 804. On the other hand, in the case where the ratio of the area of the hidden portion does not exceeds the threshold value, the procedure proceeds to step 805.

At step 804, the system control unit 208 changes the rate at which the shift is caused in the horizontal and vertical directions and the procedure returns to step 801. That is, the rate is changed so that the ratio between the area of the hidden portion of the subject area to be displayed behind the other subject area overlapping thereon and the area of the subject area to be displayed behind becomes smaller and then a shifted image in which a shift is caused in accordance with the changed rate is generated.

At step 805, the system control unit 208 determines the rate in the case where the ratio of the hidden area of the subject area to be displayed behind becomes lower than the threshold value as the formal rate for display. The amount of shift in accordance with the rate determined as described above is determined as the amount of shift in shifted image generation.

Figure 9:
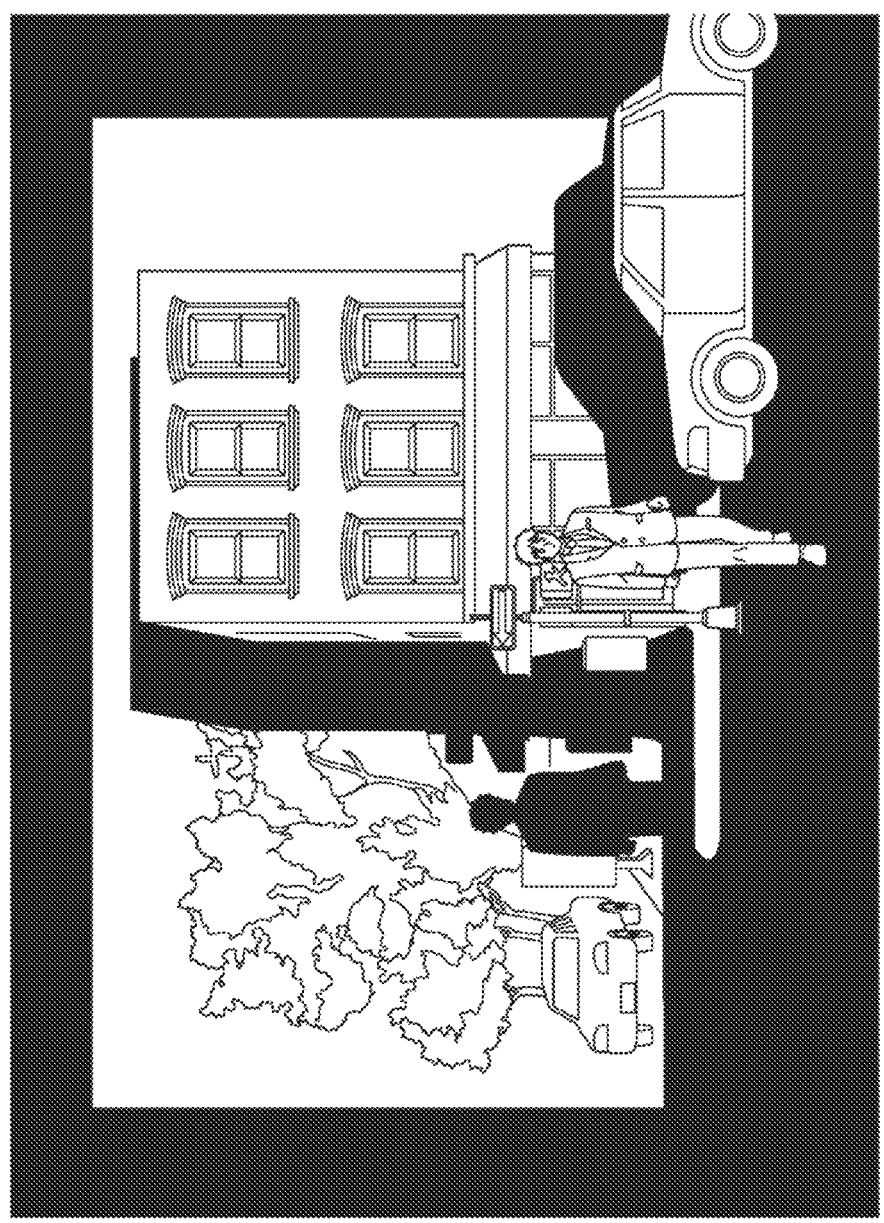
FIG. 9 is a diagram showing the results of performing shifted image generation processing on the image in which the subject areas are extracted.

In the shifted image generation processing, it is desirable to shift subject areas in the direction in which the subject area corresponding to the subject at the short distance (first subject area) appears lower than the subject area corresponding to the subject at the great distance (second subject area). The reason is that, due to this, it is possible to produce a display in which the scene is looked down upon by a user from the front and which is suitable to the feeling of the user. Further, the above-described background area (area included in the forward depth of field at the time of bringing the subject at the greatest distance in the two-dimensional image into focus with the aperture of the shutter being fully open) is taken to be a reference at the time of shifting the position (coordinates). The shift is caused with the "background area" as a reference because of the following. The object of the present invention is to make it easy for a user to grasp which subject is brought into focus and the area included in the depth of field at the time of the aperture being fully open in the case where the subject at the greatest distance is in focus is recognized to be in focus even in the case where the f-stop is changed. FIG. 9 is a diagram showing the results of performing the shifted image generation processing on the image in which the four subject areas are extracted (see FIG. 7) and it is known that the position (coordinates) of each subject area is shifted in accordance with its distance. In the example in FIG. 9, in order to make the same the direction in which each subject area is shifted, the rate of amount of shift between the horizontal direction and the vertical direction is made constant.

Explanation is returned to the flowchart in FIG. 3.

Figure 10:
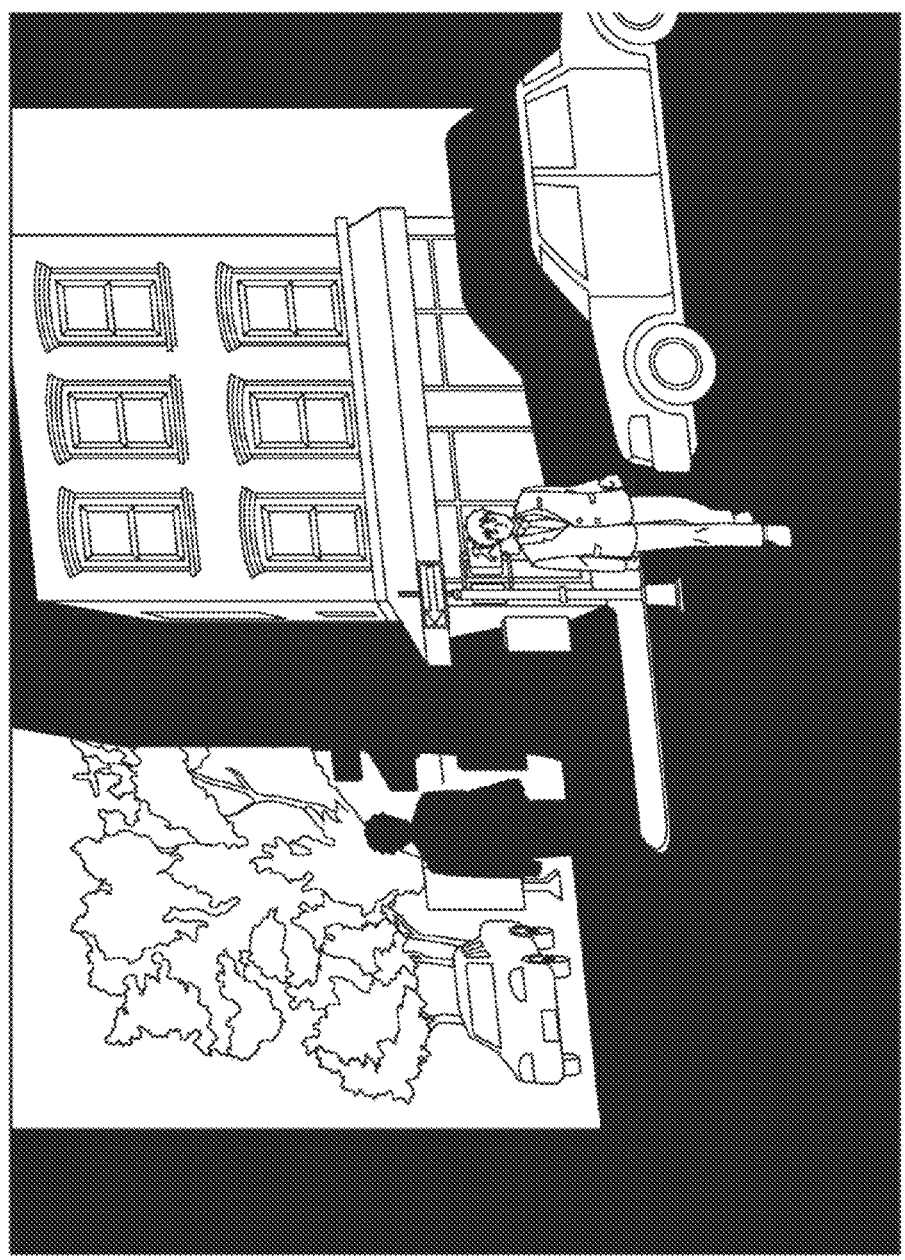
FIG. 10 is a diagram showing the results of performing shear processing on each subject area in the shifted image.

At step 309, the system control unit 208 performs shear processing (oblique deformation processing) on each subject area in the "shifted image" generated by the shifted image generation processing at step 308 so that the horizontal direction is inclined. By performing the shear processing, it is made possible to produce a display more suitable to the feeling of a user that the user views the scene from the oblique front. To which degree the oblique deformation is applied is determined by a shear angle determined in advance. FIG. 10 is a diagram showing the results of performing the shear processing on each subject area in the shifted image (see FIG. 9). By the shear processing, it is made possible for a user to grasp the distance interval between subjects more easily. The shear angle may be a given angle determined in advance or it may also be possible to enable a user to specify the shear angle arbitrarily.

Figure 11:
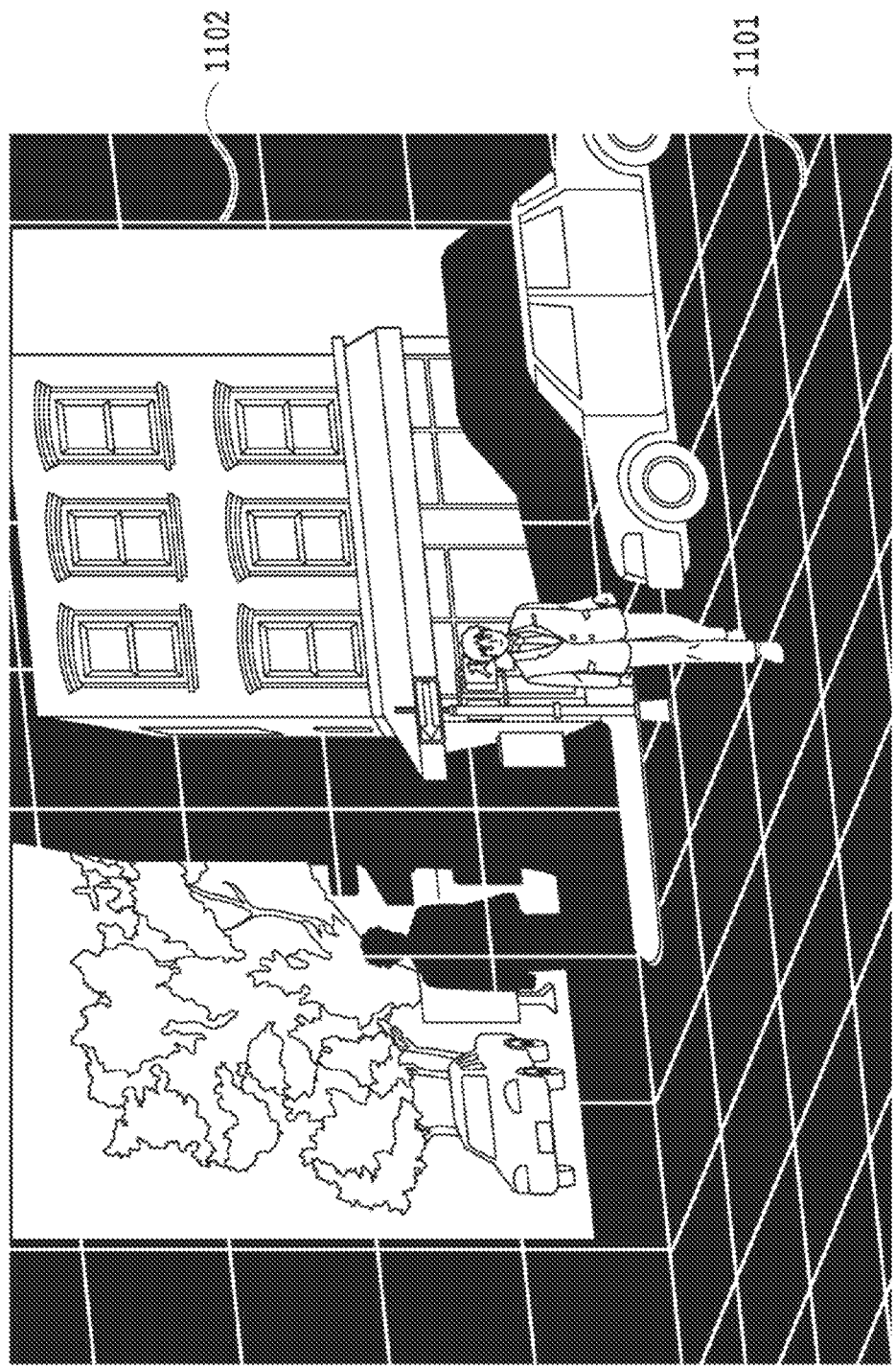
FIG. 11 is a diagram showing the results of superimposing aground lattice pattern on the image having been subjected to the shear processing.

At step 310, the system control unit 208 performs processing to superimpose (combine) a lattice pattern based on the shift direction and the shear angle. For example, a ground lattice pattern including segments in the same direction as the shift direction and segments in the same direction as the shear (oblique deformation) direction is generated and superimposed on the image. FIG. 11 is a diagram showing the results of superimposing a lattice pattern on the image in FIG. 10 having been subjected to the shear processing. Due to this, it is made possible for a user to grasp the distance interval between subjects still more easily. In the example in FIG. 11, two kinds of lattice patterns in total, i.e. a ground lattice pattern 1101 and a wall surface lattice pattern 1102 are superimposed and displayed. Due to this, it is made possible to produce a display still more suitable to the feeling that the user views the scene from the oblique front. It may also be possible to display the "background area" as a "wall" and not to display the lattice pattern corresponding to the greater distances. Due to this, it is made possible for a user to intuitively grasp the limit of the change in the depth of field etc. (that is, the fact that the focus distance or the depth of field cannot be changed for the portion displayed as the "wall").

At step 311, the system control unit 208 derives the forward depth of field and the backward depth of field from the image capturing conditions (focus, exposure, white balance, etc.) of a captured image. For example, by arithmetic operations using expression (2) and expression (3) below, the forward depth of field and the backward depth of field are derived, respectively.

$$\text{Forward depth of field (mm)}=(R^2 \cdot \delta \cdot F)/(f^2+R\cdot\delta\cdot F) \quad \text{expression (2)}$$

$$\text{Backward depth of field (mm)}=(R^2 \cdot \delta \cdot F)/(f^2-R\cdot\delta\cdot F) \quad \text{expression (3)}$$

In the above-mentioned expression (2) and expression (3), R denotes the distance (mm) to the subject in focus (however, not the infinity), f denotes the focal length (mm) of the lens, F denotes the f-stop of the lens, and δ denotes the diameter of the permissible circle of confusion (mm).

The diameter of the permissible circle of confusion is a characteristic value derived from the diagonal length of the image sensing element and for example, for the image sensing element having a width of 36 mm, a height of 24 mm, and a diagonal length of 43.27 mm, a value of 0.03328 mm is used.

Figure 12:
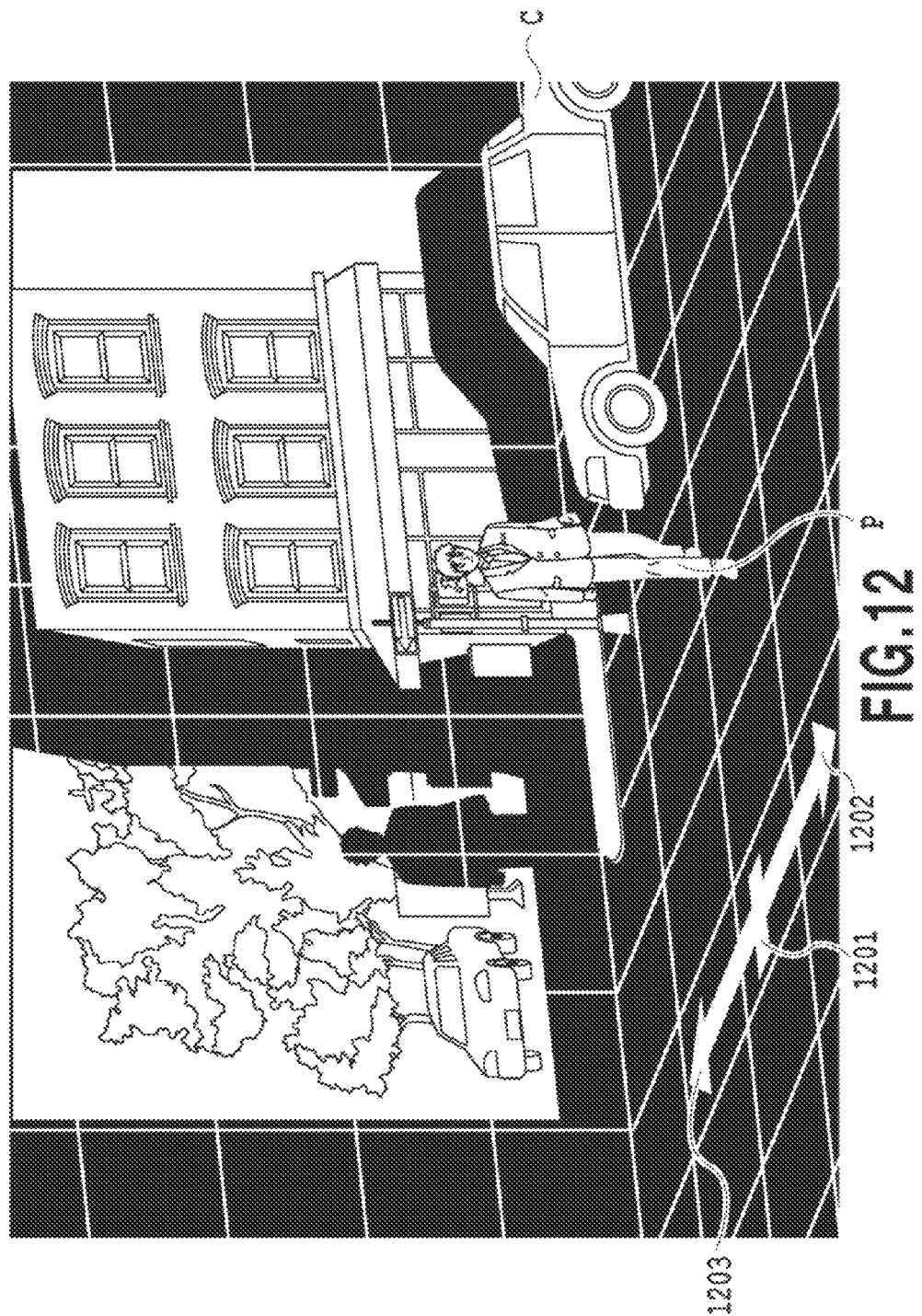
FIG. 12 is a diagram showing the results of superimposing an index of focus distance and an index of depth of field on the image with which the ground lattice pattern is combined.

At step 312, the system control unit 208 performs processing to superimpose (combine) indexes indicative of the distance to the subject in focus (hereinafter, referred to as a "focus distance") and indicating the forward depth of field and the backward depth of field derived at step 311 on the captured image. That is, in the positions corresponding to these distances on the ground lattice pattern superimposed at step 310, the images that serve as indexes are superimposed. FIG. 12 is a diagram showing the results of superimposing the index of the focus distance and the index of depth of field (the index of the forward depth of field and the index of the backward depth of field) on the image in FIG. 11 with which the lattice pattern is combined. In FIG. 12, an index 1201 indicates the distance (focus distance) in the depth direction of the position where the person (subject P) is located along the ground lattice pattern, representing that the person (subject P) is in focus. Indexes 1202 and 1203 indicate the forward depth of field and the backward depth of field, respectively, along the ground lattice pattern, representing that the automobile (subject C) in profile is in the depth of field (it is possible to recognize that the subject C is in focus in the captured image).

At step 313, the system control unit 208 displays the captured image with which each index is combined at step 312 on the display unit 101. Then, as will be described later, by a user giving instructions and performing operations on the combined indexes, it is possible to control the image capturing lens 201, the aperture of the shutter 202, etc., to change the focus distance and the depth of field. At this time, it may also be possible to produce a highlighted display of the lattice line corresponding to the position of the index or to display the area of the subject corresponding to the position differently from the display of the areas of the other subjects in accordance with the user's operation to move the index. Due to this, it is possible for a user to grasp which subject is brought into focus or which subject is in the depth of field more clearly.

At step 314, the system control unit 208 determines whether there is a touch operation on the display unit 101 by a user. In the case where there is a touch operation by a user, the procedure proceeds to step 315. On the other hand, in the case where there is no touch operation by a user, the procedure returns to step 305.

At step 315, the system control unit 208 determines whether the touch operation by the user is the operation "to perform touch down in the vicinity of the index of the focus distance and then perform move". In the case where the touch operation by the user is the operation "to perform touch down in the vicinity of the index of the focus distance and then perform move", the procedure proceeds to step 316. On the other hand, in the case where the touch operation by the user is the operation other than the operation "to perform touch down in the vicinity of the index of the focus distance and then perform move", the procedure proceeds to step 318.

At step 316, the system control unit 208 adjusts the focus by controlling the image capturing lens 201 so that the subject at the distance corresponding to the position touched by a user is brought into focus.

At step 317, the system control unit 208 moves the display position of the index indicative of the focus distance to the position touched by the user.

At step 318, the system control unit 208 determines whether the touch operation by the user is the operation "to perform touch down in the vicinity of the index of the depth of field and then perform pinch in or pinch out". In the case where the touch operation by the user is the operation "to perform touch down in the vicinity of the index of the depth of field and then perform pinch in or pinch out", the procedure proceeds to step 319. On the other hand, in the case where the touch operation by the user is the operation other than the operation "to perform touch down in the vicinity of the index of the depth of field and then perform pinch in or pinch out", the procedure proceeds to step 321.

At step 319, the system control unit 208 adjusts the depth of field by controlling the image capturing lens 201 and the shutter 202 so that the subject between the distances corresponding to the user's two fingers (fingers in touch), respectively, is brought into focus. It is known that the depth of field increases by reducing the aperture in the case where the conditions, such as the focal length and the diameter of the permissible circle of confusion, are fixed. It is possible to adjust an increase or a reduction in the quantity of light due to the change in the f-stop by using the ND (Neutral Density) filter or by increasing or reducing the sensitivity of the image sensing element.

At step 320, the system control unit 208 moves the display positions of the two indexes indicative of the depth of field to the positions of the user's two fingers in touch, respectively.

At step 321, the system control unit 208 performs processing corresponding to the contents of the touch operation of the user. For example, in the case where any of the areas extracted from the captured image is touched by the user, the system control unit 208 controls the image capturing lens 201 so that the distance corresponding to the area is brought into focus and moves the display position of the index indicative of the focus distance to the corresponding position.

At step 314, the system control unit 208 exits the present processing in accordance with a predetermined end operation, such as turning off of the power source by the user.

As described above, by the digital camera to which the image processing apparatus according to the present embodiment is applied, it is made possible for a user to intuitively grasp which subject is brought into focus on the UI thereof in the state where the image is close to the actual image.

Second Embodiment

Next, an aspect is explained as a second embodiment, in which the image processing apparatus according to the present invention is applied to an information processing apparatus that handles light field data. Explanation of the parts common to those of the first embodiment is simplified or omitted and here, different points are explained mainly.

First, light field data is explained.

Light field data (light ray information) is data recording the quantity of light for a light ray path. Specifically, in the data, for a light ray passing through coordinates on two parallel planes (coordinates (u, v) on a first plane and coordinates (x, y) on a second plane), a quantity of light L of the light ray is expressed by L (u, v, x, y) as a function of u, v, x, and y. In contrast to this, a two-dimensional image is expressed by the quantity of light of a light ray at the coordinates (x, y) on the single plane. For example, that which records the quantity of light at the coordinates (x, y) of the image sensing element is the two-dimensional image of a captured image. In other words, that in which the two-dimensional images are bundled in the number corresponding to the number of coordinates on the first plane is light filed data.

As a method for acquiring light field data by an image capturing apparatus, mentions is made of a method in which a microlens array is arranged in front of the image sensing element, a method in which the opening position of the aperture is controlled, etc. In summary, it is possible to obtain light field data by recording the quantity of light at the coordinates of the image sensing element in correspondence to the coordinates on a plane parallel to this (for example, the coordinates of the position of each microlens).

By integrating (calculating the sum of) the light field data L (u, v, x, y) with respect to part or the whole of the coordinates (u, v) on the first plane described above, a two-dimensional image that can be displayed on a two-dimensional display is obtained. That is, it is made possible to display a plurality of two-dimensional images corresponding to the coordinates in a fixed range on the above-described first plane configuring the light field data on a two-dimensional display by superimposing the plurality of two-dimensional images.

By superimposing two-dimensional images configuring light field data so that the position of a subject at a specific distance agrees with itself at the time of superimposing the two-dimensional images, it is possible to obtain a two-dimensional image in which the subject at the distance is in focus. On the contrary, the two-dimensional images configuring light field data each have a parallax corresponding to the distance of the separation between the coordinates on the first plane described above, and therefore, subjects at distances other than the specific distance are superimposed with positions shifted and their images are blurred on the obtained two-dimensional image as a result.

By superimposing the two-dimensional images configuring light field data by the amount corresponding to the coordinates in a small range on the first plane described above, the parallax of each two-dimensional image is limited, and therefore, it is possible to obtain a two-dimensional image with a large depth of field. That is, by changing the range on the above-described first plane corresponding to the two-dimensional images to be superimposed, it is made possible to change the depth of field of the two-dimensional image obtained by superimposition.

It is also possible to obtain a distance image from light field data as below by applying the "image correlation method". That is, two coordinates are selected from the above-described first plane and the two two-dimensional images corresponding thereto are compared. For a small area around an arbitrary pixel in one of the two two-dimensional images, a small area having a similar pattern is specified in the other two-dimensional image, and an amount of movement of the two corresponding small areas between the two two-dimensional images is calculated. This amount of movement is the so-called "parallax" and is in inverse proportion to the distance of the subject displayed at the coordinates. Consequently, by finding the distance to the subject from the parallax for each coordinate and reflecting the distance in the color of the pixel at the coordinate (for example, a shade of gray), a distance image is obtained.

Figure 13:
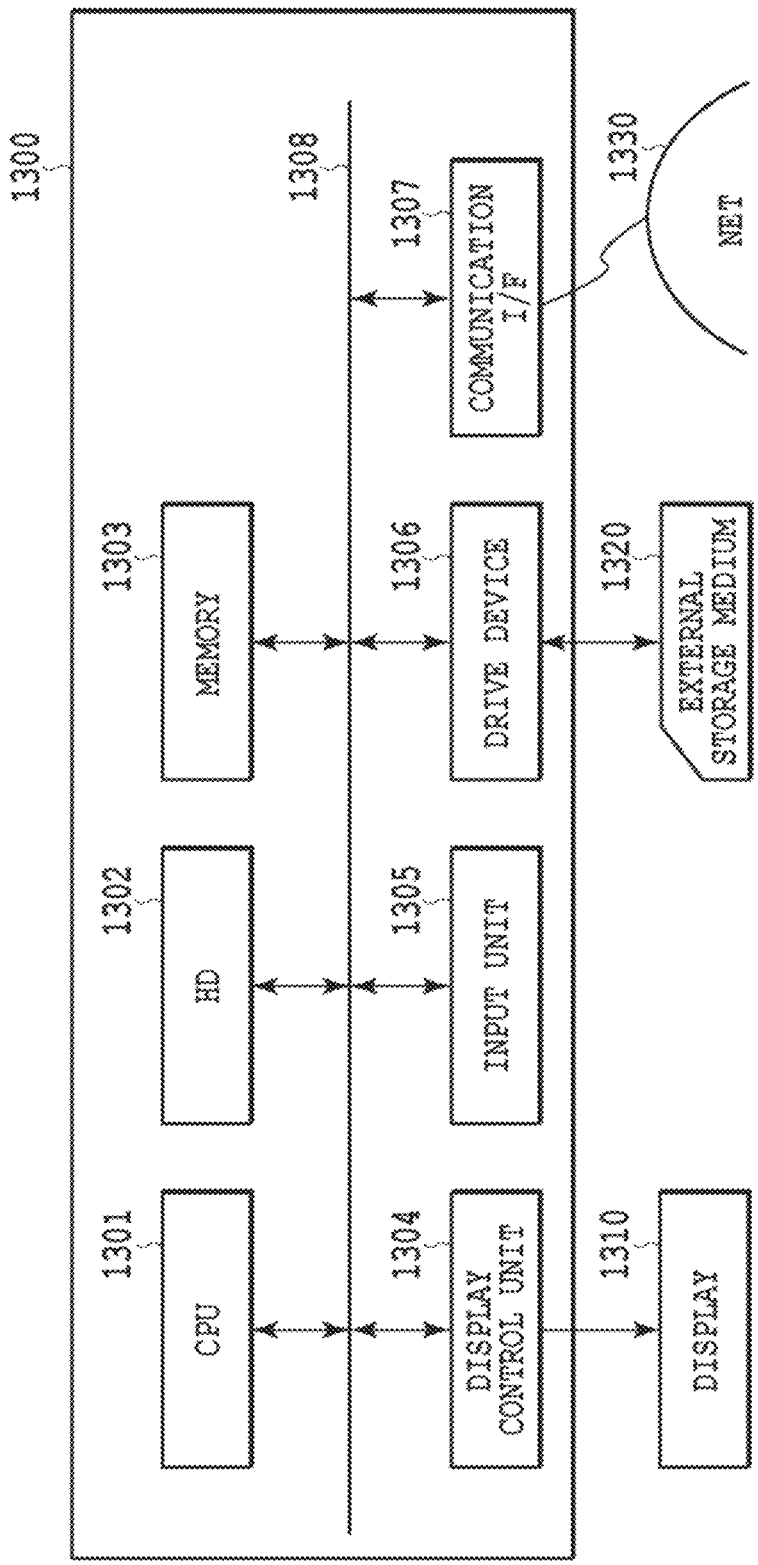
FIG. 13 is a diagram showing an example of an internal configuration of an apparatus that handles light field data.

FIG. 13 is a diagram showing an example of an internal configuration of an apparatus that performs information processing, such as, for example, a general personal computer (hereinafter, PC) and a tablet terminal, which handles light field data.

In FIG. 13, an apparatus 1300 includes a CPU 1301, a hard disk (HD) 1302, a memory 1303, a display control unit 1304, an input unit 1305, a drive device 1306, and a communication I/F 1307 and these units are connected to one another by an internal bus 1308. It is possible for each unit connected to the internal bus 1308 to transmit and receive data to and from one another via the internal bus 1308.

In the hard disk 1302, image data, other data, various kinds of programs for the CPU 1301 to operate, etc., are stored. The memory 1303 includes, for example, a RAM. The CPU 1301 as a display control unit, a change unit, and a calculation unit controls each unit of the apparatus 1300 using the memory 1303 as a work memory in accordance with programs, for example, stored in the hard disk 1302. The programs for the CPU 1301 to operate are not limited to those stored in the hard disk 1302 and it may also be possible to store the programs in advance, for example, in a ROM, not shown schematically.

The input unit 1305 receives a user's operation and generates a control signal in accordance with the operation, and then supplies the signal to the CPU 1301. For example, the input unit 1305 has a character information input device, such as a keyboard, a pointing device, such as a mouse and a touch panel, etc., as an input device configured to receive a user's operation. The touch panel is an input device by which coordinate information in accordance with a touched position on the input unit 1305 configured, for example, into a planar shape is output. The CPU 1301 controls each unit of the apparatus 1300 in accordance with programs based on the control signal generated and supplied by the input unit 1305 in response to a user's operation performed to the input device. Due to this, it is possible to cause the apparatus 1300 to perform the operation in accordance with the user's operation.

The display control unit 1304 outputs a display signal for causing a display 1310 to display an image. For example, to the display control unit 1304, a display control signal generated by the CPU 1301 in accordance with programs is supplied. The display control unit 1304 generates a display signal based on the display control signal and outputs the signal to the display 1310. For example, the display control unit 1304 causes the display 1310 to display a GUI screen configuring a GUI (Graphical User Interface) based on the display control signal generated by the CPU 1301.

In the case where a touch panel is used as the input unit 1305, it may also be possible to integrally configure the input unit 1305 and the display 1310.

On the drive device 1306, an external storage medium 1320, such as a CD and a DVD, can be mounted and the drive device 1306 reads data from the external storage medium 1320 mounted thereon and writes data to the external storage medium 1320 based on the control of the CPU 1301. The external storage medium 1320 that can be mounted on the drive device 1306 is not limited to the disc storage medium, such as a CD and a DVD, and a nonvolatile semiconductor memory, such as, for example, a memory card, may be mounted on the drive device 1306. The communication interface (I/F) 1307 communicates with a network 1330, such as a LAN and the Internet, based on the control of the CPU 1301.

Figure 14:
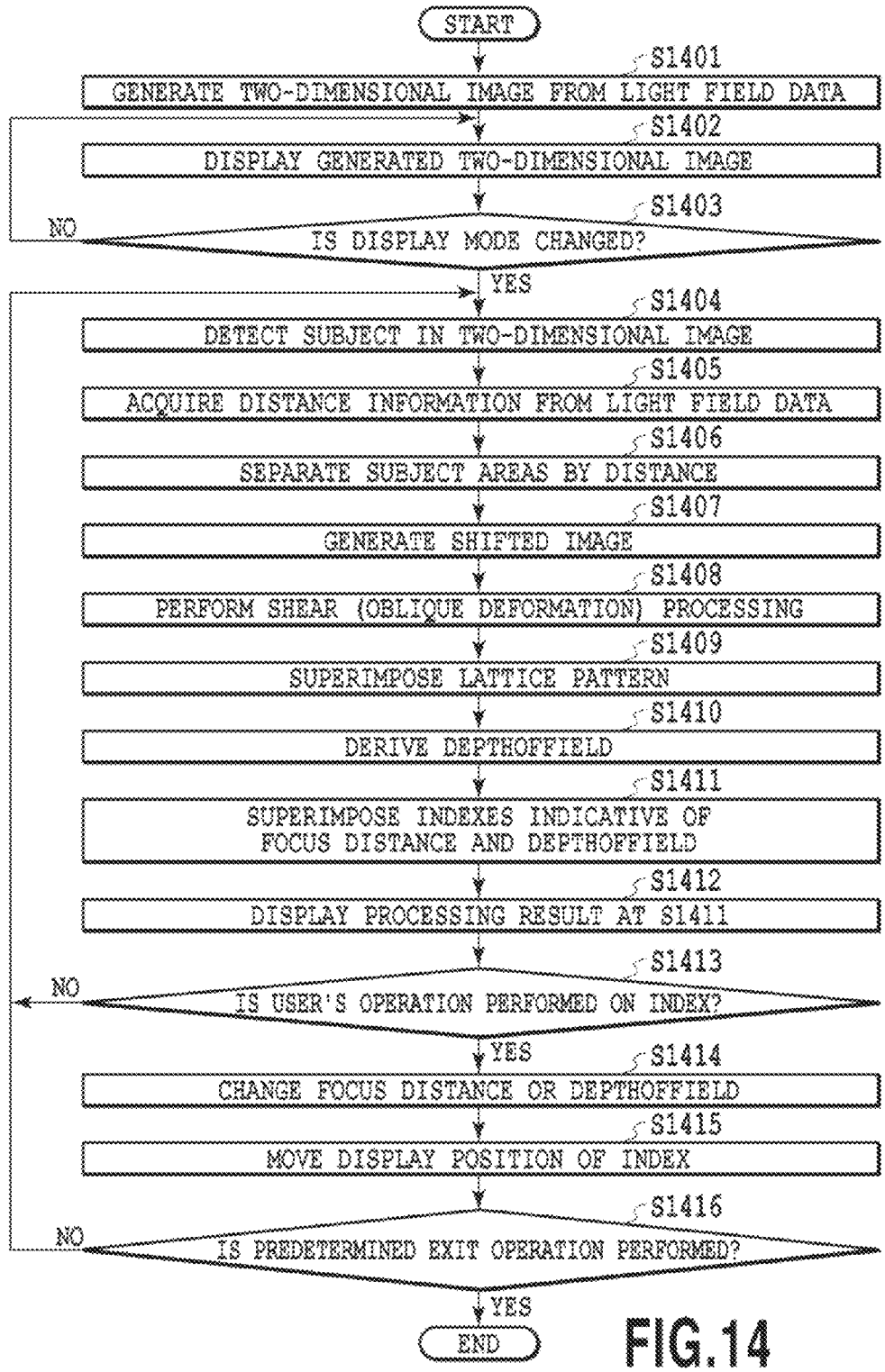
FIG. 14 is a flowchart showing a flow of image processing performed in an apparatus according to a second embodiment.

FIG. 14 is a flowchart showing a flow of image processing performed in the apparatus that handles light field data according to the present embodiment. The series of processing is implemented by the CPU 1301 developing programs recorded in the hard disk 1302 or a ROM, not shown schematically, onto the memory 1303 and executing the programs.

First, from the light field data obtained by the image capturing apparatus, a two-dimensional image is generated (at step 1401) and the generated two-dimensional image is displayed on the display 1310 by the display control unit 1304 (step 1402).

Then, whether there are instructions to change the display mode from a user is determined and in the case where there are instructions to change the display mode, the procedure proceeds to step 1404 and in the case where there are not instructions to change the display mode, the procedure returns to step 1402 (step 1403).

Each piece of processing at step 1404 to step 1412 that follow corresponds to that at step 305 to step 313 in the first embodiment. That is, each piece of processing below is performed.

Processing to detect subjects included in the two-dimensional image (step 1404)

Processing to acquire distance information (distance image) of the two-dimensional image (step 1405)

Processing to extract subject areas based on the subjects detected at step 1404 and the distance information acquired at step 1405 (step 1406)

Processing to generate a shifted image in accordance with the distance information for each extracted subject area (step 1407)

Processing to perform shear processing to cause the horizontal direction to incline on the generated shifted image (step 1408)

Processing to superimpose a lattice pattern based on the shift direction and a shear angle (step 1409)

Processing to derive the forward depth of field and the backward depth of field of the two-dimensional image (step 1410)

Processing to combine indexes each indicative of the distance to the subject in focus (focus distance), the forward depth of field, and the backward depth of field with the two-dimensional image (step 1411)

Processing to display the two-dimensional image with which the indexes are combined on the display 1310 (step 1412)

After each piece of processing described above, at step 1413, whether there are user's instructions/operation for each index within the image displayed on the display 1310 is determined. In this case, the user's instructions/operation for the index are input using a mouse in the case of a general PC and are input by the same touch operation as that in the first embodiment in the case of a tablet terminal having a touch panel. In the case where there are user's instructions/operation for the index, the procedure proceeds to step 1414 and in the case where there are not user's instructions/operation, the procedure returns to step 1404.

Then, in accordance with a new position of the index specified by a user, processing to change the focus distance and/or the depth of field is performed using the previously-described light field data (step 1414). Accompanying this, the display position of the index indicative of the focus distance or the depth of field is moved to the new position specified by the user (step 1415).

In the case where a predetermined exit operation is performed by a user, for example, where instructions to exit the application are given, the present processing is exited (step 1416).

In the present embodiment also, at step 1405 described above, as distance information, for example, the distance image as in FIG. 6, is generated and by the shifted image generation processing at step 1407, the "shifted image" in which the position of each subject area is shifted as in FIG.

9 is obtained. That is, different from an image in which the viewpoint is only changed based on light field data (in this case, each subject is represented in a stereoscopic manner), an image in which each subject area is represented as a portable painting used as part of the backdrop (stage setting) (each subject area has no depth and is represented in a planar manner) is obtained. Due to this, it is made easier for a user to grasp the feeling of distance to each subject.

As above, by the apparatus according to the present embodiment also, it is made possible for a user to intuitively grasp which subject is brought into focus on the display of a PC etc. in the state where the image is close to the actual image.

Third Embodiment

In the first and second embodiments, it is made possible to intuitively grasp the range in which refocus can be performed by the image (shifted image) in which the position of each subject area is shifted in accordance with the distance of each subject area and which is close to the actual image. In a third and subsequent embodiments, an aspect is explained in which it is made possible to intuitively grasp the range in which refocus can be performed using an image in which the coordinates (arrangement) of each subject area are changed in accordance with the distance of each subject area.

Figure 15:
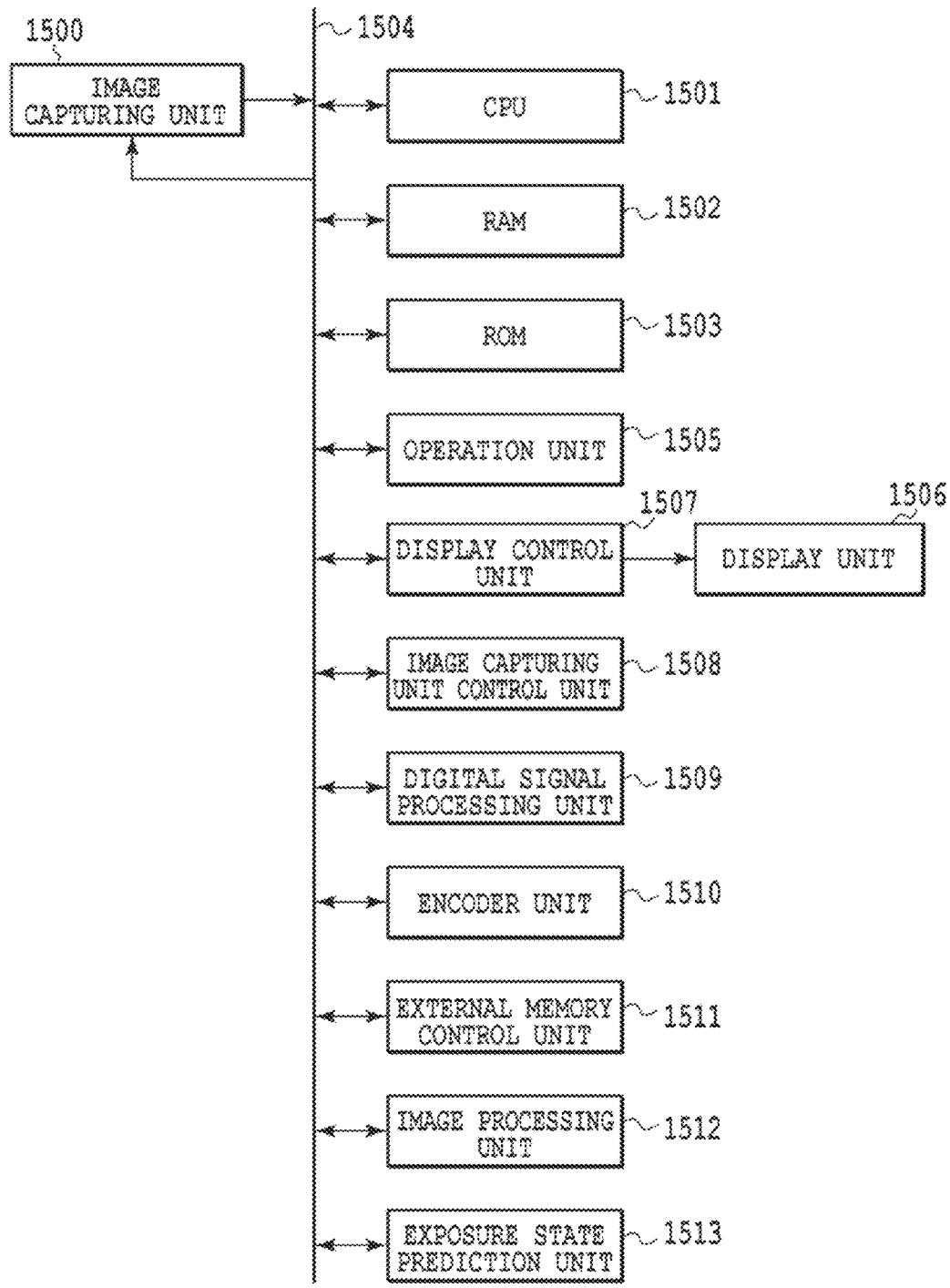
FIG. 15 is a block diagram showing an internal configuration of a camera array image capturing apparatus according to a third embodiment.

FIG. 15 is a block diagram showing an internal configuration of a camera array image capturing apparatus (also referred to simply as a "camera array", as known as a camera array system, multiple lens camera, and the like) according to the present embodiment. An image capturing unit 1500 acquires image data (digital data) by receiving light information of a subject by an image sensing element and by A/D-converting the received signal. The image data is saved in a storage medium, such as an SD card, as captured image data upon receipt of instructions to perform image capturing from a user. The image data acquired by the image capturing unit 1500 according to the present embodiment is data of an image in which a subject space is captured from a plurality of viewpoints and which has parallax (hereinafter, referred to as "parallax image data"). The image data acquired by the image capturing unit 1500 is also utilized in the so-called live view function to sequentially display images in real time on a display unit 1506 provided at the rear side of the image capturing apparatus. In the following, an image saved in a storage medium in response to instructions to perform image capturing from a user is referred to as a record image and an image displayed in real time in the live view display is referred to as a live view image.

A central processing unit (CPU) 1501 comprehensively controls each unit described below. A RAM 1502 functions as a maim memory, a work area, etc. A ROM 1503 stores control programs etc. executed in the CPU 1501. A bus 1504 is a transfer path of various kinds of data and for example, digital data acquired by the image capturing unit 1500 is sent to a predetermined processing unit via the bus 1504. An operation unit 1505 configured to receive instructions of a user includes buttons, a mode dial, etc. In the display unit 1506 configured to display images and characters, for example, a liquid crystal display is used. The display unit 1506 may have the touch screen function and in such a case, it is also possible to handle user's instructions using the touch screen as inputs to the operation unit 1505. In the present embodiment, in the case where the range in which refocus can be performed is displayed and the focus position at the time of refocus is specified, such a position is specified by an input of a user via such a touch screen.

A display control unit 1507 performs display control of images and characters displayed on the display unit 1506. An image capturing unit control unit 1508 performs control of an image capturing system based on instructions from the CPU 1501, such as focusing, shutter opening/closing, and aperture stop adjustment, etc. A digital signal processing unit 1509 performs various kinds of processing, such as white balance processing, gamma processing, and noise reduction processing, on digital data received via the bus 1504. An encoder unit 1510 performs processing to convert digital data into a file format, such as JPEG and MPEG. An external memory control unit 1511 is an interface configured to connect to a PC and other media (for example, hard disk, memory card, CF card, SD card, USB memory). An image processing unit 1512 performs image processing, such as refocus processing, to be described later, on image data acquired by the image capturing unit 1500 or image data output from the digital signal processing unit 1509. Details of the image processing unit 1512 will be described later. An exposure state prediction unit 1513 predicts an exposure state of the image capturing unit 1500 at the time of image capturing. There exist components of the image capturing apparatus other than those described above, however, they are not the main purpose of the present embodiment, and therefore, explanation is omitted.

First, a configuration of the image capturing unit 1500 is explained in detail.

Figure 17:
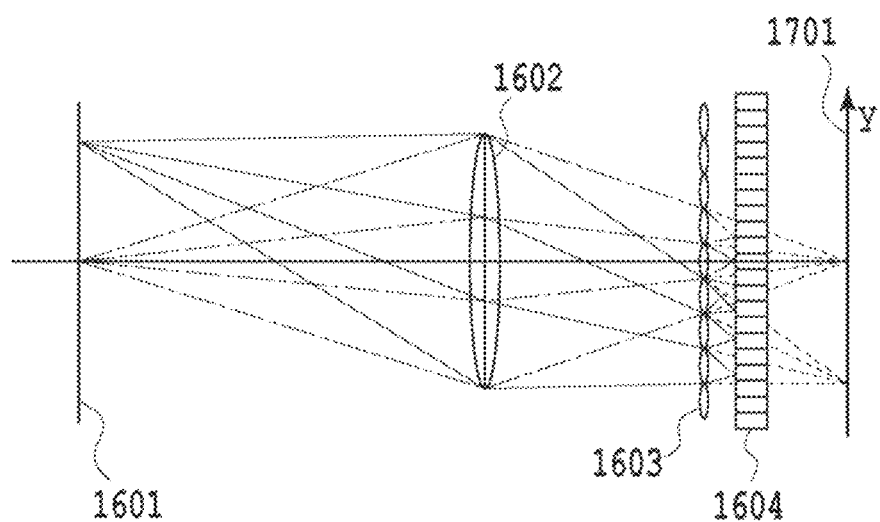
FIG. 17 is an example of a configuration in which the lens array is arranged on the image side of the image forming optical system.
Figure 18:
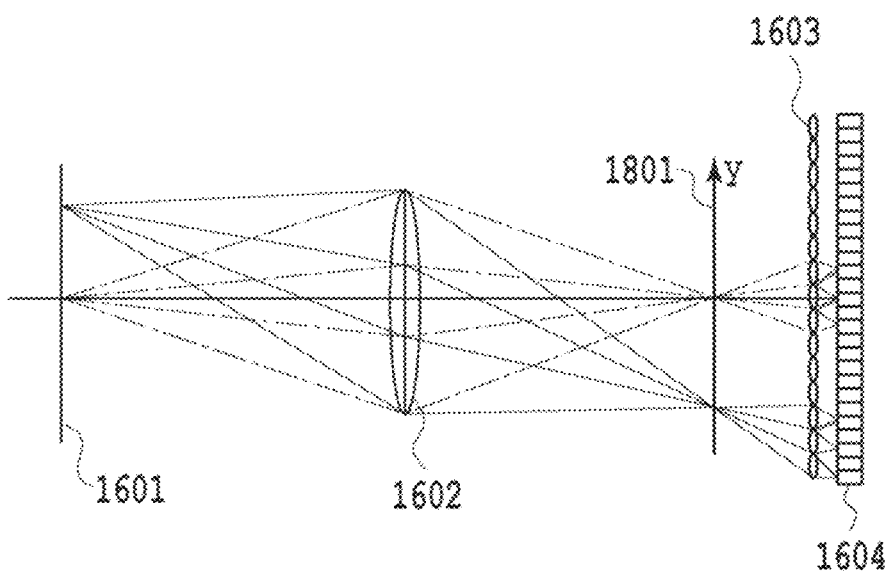
FIG. 18 is an example of a configuration in which the lens array is arranged on the image side of the image forming optical system.
Figure 19:
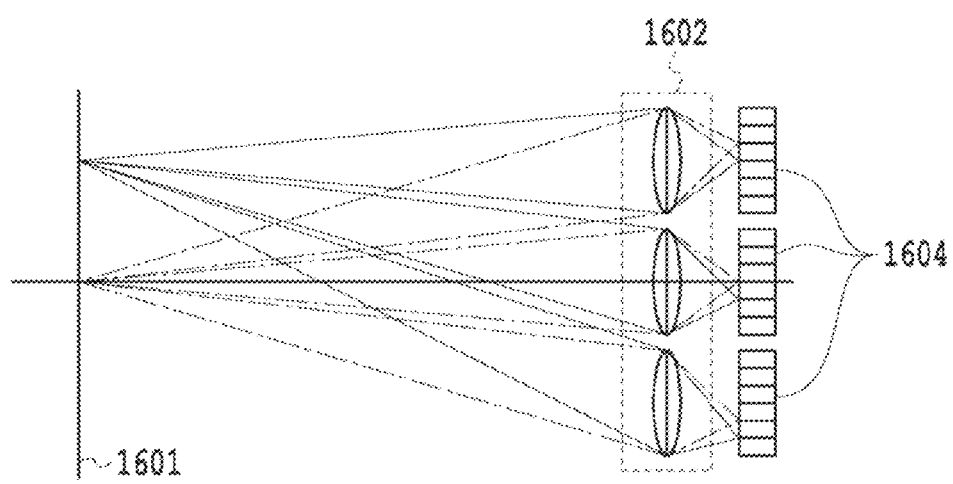
FIG. 19 is an example of a configuration in which a plurality of image forming optical systems is arrayed (camera array)

As described above, the image capturing unit 1500 acquires parallax image data, i.e. light field data. A configuration example of the image capturing unit 1500 is shown in FIG. 16 to FIG. 19. Among these, FIG. 16 to FIG. 18 each show a configuration in which a lens array is arranged on the image side of an image forming optical system and FIG. 19 shows a configuration in which a plurality of image forming optical systems is arranged (camera array). As the configuration of the image capturing unit, a camera array configuration capable of obtaining images from a plurality of viewpoints at the same time as shown in FIG. 16 to FIG. 19 is desirable. This is because by a method of performing image capturing a plurality of times while changing the position using a single camera image capturing apparatus, what is obtained is parallax image data of images of a subject space captured at different times and in the case where there exists a moving object in the subject space, it is not possible to obtain accurate parallax information.

By performing processing to extract, rearrange, combine, etc., pixels, it is possible to perform refocus, depth of field control, viewpoint changing, etc., of the parallax image data acquired by the image capturing unit 1500 having the configuration shown in FIG. 16 to FIG. 19. In the following, the processing as described above is referred to as image combination processing, and an image generated by the image combination processing is referred to as a combined image. It may also be possible to perform processing such as noise reduction, and processing such as depth of field control on a combined image. Further, a range in which refocus can be performed in a subject space is referred to as a "focus control range".

Figure 16:
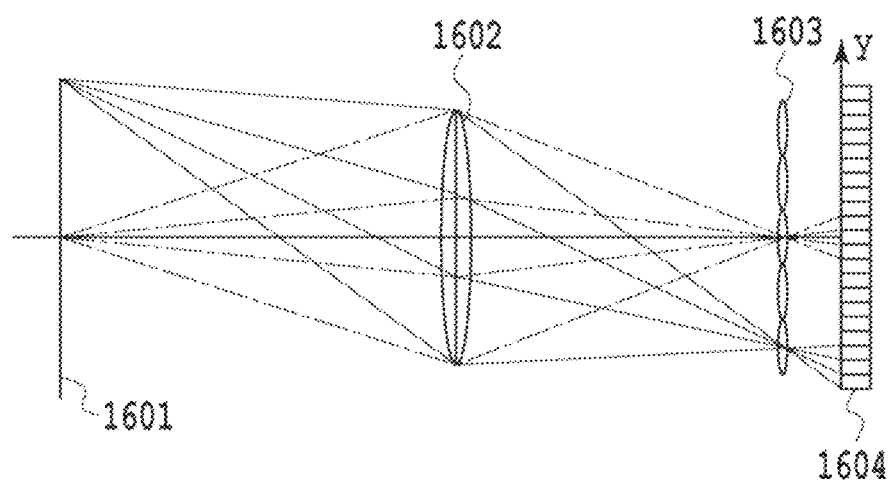
FIG. 16 is an example of a configuration in which a lens array is arranged on the image side of an image forming optical system.

Here, an internal configuration of the image capturing unit 1500 shown in FIG. 16 is explained in detail.

A lens array 1603 is arranged on an image side conjugate surface of an image forming optical system 1602 with respect to a subject surface 1601. Further, the lens array 1603 is configured so that an exit pupil of the image forming optical system 1602 and an image sensing element 1604 establish substantially a conjugate relationship. Light rays from the subject surface 1601 enter different pixels of the image sensing element 1604 in accordance with the position and angle of the light ray on the subject surface 1601 via the image forming optical system 1602 and the lens array 1603. Due to this, parallax image data (light field data) is acquired. Here, the lens array 1603 has a role to prevent light rays having passed through different positions on the subject surface 1601 from entering the same pixel. As a result of that, an image in which a group of pixels of the same area on the subject surface 1601 captured from a plurality of viewpoints is arranged side by side is acquired in the image sensing element 1604.

An object, such as a person and building, does not necessarily need to exist on the subject surface 1601 in FIG. 16 to FIG. 19. This is because it is possible to focus a person or building that exists behind or in front of the subject surface 1601 by refocus after image capturing.

<Principles of Refocus>

Hereinafter, refocus processing is explained. Refocus is explained in detail in "Fourier Slice Photography" by Ren Ng, 2005 ACM Trans. Graph. 24, p 735 to 744, and therefore, simple explanation is given here. The basic principles of refocus are common in each configuration in FIG. 16 to FIG. 19. Here, the configuration in FIG. 16 is explained as an example. In FIG. 16, the pupil of the image forming optical system is divided two-dimensionally into nine pupils (three in one dimension), and therefore, images from nine viewpoints are acquired as a result. Here, an image corresponding to a certain divided pupil is called a single-viewpoint image. The nine single-viewpoint images have parallax with respect to one another, and therefore, a relative positional relationship of the subjects on the image changes in accordance with the subject distance. In the case where single-viewpoint images are combined so that a certain subject overlaps itself, subjects located at different subject distances are combined in the shifted state. Because of this shift, subjects located at different subject distances are blurred. The blurring at this time is determined by the pupil corresponding to the single-viewpoint image used for combination and in the case where all the nine single-viewpoint images are combined, it is possible to reproduce the blurring of the image acquired by the image forming optical system 1602. The subject overlapped on itself in combination of the single-viewpoint images is arbitrary, and therefore, it is possible to reproduce an image in which an arbitrary subject is brought into focus in the image forming optical system 1602. This is the focus control after image capturing, that is, the principles of refocus.

Figure 20:
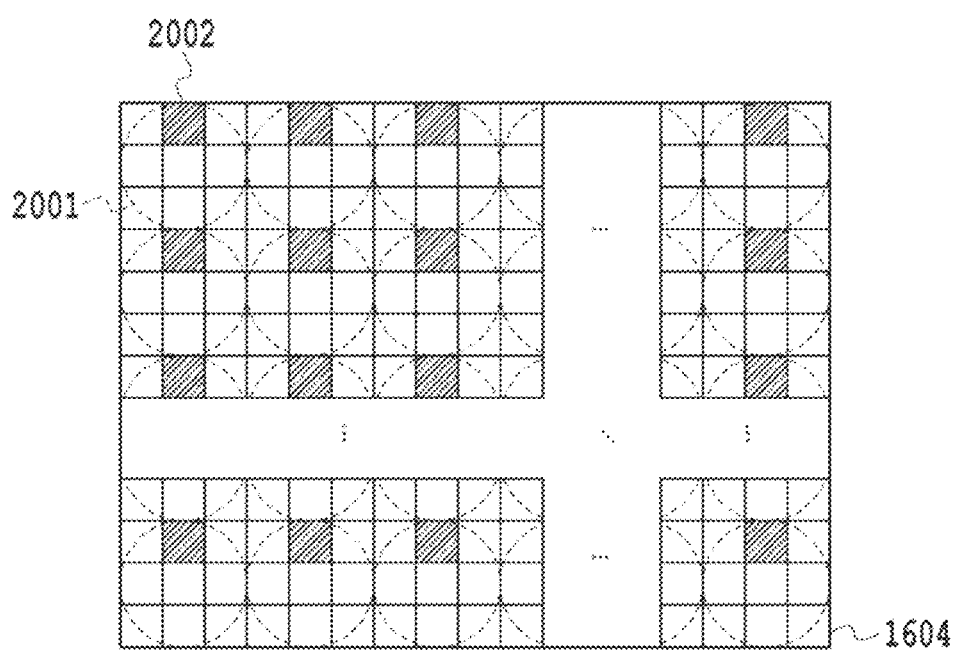
FIG. 20 is a diagram showing a relationship between a lens array and an image sensing element.

Here, a method for generating a single-viewpoint image in the present embodiment is explained. FIG. 20 is a diagram depicting a relationship between the lens array 1603 and the image sensing element 1604 in FIG. 16. A broken line circle 2001 represents an area of a pixel that a light ray having passed through one lens (microlens) configuring the lens array 1603 enters. FIG. 20 corresponds to the case where a plurality of microlenses is arranged in the form of a lattice, however, the arrangement of microlenses is not limited to this. For example, the arrangement may have hexagonal symmetry (honeycomb structure). It may also be possible to slightly shift each microlens from a regular arrangement. A slashed area 2002 in FIG. 20 represents a pixel that a light ray having passed through the same pupil area of the image forming optical system 1602 enters. Consequently, by extracting pixels in the slashed areas 1602, it is possible to generate a single-viewpoint image in the case where a subject space is viewed from under the pupil of the image forming optical system 1602. Similarly, by extracting pixels whose relative position with respect to the broken line circle 2001 is the same, another single-viewpoint image can also be generated.

<Focus Control Range>

Next, a focus control range in which refocus can be performed is explained.

Refocus is performed by superimposing single-viewpoint images, and therefore, it is not possible to refocus a subject blurred within each single-viewpoint image. This is because even by superimposing blurred images, a high frequency component is not obtained and the images remain blurred.

As the pupil is divided into smaller pupils, the depth of field in each single-viewpoint image becomes deeper, and therefore, the focus control range is extended. That is, the focus control range depends on the divided pupils of the image forming optical system 1602. However, the depth of field in the single-viewpoint image does not necessarily agree with the focus control range. This is because the focus control range changes depending on the resolution ratio between the single-viewpoint images and the combined image obtained by combining them. For example, in the case where the resolution of the combined image is lower than the resolution of the single-viewpoint image from each viewpoint, the sampling pitch of the spatial component in the combined image becomes large relative to that in the single-viewpoint image. Because of this, the depth of field of the combined image becomes deeper than that of the single-viewpoint image and accompanying that, the focus control range is extended. Conversely, in the case where the resolution of the combined image is higher than that of the single-viewpoint image, the focus control range becomes narrower than the depth of field of the single-viewpoint image.

As a method for making the resolution of the combined image higher than that of the single-viewpoint image, the use of the super-resolution by pixel shifting etc. can be thought of. As described previously, in refocus, combination is performed by shifting the single-viewpoint images relative to one another. In the case where the amount of shift at this time is not an integer multiple of the pixel pitch of the single-viewpoint image, it is possible to perform the super-resolution by pixel shifting, and the resolution of the combined image can be increased.

From the discussion hitherto, it is known that it is necessary to take into consideration the conditions at the time of combining the single-viewpoint images in order to acquire an accurate focus control range in the combined image.

Next, how the focus control range of a combined image is derived is explained. The focal depth corresponding to the depth of field of a combined image is considered. A permissible circle of confusion of the focal depth is taken to be $\epsilon$ and the sampling pitch of the angular component of a light ray is taken to be $\Delta u$. At this time, coefficients $\alpha_\pm$ of refocus are given by expression (4) below.

$$\alpha_\pm = \frac{1}{1 \pm \varepsilon/\Delta u} \qquad \text{expression (4)}$$

Figure 21:
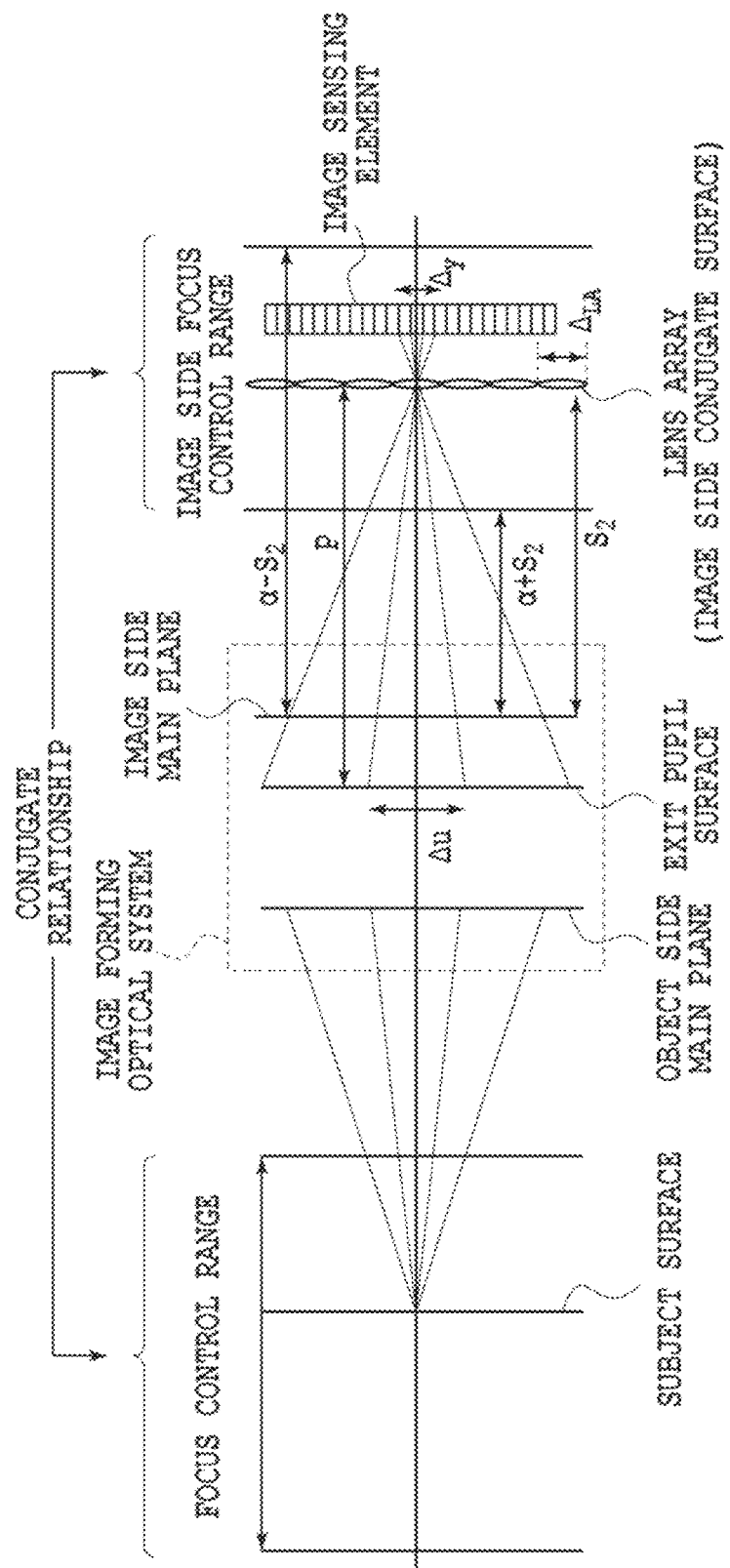
FIG. 21 schematically represents a relationship of an expression expressing coefficients $\alpha_\pm$ of refocus in the third embodiment.

A range (range conjugate with respect to the image forming optical system 1602) conjugate with a range $\alpha_+ s_2$ to $\alpha_- s_2$ in which refocus can be performed on the image side expressed using the expression (4) is the focus control range, which is a range in which refocus can be performed on the object side. FIG. 21 schematically shows the relationship of the expression (4) and the center position of the range in which refocus can be performed is the focus position of the image forming optical system 1602 (in this case, the position of the lens array 1603 is the center position of the range in which refocus can be performed). Here, $s_2$ is an interval between the image side main plane of the image forming optical system 1602 and the image side conjugate surface of the image forming optical system 1602 with respect to the subject surface 1601. In FIG. 21, the image side focus control range refers to a range conjugate with the focus control range via the image forming optical system 1602. Further, $\Delta y$ is the sampling pitch of the two-dimensional intensity distribution of light and in the configuration in FIG. 16, it is equal to a pitch $\Delta_{LA}$ of the lens array 1603. The relationship of the expression (4) holds also in each of the configurations in FIG. 16 to FIG. 19.

Then, because a pixel pitch $\Delta$ of the image sensing element 1604 is sufficiently small compared to an exit pupil distance P of the image forming optical system 1602, and therefore, the expression (4) can be approximated as expression (5) below.

$$\alpha_{\pm} s_2 = s_2 \mp NF\epsilon \qquad \text{expression (5)}$$

Here, the exit pupil distance P of the image forming optical system 1602 is an interval between an exit pupil surface of the image forming optical system 1602 and the image side conjugate surface of the image forming optical system 1602 with respect to the subject surface 1601. Further, N is the number of one-dimensionally divided pupils of the image forming optical system 1602 and F is the F-number of the image forming optical system 1602. It is possible to derive the F-number by expression (6) below from a focal length f and a lens effective diameter D of the image forming optical system 1602.

$$F = f/D \qquad \text{expression (6)}$$

That is, the range in which refocus can be performed (focus control range) is determined according to the number of one-dimensionally divided pupils of the image forming optical system and the range of the field angle defined by the focal length and the lens effective diameter of the image forming optical system. Further, according to the resolution of the combined image data, to be described later, the range in which refocus can be performed is determined.

<Image Processing Unit>

Next, a configuration of the image processing unit is explained in detail.

Figure 22:
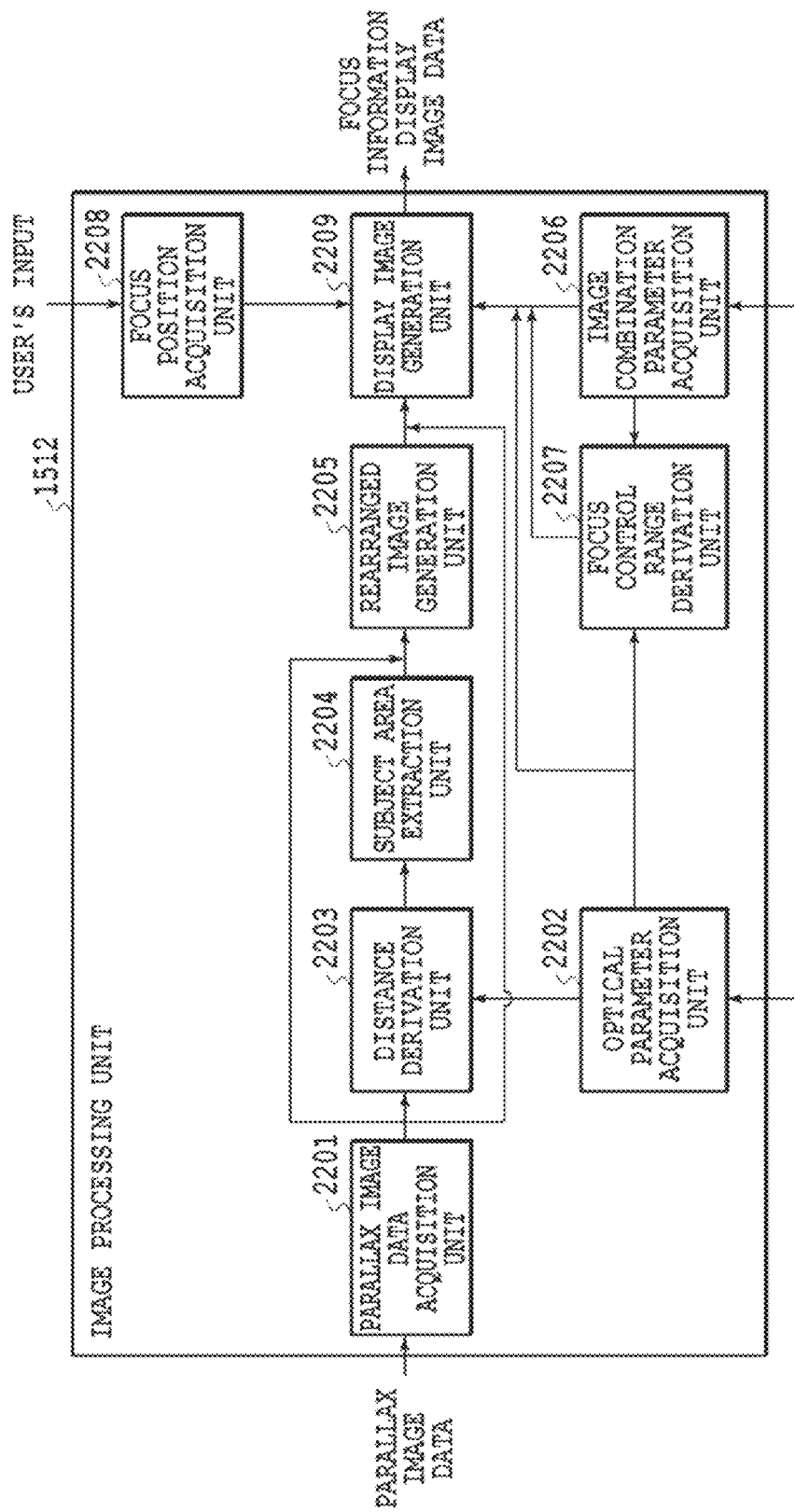
FIG. 22 is a block diagram showing an internal configuration of an image processing unit according to the third embodiment.

FIG. 22 is a block diagram showing an internal configuration of the image processing unit 1512 according to the present embodiment.

A parallax image data acquisition unit 2201 acquires parallax image data supplied from the image capturing unit 1500 etc.

An optical parameter acquisition unit 2202 acquires optical parameters of the image capturing unit 1500 necessary for a distance derivation unit 2203 and a focus control range derivation unit 2207. Here, optical parameters refer to a configuration of the image capturing unit 1500, the exposure state of an aperture etc., the focus position, the focal length in a zoom lens, etc.

The distance derivation unit 2203 drives information of the distance to the subject in the scene. The distance to the subject is derived using the parallax image data supplied from the parallax image data acquisition unit 2201 and the optical parameters supplied from the optical parameter acquisition unit 2202. Details of distance derivation will be described later.

A subject area extraction unit 2204 performs processing to extract a subject area to be subjected to processing in a rearranged image generation unit 2205 based on the subject in the scene and the distance information supplied from the distance derivation unit 2203. The subject area extraction processing can also be said as processing to separate subject areas for each fixed distance.

The rearranged image generation unit 2205 performs processing to change the position (coordinates) of each subject area extracted in the subject area extraction unit 2204 in accordance with the distance information supplied from the distance derivation unit 2203. By this processing, an image is generated, in which each subject area is rearranged in accordance with the distance from the image capturing apparatus (hereinafter, referred to as a "rearranged image") and by which it is made easy to grasp the feeling of distance for each subject area.

An image combination parameter acquisition unit 2206 acquires parameters (resolution after combination, viewpoint, focus position, depth of field, etc.) necessary for image combination.

The focus control range derivation unit 2207 derives a focus control range using optical parameters supplied from the optical parameter acquisition unit 2202 and image combination parameters supplied from the image combination parameter acquisition unit 2206.

A focus position acquisition unit 2208 acquires a focus position at the time of image combination based on a user's input via the operation unit 1505. In the case of the present embodiment, the distance specified by a user via the touch screen as the operation unit 1505 based on the rearranged image generated by the rearranged image generation unit 2205 is specified as the focus position. Information on the specified focus position is sent to a display image generation unit 2209.

The display image generation unit 2209 generates an image in which the information on the focus state (focus position, focus control range, depth of field, etc.) is reflected (hereinafter, referred to as a "focus information display image") for the rearranged image generated in the rearranged image generation unit 2205. At the time of generation, the optical parameters, the image combination parameters, the focus control range, and the focus position supplied from each unit described above are used. The generation of the focus information display image may be performed on a live view image before image capturing or on a record image after image capturing. Further, the focus information display image may be based on an arbitrary single-viewpoint image included in the parallax image or may be based on a combined image obtained by combining a plurality of single-viewpoint images. The data of the generated focus information display image is output to the display unit 1506. It is supposed that the display image generation unit 2209 according to the present embodiment also performs image combination processing in accordance with the image combination parameters using the parallax image data, however, it may also be possible to provide a processing unit configured to perform image combination processing separately from the display image generation unit 2209.

Figure 23:
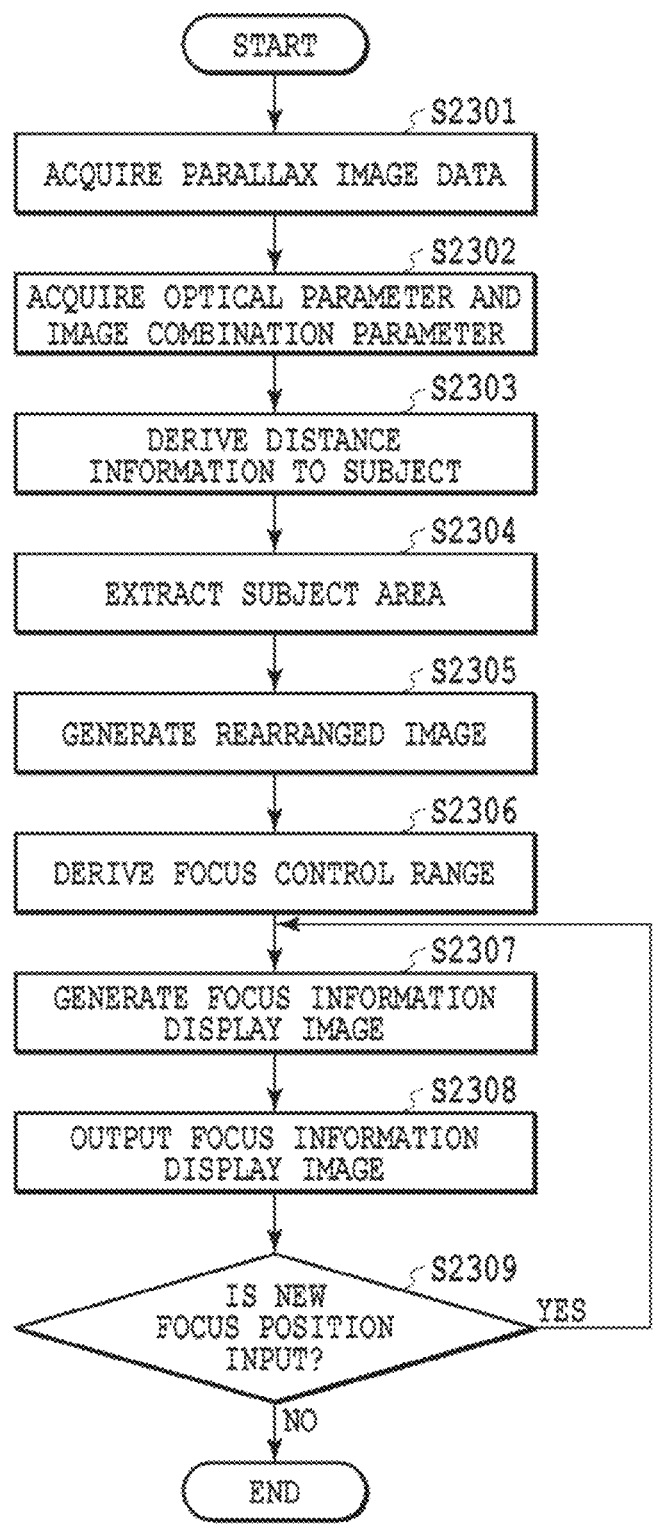
FIG. 23 is a flowchart showing a flow of processing in the image processing unit according to the third embodiment.

FIG. 23 is a flowchart showing a flow of processing in the image processing unit 1512 according to the present embodiment. The series of processing is performed by the CPU 1501 executing a computer executable program in which a procedure shown below is described after reading the program from the ROM 1503 onto the RAM 1502.

At step 2301, the parallax image data acquisition unit 2201 acquires parallax image data acquired by the image capturing unit 1500. The parallax image data acquired here may be parallax image data as a live view image or may be parallax image data as a record image as described above.

At step 2302, the optical parameter acquisition unit 2202 and the image combination parameter acquisition unit 2206 acquire the optical parameters and the image combination parameters, respectively.

At step 2303, the distance derivation unit 2203 derives distance information in the whole of the scene. Specifically, the distance derivation unit 2203 derives the distance of the scene by a method or the like of performing stereo matching between the single-viewpoint images included in the parallax image. For example, in the stereo matching method, first, a single-viewpoint image that serves as a reference (for example, a single-viewpoint image corresponding to the light ray passing through the vicinity of the center of the pupil) is divided into a plurality of blocks and among the other single-viewpoint images, a block position nearest to the target block is detected. Then, by using the positional relationship between the two blocks, the positional relationship between the corresponding pupils, and the field angle of each pupil, the distance of the target block is derived by the triangulation. As the single-viewpoint image that serves as a reference, it may also be possible to select a single-viewpoint image the viewpoint position of which is other than the center. Further, as a method for acquiring distance information, there are a method, such as DFD (Depth From Defocus), and a method of performing measurement using a range finding unit that utilizes infrared rays etc., besides the stereo matching method described above.

FIG. 24A is a diagram showing an example of a single-viewpoint image and FIG. 24B shows a distance map as distance information derived for the single-viewpoint image in FIG. 24A. In the scene obtained in the single-viewpoint image shown in FIG. 24A, three kinds of subjects (person, building, mountain) exist at different distances with the image capturing apparatus as a reference. The distance map shown in FIG. 24B is displayed by the shade in accordance with the distance from the image capturing apparatus, and the subject "person" in the vicinity of the image capturing apparatus is displayed by the color in the darkest shade, the subject "mountain" far from the image capturing apparatus by the color in the lightest shade, and the subject "building" located between the person and the mountain by the color in an intermediate shade. As described above, at this step, the distance information of the subjects in the scene is derived.

Explanation is returned to the flowchart in FIG. 23.

At step 2304, the subject area extraction unit 2204 performs processing to extract subject areas based on the distance map of the whole of the scene derived at step 2303. The subject area extraction processing can also be said as processing to separate subject areas for each fixed distance. Image areas having substantially the same distance are grouped and the grouped image area is extracted as a subject area. As the method for extracting subject areas, mention is made of, for example, methods as below besides the method that uses the distance information of subjects.

1) Areas in which a person, animal, plant, etc., exist are identified by applying a technique, such as face recognition, to the parallax image data and the identified person etc. is extracted as a subject area.

2) Data of images of representative objects of interest, such as a person, animal, and plant, is prepared in advance as a template and a subject area is extracted by pattern matching with the template.

3) Prior learning is performed as in a neural network and a subject area is extracted by recognizing main objects using the learning result.

Extraction of a subject area in the present embodiment can be implemented by applying a variety of publicly-known methods as mentioned in 1) to 3) described above besides the method that uses the distance information of subjects.

Figure 25A:
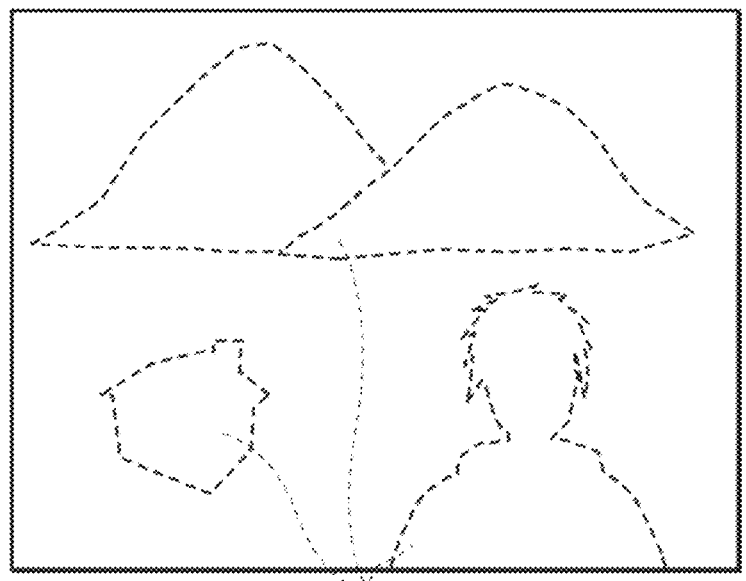
FIGS. 25A and 25B are each a diagram showing an example of the results of extracting subject areas from the distance map.
Figure 25B:
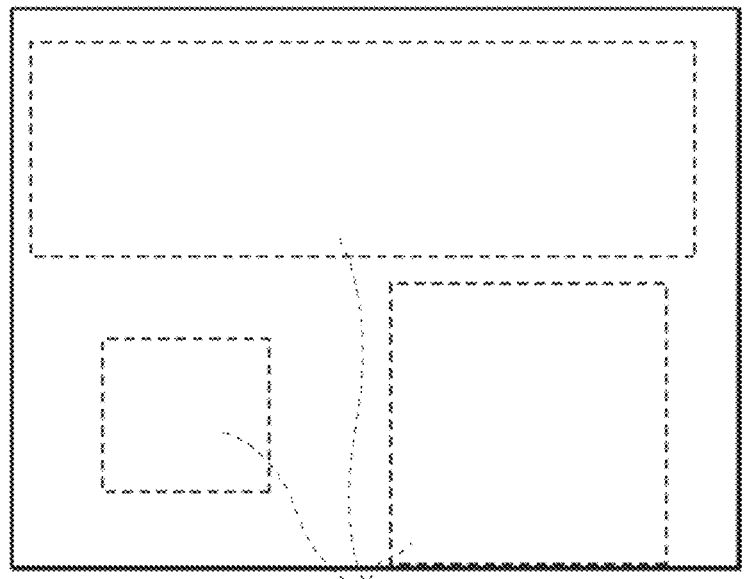

FIGS. 25A and 25B are each a diagram showing an example of the results of extracting subject areas from the distance map shown in FIG. 24B, and FIG. 25A shows the diagram in the case where the subject areas are extracted along the contour of each subject and FIG. 25B shows the diagram in the case where rectangular areas circumscribing each subject are extracted as subject areas. In FIGS. 25A and 25B, each area surrounded by the dotted line is the subject area corresponding to "person", "building", and "mountain", respectively. As the method for extracting subject areas, other methods can also be applied as long as areas are set so as to include main subjects. For example, it may also be possible to define a subject area by an arbitrary shape, such as a circle, ellipse, triangle, and polygon.

Explanation is returned to the flowchart in FIG. 23.

At step 2305, the rearranged image generation unit 2205 generates a rearranged image of the scene using the distance information in the whole of the scene derived at step 2303 and the subject areas in the scene extracted at step 2304.

FIGS. 26A to 26D are each a diagram showing an example of a rearranged image in the case where the scene of the single-viewpoint image shown in FIG. 24A is looked down upon from directly above. The "subject distance" in FIGS. 24A to 24D does not necessarily need to be the scaled distance to the actual subject and, for example, the subject distance may be represented in a reciprocal ratio or a logarithmic ratio, or it may also be possible to apply a correspondence table by preparing in advance the table in which actual distances and corresponding values are associated with each other. In the case where the distant view, such as "mountain", the actual distance of which may reach several kilometers or more, and "person" and "building" the actual distances of which are several meters to tens of meters are displayed by rearrangement with the actual distances being scaled, subjects in the close-range view are displayed densely in a small area compared to the subjects in the distant view. However, the "subject distance" serves as a guide for a user to grasp the focus state of a subject or to change the focus state of a subject, and therefore, the case where the subjects in the close-range view whose focus states are generally different are displayed densely is not appropriate because it becomes difficult for a user to grasp or change the focus state of a subject. Further, the difference between the focus states due to the distances of the subjects in the distant view is very slight compared to that of the subjects at short distances, and therefore, there will not arise any problem for a user to grasp the focus states of the subjects in the distant view even in the case where the subjects in the distant view are displayed densely. Consequently, in the case where the number of pixels of one side that can be displayed on the display unit of the image capturing apparatus is 640 and the subjects, such as "mountain", "building", and "person", are located, for example, at distances of 10 km, 8 m, and 2 m, respectively, from the image capturing apparatus, by producing a display in which the subjects are rearranged in positions 0 pixels, 80 pixels, and 320 pixels, respectively, moved from the end part of the display area, the shorter distances the subjects are located at, the more sparsely the subjects are displayed on the display unit, and therefore, this display is convenient for a user to grasp or change the focus state.

In each of FIGS. 26A to 26D, the position nearer to the image capturing apparatus is displayed at the lower part and the position farther from the image capturing apparatus is displayed at the upper part, and therefore, the "person" is arranged at the lower part because of being in the nearest position to the image capturing apparatus and the "mountain" is arranged at the upper part because of being in the farthest position from the image capturing apparatus. FIG. 26A is a rearranged image in which the image areas cut out from the above-described single-viewpoint image along the subject areas extracted at step 2304 (see FIG. 25A described above) are rearranged in the positions corresponding to each subject distance. In the case of this rearranged image, a portion of the single-viewpoint image is arranged in association with the subject distance, and therefore, this is the rearranged image the closest to the actual image among FIGS. 26A to 26D. FIG. 26B is a rearranged image in which the image areas extracted along the above-described subject areas from the distance map derived at step 2303 (see FIG. 24B) are rearranged in the positions corresponding to each subject distance. In the case of this rearranged image, each image area is displayed in a shade corresponding to the distance, and therefore, in this rearranged image, the subject distances are enhanced. FIGS. 26C and 26D are each a rearranged image in which the frames of subject areas extracted at step 2304 (see FIGS. 25A and 25B described above) are rearranged in the positions corresponding to each subject distance. In the case of these rearranged images, the rearranged image are more simplified.

Explanation is returned to the flowchart in FIG. 23.

At step 2306, the focus control range derivation unit 2207 derives a focus control range in the case where image combination of the parallax image acquired at step 2301 is performed by using the optical parameters and the image combination parameters acquired at step 2302. Detailed explanation is given below.

As described previously, the focus control range changes depending on the resolution ratio between each single-viewpoint image and the combined image, however, here, for simplification of explanation, a case where the resolution ratio is 1 is considered. In the case where the image side focus control range is within the range expressed by the above-described expression (5), it can be concluded that an area in which focus control can be performed is already acquired. Consequently, the image side conjugate surface of the image forming optical system 1602 with respect to the subject surface 1601 and an image side focus control range $d_{refocus}$ are required only to satisfy expression (7) below.

$$-NF\epsilon \leq d_{refocus} \leq NF\epsilon \qquad \text{expression (7)}$$

Figure 27:
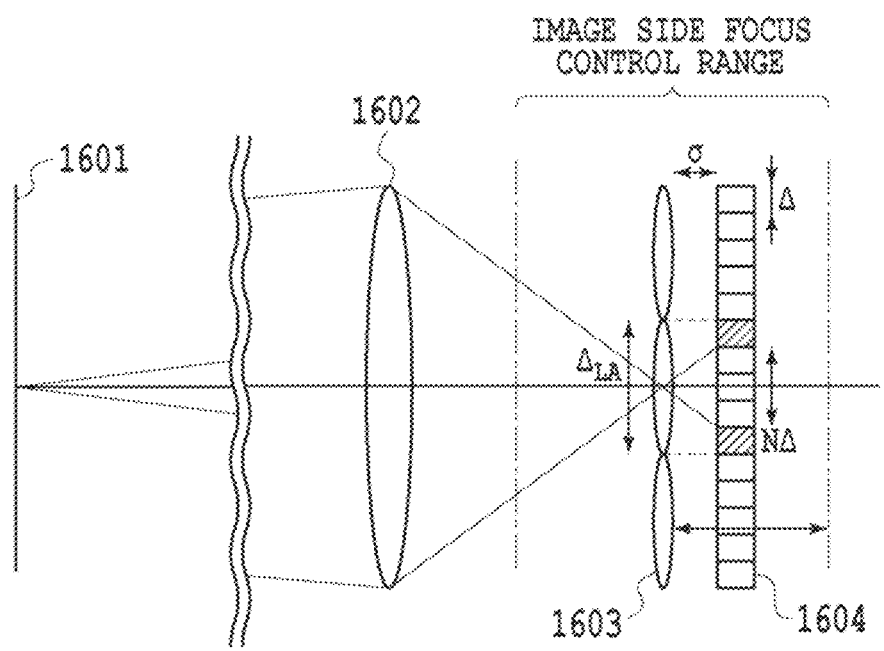
FIG. 27 is a diagram showing an optical arrangement in the configuration of an image capturing unit shown in FIG. 16.

FIG. 27 is a diagram showing an optical arrangement in the configuration of the image capturing unit 1500 shown in FIG. 16, and σ is an interval between the image side main plane of the lens array 1603 and the image sensing element 1604. In FIG. 27, two parallel broken lines extending from both ends of the microlens at the center represent an area of the image sensing element 1604 corresponding to the microlens and pixels with slashes within the image sensing element 1604 represent a dead zone that no light rays enter. In the present embodiment, the lens array 1603 is configured so as to prevent a dead zone from being produced and in this case, $\Delta_{LA}=\Delta N$ holds. However, the configuration is not limited to this and there may exist a dead zone. From FIG. 27, it is known that $NF=\sigma/\Delta$ holds in terms of geometry. By characterizing the size of the permissible circle of confusion that determines the focal depth by the sampling pitch $\Delta y=\Delta_{LA}$ of the spatial component, the expression (7) can be rewritten as expression (8) below.

$$-\frac{\varepsilon}{\Delta_{LA}} \leq \frac{d_{refocus}\Delta}{\Delta_{LA}\sigma} \leq \frac{\varepsilon}{\Delta_{LA}} \qquad \text{expression (8)}$$

$$\left(\frac{d_{refocus}}{NF\Delta_{LA}} = \frac{d_{refocus}\Delta}{\Delta_{LA}\sigma}\right)$$

Next, a general case is considered, where the resolution ratio between the single-viewpoint image and the combined image is other than 1. The field angle of the combined image and the single-viewpoint image used for combination is the same, and therefore, in the case where the resolution ratio is other than 1, Δy differs between both. In general, the smaller Δy, the smaller the permissible circle of confusion is, and the larger Δy, the larger the permissible circle of confusion is. Because of this, it is possible to extend the above-mentioned expression (8) as expression (9) below by taking the ratio of Δy between the single-viewpoint image and the combined image.

$$-\frac{\varepsilon}{\Delta_{LA}}\sqrt{\frac{R_{mono}}{R_{comb}}} \leq \frac{d_{refocus}\Delta}{\Delta_{LA}\sigma} \leq \frac{\varepsilon}{\Delta_{LA}}\sqrt{\frac{R_{mono}}{R_{comb}}} \qquad \text{expression (9)}$$

Here, $R_{mono}$ denotes the resolution of the single-viewpoint image used for combination and $R_{comb}$ denotes the resolution of the combined image. The ratio of Δy is obtained by calculating the square root of the ratio between $R_{mono}$ and $R_{comb}$. It is known that the resolution $R_{mono}$ of the single-viewpoint image is represented by expression (10) below from FIG. 27.

$$R_{mono} = \left(\frac{\Delta}{\Delta_{LA}}\right)^2 R_{total} \qquad \text{expression (10)}$$

Here, $R_{total}$ denotes the number of effective pixels of the image sensing element 1604. From the expression (9) and the expression (10), conditional expression (11) below that the image side focus control range needs to satisfy is obtained.

$$-10.0 \leq \frac{d_{refocus}}{\sigma}\sqrt{\frac{R_{comb}}{R_{total}}} \leq 10.0 \qquad \text{expression (11)}$$

In the above-mentioned conditional expression (11), the range is set between ±10.0, however, by setting the range between ±6.0, it is possible to obtain a clearer combined image. More desirably, by setting the range between ±3.0, it is possible to obtain a still clearer combined image.

In the following, a specific example of each value is shown.

Number $R_{total}$ of effective pixels of the image sensing element 1604: 46.7×10⁶ (pix)

Interval σ between the image side main plane of the lens array 1603 and the image sensing element 1604: 0.0374 (mm)

Pixel pitch Δ of the image sensing element 1604: 0.0043 (mm)

Pitch $\Delta_{LA}$ of the lens array 1603: 0.0129 (mm)

Focal length f of the image forming optical system 1602: 14.0 (mm)

F-number: 2.9

Number N of one-dimensionally divided pupils: 3

Resolution $R_{mono}$ per single-viewpoint image: $5.2 \times 10^6$ (pix)

The range of the conditional expression (11), the resolution $R_{comb}$ of the combined image corresponding to each range of the conditional expression (11), and $d_{refocus}$ corresponding to each resolution of the combined image are, for example, as shown in Table (1) below.

TABLE (1)

|  | ±2.5 | ±5.5 | ±9.5 |
| --- | --- | --- | --- |
| $R_{comb}$ | $8.0 \times 10^6$ pix | $5.2 \times 10^6$ pix | $2.0 \times 10^6$ pix |
| $d_{refocus}$ | 0.2260 (mm) | 0.6166 (mm) | 1.7174 (mm) |

By a user's input via the operation unit 1505, the resolution $R_{comb}$ of the combined image is selected, for example, from among the above-mentioned three kinds.

In the above-mentioned example, it is known that in order to generate a combined image of, for example, $8.0 \times 10^6$ pix, the resolution needs to be increased by the super-resolution by pixel shifting etc. because the resolution $R_{mono}$ per single-viewpoint image is $5.2 \times 10^6$ pix. The above-described value of each resolution $R_{comb}$ of the combined image is an example and the number of kinds is not limited to three. It is only necessary to appropriately determine $R_{comb}$ and $d_{refocus}$ that satisfy the above-mentioned conditional expression (11).

It is possible to calculate the focus control range from the image forming formula by using the image side focus control range and the focal length and the focus position of the image forming optical system 1602. The information of the focus control range acquired in this manner may be attached to the parallax image data or the combined image data as tag information and stored in the ROM 1503. Alternatively, it may also be possible to create a table of the focus control range corresponding to a variety of conditions and store it in the ROM 1503, and then to read data corresponding to an input condition instead of performing the above-described arithmetic operation to derive the focus control range.

As another method for acquiring a focus control range, a method can be thought of, which evaluates the contrast etc. of a subject existing in the focus position by actually generating a combined image for which refocus is performed. However, by this method, it is necessary to generate a combined image while moving the focus position and to sequentially determine whether refocus can be performed successfully, and therefore, it takes time to perform the processing. Further, in the case where no subject exists in the focus position where refocus is performed, evaluation cannot be carried out, and therefore, it is not possible to acquire an accurate focus control range. Consequently, it is desirable to use the previously-described method in order to acquire a focus control range.

Explanation is returned to the flowchart in FIG. 23.

At step 2307, the display image generation unit 2209 generates a focus information display image, which is the rearranged image generated at step 2305 and in which information on the focus state (focus position, focus control range, depth of field, etc.) is reflected. At the time of generation, the optical parameters and the image combination parameters acquired at step 2302 and the focus control range derived at step 2306 are used.

Figures 28A, 28B:
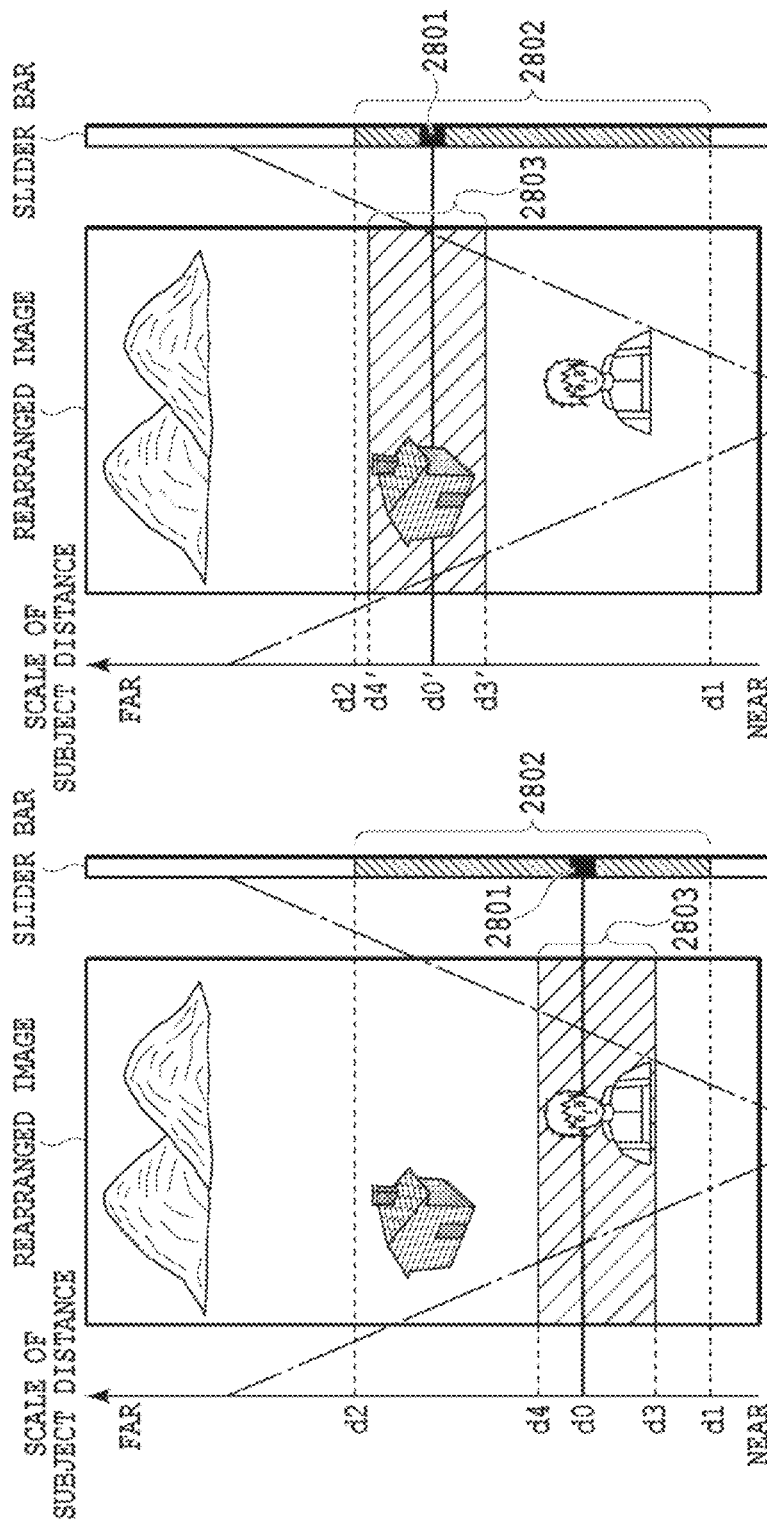
FIGS. 28A and 28B are each a diagram showing an example of a focus information display image.

FIGS. 28A and 28B are each an example of the focus information display image generated based on the rearranged image shown in FIG. 26A and each piece of information of a focus position 2801, a focus control range 2802, and a depth of field 2803 is displayed. The focus position 2801 indicated by a rectangular black mark on a slider bar indicates the focus position of the lens at the time of image capturing included in the optical parameters, or the focus position specified by a user's input, to be described later. In the focus information display image in FIG. 28A, the focus position 2801 is set in a position at a subject distance d0 (position of the person), and in the focus information display image in FIG. 28B, the focus position 2801 is set in a position at a subject distance d0' (position of the building), respectively. The focus control range 2802 indicated by slashes on the slider bar indicates a range from a subject distance d1 (d1') to a subject distance d2 (d2') and in the present embodiment, it is known that the "person" and the "building" are located at distances in this focus control range. In the following, it is assumed that in the case where the "focus control range" is simply referred to, it refers to this object side focus control range. The depth of field 2803 indicated by slashes on the rearranged image is a range from a subject distance d3 (d3') to a subject distance d4 (d4') and in the focus information display image in FIG. 28A, the depth of field in the focus position d0 where the person is in focus is shown, and in the focus information display image in FIG. 28B, the depth of field in the focus position d0' where the building is in focus is shown.

By displaying the focus information display image as described above, it is made possible for a user to intuitively grasp both pieces of information on the subject in the scene and on the focus state. In FIGS. 28A and 28B, for convenience of explanation, a schematic diagram of the image capturing apparatus and a viewing field range (field angle) 2804 where image capturing can be performed by the image capturing apparatus are also shown, however, it is not necessarily required to include these pieces of information in the focus information display image generated at this step.

Explanation is returned to the flowchart in FIG. 23.

At step 2308, the display image generation unit 2209 outputs the data of the focus information display image generated at step 2307 to the display unit 1506.

At step 2309, the CPU 1501 determines whether a user's input relating to the focus position at the time of refocus processing is newly done. The user's input in this case is done via the touch screen or the operation unit 1505 of the image capturing apparatus. For example, there can be thought of a method for directly specifying a subject desired to be newly brought into focus on the rearranged image, a method for directly specifying the subject distance to a new focus position, or a method for specifying by operating a mark indicative of the focus position 2801 on the slider bar. In the case where an input of a new focus position is done, the procedure returns to step 2307 and the series of processing at step 2307 to step 2309 is repeated. For example, in a case where a user's input to set the "building" as a new focus position is done in the state where the focus information display image (FIG. 28A) in which the "person" is set in the focus position is displayed, the focus information display image shown in FIG. 28B described previously is newly displayed as a result. As described previously, in FIG. 28B, the depth of field 2803 has also changed in accordance with the newly set focus position (the subject distance d0'). That is, in the case where a new focus position at the time of refocus processing is input, the focus control range 2802 does not change but the focus position 2801 and the depth of field 2803 in the focus position change mainly as a result.

There can be thought of a case where the newly input focus position is beyond the focus control range. In this case, it may also be possible to notify an alarm to prompt a user to input a focus position within the focus control range. Alternatively, it may also be possible to limit the range a user can input so as not to receive a focus position beyond the focus control range.

On the other hand, in the case where there is no input of a new focus position, the present processing is exited.

In the example described above, the focus information display image based on the rearranged image in which the scene is looked down upon from directly above is explained. However, the focus information display image is not limited to the example described above and there can be though of a variety of aspects. FIGS. 29A to 29C each show an example of the variation of the focus information display image. FIG. 29A is a focus information display image based on a rearranged image in which the scene is looked down upon from the lateral direction. FIG. 29B is a focus information display image based on a rearranged image in which the scene is looked down upon from the obliquely above direction. FIG. 29C is a focus information display image based on a rearranged image in which the scene is looked down upon from the obliquely lateral direction. As described above, the rearranged image that serves as a base of the focus information display image may be any image in which subjects are sequentially arranged in order in the depth direction based on distance information.

Figure 30A:
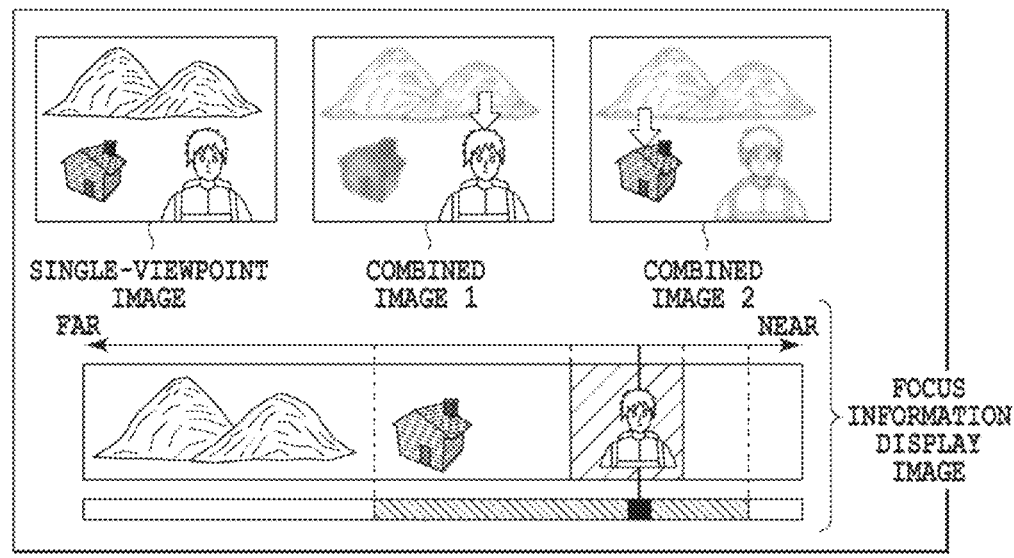
FIGS. 30A to 30C are each a diagram showing an example in the case where the focus information display image is displayed together with a single-viewpoint image and/or a combined image.
Figures 30B, 30C:
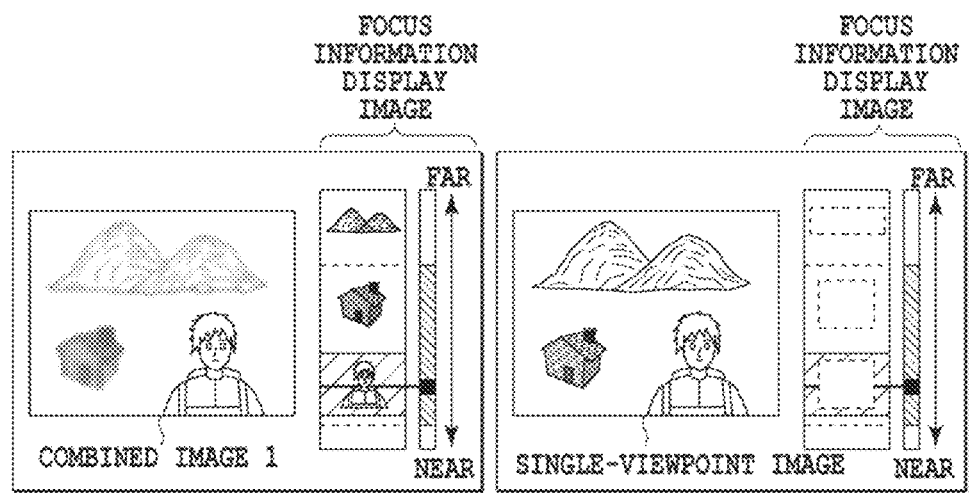

At step 2308, the focus information display image is displayed, and at this time, it may also be possible to simultaneously display the single-viewpoint image acquired by the image capturing unit 1500 and/or the combined image combined in the display image generation unit 2209. FIGS. 30A to 30C each show an example of the case where a single-viewpoint image and/or a combined image is displayed together in the focus information display image.

FIG. 30A shows a case where a single-viewpoint and two kinds of combined images are displayed in addition to the focus information display image (see FIG. 29A described previously) based on the rearranged image in which the scene is looked down upon from the lateral direction. A combined image 1 in FIG. 30A is a combined image in the state where the focus position is set by taking the "person" to be a subject of interest (the "building" and the "mountain" that are subjects other than the subject of interest are in the blurred state because of being outside the range of the depth of field). A combined image 2 in FIG. 30A is a combined image in the state where the focus position is set by taking the "building" to be a subject of interest (the "person" and the "mountain" that are subjects other than the subject of interest are in the blurred state because of being outside the range of the depth of field). In the case where the combined image after refocus such as this is displayed at the same time, by the combined image in which only the subject of interest is in focus, it is made possible for a user to more intuitively check the specified subject of interest. In FIG. 30A, the rearranged image in which the scene is looked down upon from the lateral direction is used as a base, however, it is needless to say that any type of rearranged image may be used as a base. Further, in the example in FIG. 30A, two kinds of combined images are displayed, however, only one kind of combined image, or three or more kinds of combined images may be displayed.

FIG. 30B shows a case where a combined image is displayed in the case where the focus position is set by taking the "person" to be the subject of interest, in addition to the focus information display image based on the rearranged image in which the scene is looked down upon from directly above. By producing the display in this manner, it is made possible to efficiently display the rearranged image, information on the focus state, and the combined image within the limited display screen. The focus information display image in FIG. 30B is based on the rearranged image shown in FIG. 26A in which the scene is looked down upon from directly above, from which information in the lateral direction is omitted, and in which only information in the depth direction is left. FIG. 30C shows a case where a combined image is displayed in addition to the focus information display image based on the rearranged image in which the scene is looked down upon from directly above. By simultaneously displaying the single-viewpoint image in this manner, it is possible to intuitively grasp the focus state while checking the image at the time of image capturing. The focus information display image in FIG. 30C is based on the rearranged image shown in FIG. 26D in which the scene is looked down upon from directly above, in which the subject areas are surrounded by rectangles, from which information in the lateral direction is omitted, and in which only information in the depth direction is left.

As above, it may also be possible to display the single-viewpoint image and the combined image together with the focus information display image.

In the focus information display images shown in FIG. 28 to FIG. 30, it is possible to know each piece of information of the focus position, the focus control range, and the depth of field at the same time as the information on the focus state. However, it is not necessary to show all the pieces of information at the same time and they may be displayed separately. For example, it may also be possible to display only the focus position and the depth of field at first and then to display information of the focus control range in response to the instructions of a user.

As explained above, according to the present embodiment, at the time of image capturing or at the time of editing an image, information on the focus state, such as the focus position, the focus control range, and the depth of field at the time of image combination, is displayed based on the rearranged image in which subjects are arranged in order in the depth direction. Due to this, it is made possible for a user to intuitively grasp the focus state of a subject at the time of image capturing and/or at the time of editing the image.

Fourth Embodiment

In the third embodiment, explanation is given by premising the image capturing apparatus having the image capturing unit with the configuration shown in FIG. 16. Next, an aspect that premises an image capturing apparatus having the image capturing unit with the configuration shown in FIG. 17 and FIG. 18 is explained as a fourth embodiment. In the following, the points peculiar to the present embodiment are explained mainly.

With the configuration shown in FIG. 17 and FIG. 18, data of a parallax image in which a plurality of small images from different image capturing viewpoints and with different image capturing ranges is arranged in order is acquired by the image sensing element 1604. In the configuration in FIG. 17, the lens array 1603 is arranged between the image forming optical system and the image side conjugate surface (left side of the image side conjugate surface). In contrast to this, in the configuration in FIG. 18 the lens array 1603 is arranged outside (right side of the image side conjugate surface), not between the image forming optical system and the image side conjugate surface. Because of this, in the case of the configuration in FIG. 18, the lens array 1603 regards the image formed by the image forming optical system 1602 as a real object and forms an image again on the image sensing element 1604. However, in both the configurations, the lens array 1603 regards the image formed by the image forming optical system 1602 as an object and forms an image of the object on the image sensing element 1604, and therefore, both the configurations are the same essentially. In the following, the configuration in FIG. 17 is explained as an example, however, the contents of the explanation also apply to the configuration in FIG. 18.

First, image combination (refocus) processing in the present embodiment is explained.

Qualitatively, the processing is similar to that in the third embodiment and in the processing, images of divided pupils of the image forming optical system 1602 are superimposed on one another with the amount of shift corresponding to the distance of the subject desired to be brought into focus.

Figure 31A:
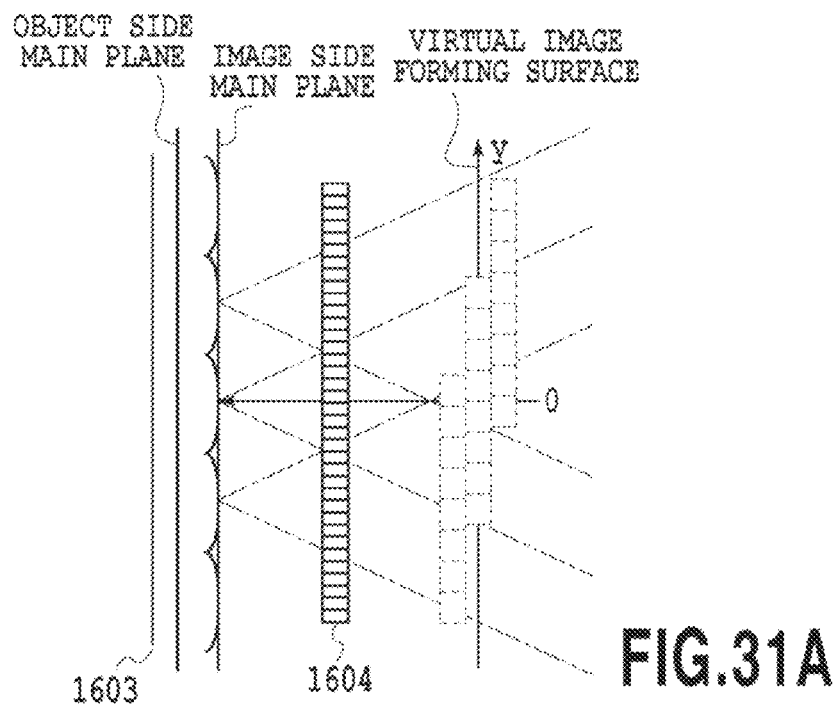
FIGS. 31A and 31B are each a diagram obtained by mainly enlarging the portion of the lens array and the image sensing element in the configuration of an image capturing unit shown in FIG. 17.
Figure 31B:
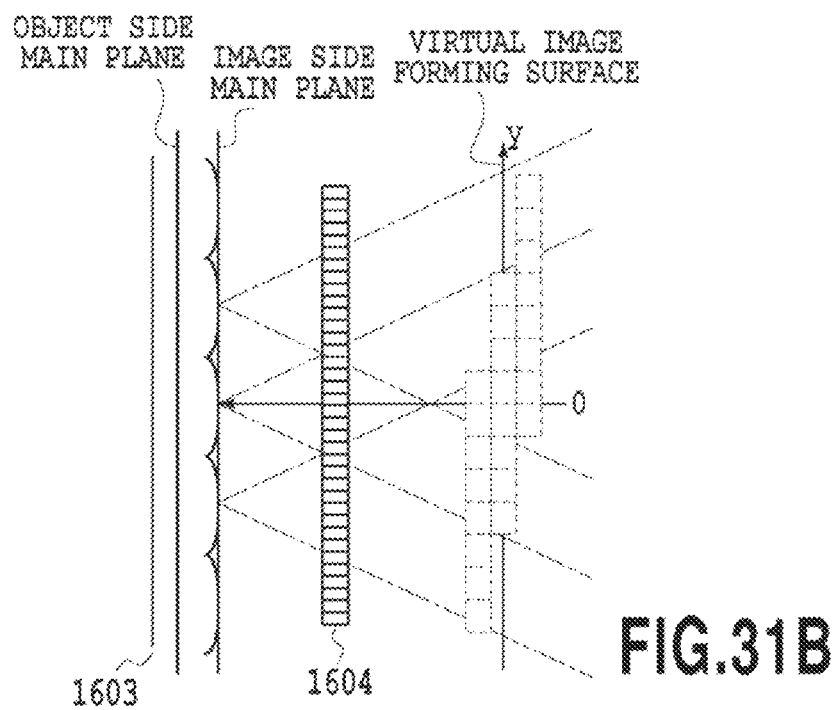

FIG. 31 is an enlarged view of the portion of the lens array 1603 and the image sensing element 1604 as a main portion in the configuration in FIG. 17. In the present embodiment, the lens array 1603 is configured by microlenses whose surface on the object side is flat and whose surface on the image side is convex. Of course, the shape of the lens array 1603 is not limited to this. In FIG. 31, the alternate long and short dash line represents the field angle of each microlens. By projecting pixel values obtained by the image sensing element 1604 onto a virtual image forming surface via the microlens corresponding to each pixel and combining them, it is possible to generate a combined image in which the virtual image forming surface is in focus. Here, the virtual image forming surface refers to a surface conjugate with the surface on the side of the object desired to be brought into focus by image combination (surface conjugate via the image forming optical system 1602). For example, in order to generate an image in which the subject surface 1601 is in focus in FIG. 17, a virtual image forming surface is set to an image side conjugate surface 1701. In FIG. 31, for easier understanding, the pixels projected at the time of combined image generation are represented by the broken line being shifted in units of field angle of each microlens. It may also be possible to generate a combined image by a method for combining images by translating each pixel as long as the pixels are superimposed on one another in the same way as that by the above-described method (combination method in which the pixel values obtained by the image sensing element 1604 are projected onto a virtual image forming surface via the microlens corresponding to each pixel). At this time, in the case where the area of the lens array 1603 through which the luminous flux incident on pixels has passed is the same, the amount of translation of the pixels is the same. That is, the operation of the pixel at the time of combined image generation in FIG. 17 and FIG. 18 is determined in accordance with the area of the lens array 1603 through which the luminous flux incident on pixels has passed.

Next, the focus control range in the present embodiment is explained.

Figure 32:
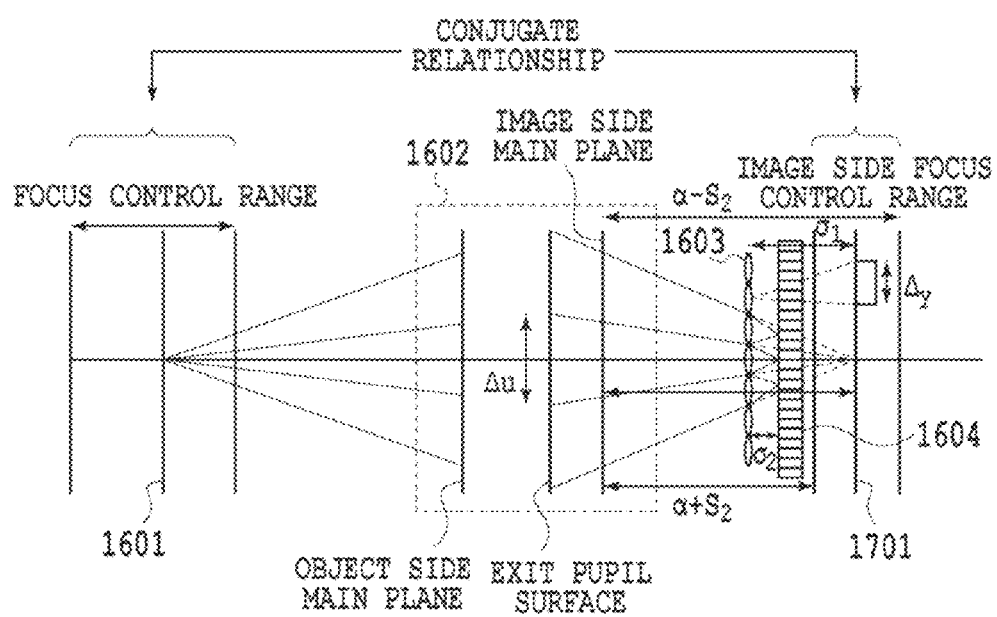
FIG. 32 schematically represents a relationship of an expression expressing the coefficients $\alpha_\pm$ of refocus in a fourth embodiment.

The focus control range in the present embodiment is also described by the same expression (4) as in the third embodiment. That is, the range (range conjugate with respect to the image forming optical system 1602) conjugate with the refocus range $\alpha+s_2$ to $\alpha-s_2$ on the image side expressed using the expression (4) described previously is the focus control range, which is the refocus range on the object side. FIG. 32 is a diagram corresponding to FIG. 21 according to the third embodiment. $\Delta y$ in FIG. 32 represents the sampling pitch of the two-dimensional intensity distribution of light and $\Delta y = \Delta\sigma_1/\sigma_2$ holds ($\sigma_1$: interval between the image side conjugate surface 1701 and the object side main plane of the lens array 1603, $\sigma_2$: interval between the image side main plane of the lens array 1603 and the image sensing element 1604). This is because the lens array 1603 regards the image formed by the image forming optical system 1602 as a virtual object, and therefore, forms a reduced image on the image sensing element 1604 with a magnification of $\sigma_2/\sigma_1$. Then, in the present embodiment also, the expression (4) can be approximated as the expression (5) because $\Delta \ll P$ (P: exit pupil distance of the image forming optical system 1602).

The flow of the processing in the image processing unit 1512 according to the present embodiment is the same as that in the flowchart in FIG. 23 according to the third embodiment, however, the configuration of the image capturing unit 1500 is different, and therefore, the focus control range is derived as follows (step 2306).

As is obvious from FIG. 32, $NF = \sigma_1/\Delta_{LA}$ and $\Delta y = \Delta\sigma_1/\sigma_2$ hold in terms of geometry, and therefore, expression (12) below holds.

$$R_{mono} = \left(\frac{\sigma_2}{\sigma_1}\right)^2 R_{total} \qquad \text{expression (12)}$$

From the expression (12) etc., conditional expression (13) that the image side focus control range $d_{refocus}$ in the present embodiment should satisfy is found.

$$-10.0 \leq \frac{\Delta_{LA} d_{refocus}}{\Delta\sigma_1} \sqrt{\frac{R_{synth}}{R_{total}}} \leq 10.0 \qquad \text{expression (13)}$$

As in the third embodiment, by replacing the range, which is ±10.0 in the above conditional expression (13), with ±6.0 or ±3.0, it is possible to obtain a clearer combined image.

In the following, specific examples are shown.

Number $R_{total}$ of effective pixels of the image sensing element 1604: $150.0 \times 10^6$ (pix)

$\sigma_1$: 0.3712 (mm)

$\sigma_2$: 0.0740 (mm)

Pixel pitch $\Delta$ of the image sensing element 1604: 0.0024 (mm)

Pitch $\Delta_{LA}$ of the lens array 1603: 0.0256 (mm)

Focal length $f_w$ at the wide-angle end of the image forming optical system 1602: 72.2 (mm)

Focal length $f_T$ at the telephoto end of the image forming optical system 1602: 194.0 (mm)

F-number (from the wide-angle end to the telephoto end): 2.9

Number N of one-dimensionally divided pupils: 5

Resolution $R_{mono}$ per single-viewpoint image: $6.0 \times 10^6$ pix

The range of the conditional expression (13), the resolution $R_{comb}$ of the combined image corresponding to each range expressed by the conditional expression (13), and $d_{refocus}$ corresponding to each resolution of the combined image are, for example, as shown in Table (2) below.

TABLE (2)

|  | ±2.6 | ±5.7 | ±9.8 |
|---|---|---|---|
| $R_{comb}$ | 10.0 × 10⁶ pix | 6.0 × 10⁶ pix | 3.0 × 10⁶ pix |
| $d_{refocus}$ | 0.6398 (mm) | 0.9918 (mm) | 1.3208 (mm) |

As in the third embodiment, by a user's input via the operation unit 1505, the resolution $R_{comb}$ of the combined image is selected, for example, from among the above-mentioned three kinds.

In the above-mentioned example, in order to generate a combined image of, for example, 10.0×10⁶ pix, the resolution $R_{mono}$ per single-viewpoint image is 6.0×10⁶ pix, and therefore, it is known that it is necessary to increase the resolution by the super-resolution by pixel shifting etc.

Fifth Embodiment

Next, an aspect that premises an image capturing apparatus having an image capturing unit with the configuration (camera array) shown in FIG. 19 is explained as a fifth embodiment. In the following, the points peculiar to the present embodiment are explained mainly.

Figure 33:
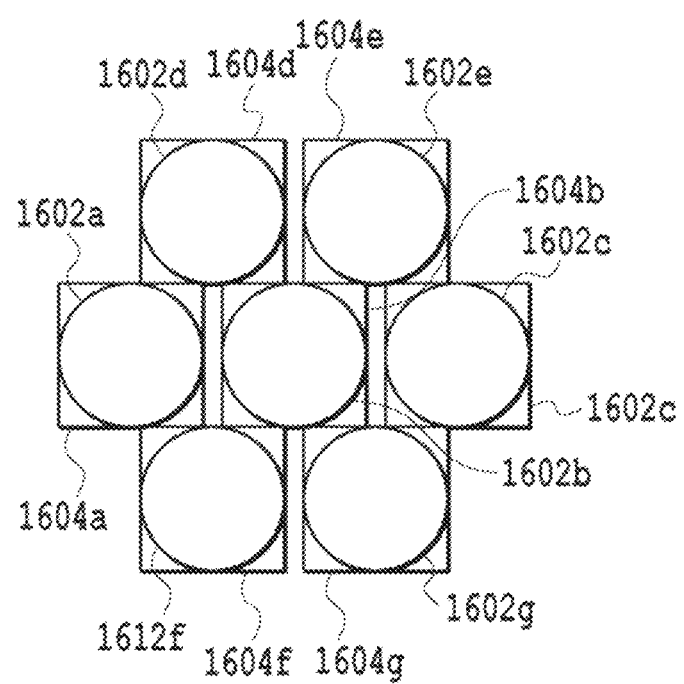
FIG. 33 is a diagram in the case where an image capturing unit having a configuration of a camera array is viewed from the front (object side)

FIG. 33 is a diagram of the image capturing unit 1500 having the configuration of the camera array in FIG. 19 according to the present embodiment in the case where the image capturing unit 1500 is viewed from the front (object side) and an arrangement of image forming optical systems 1602a to 1602g and image sensing elements 1604a to 1604g in each of seven image capturing modules is shown. In the case of the image capturing unit 1500, the camera array has hexagonal symmetry with an optical axis of the image forming optical system 1602b as an axis of rotation. However, the configuration of the camera array is not limited to this and the number and array of the image forming optical systems are arbitrary. Further, each of the image sensing elements 1604a to 1604g is arrayed in correspondence to each of the image forming optical systems 1602a to 1602g, however, in the case where it is possible to acquire the image formed by each of the image forming optical systems 1602a to 1602g, the number of image sensing elements may be one.

In the image capturing unit 1500 with the configuration shown in FIG. 33, the light ray refracted by each of the image forming optical systems 1602a to 1602g is received by each of the image sensing elements 1604a to 1604g corresponding thereto. A plurality of images acquired by the image sensing elements 1604a to 1604g are parallax images of a subject space observed from different viewpoints. By performing image combination using the plurality of parallax images, it is possible to obtain the light field of the subject space.

Figure 34:
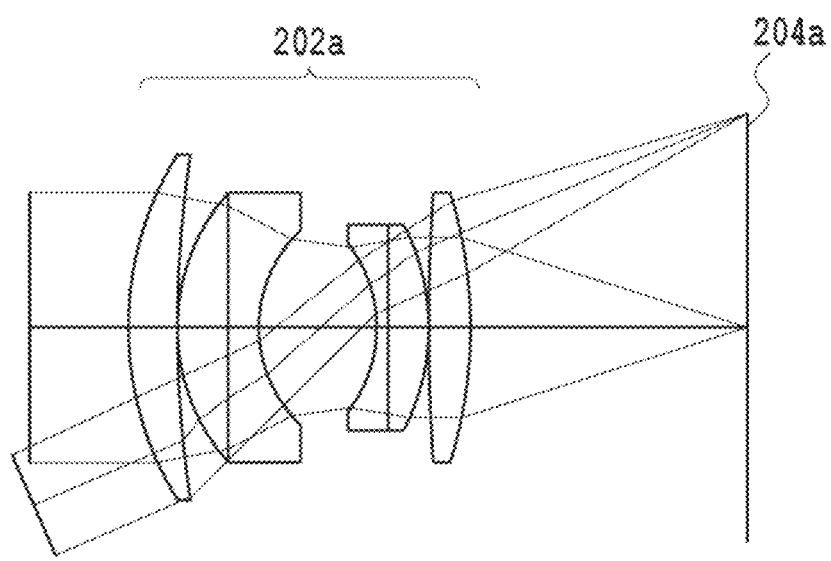
FIG. 34 is a diagram (section) in the case where an image forming optical system and an image sensing element according to a fifth embodiment are viewed from the side.

FIG. 34 is a diagram (sectional view) of the image forming optical system 1602a and the image sensing element 1604a viewed from the side. The other image forming optical systems 1602b to 1602g and image sensing elements 1604b to 1604g are the same, however, the configuration of each image forming optical system may differ from one another. The image forming optical system 1602a is a single focus lens and performs refocus by changing the interval between the image forming optical system 1602a and the image sensing element 1604a.

Figure 35:
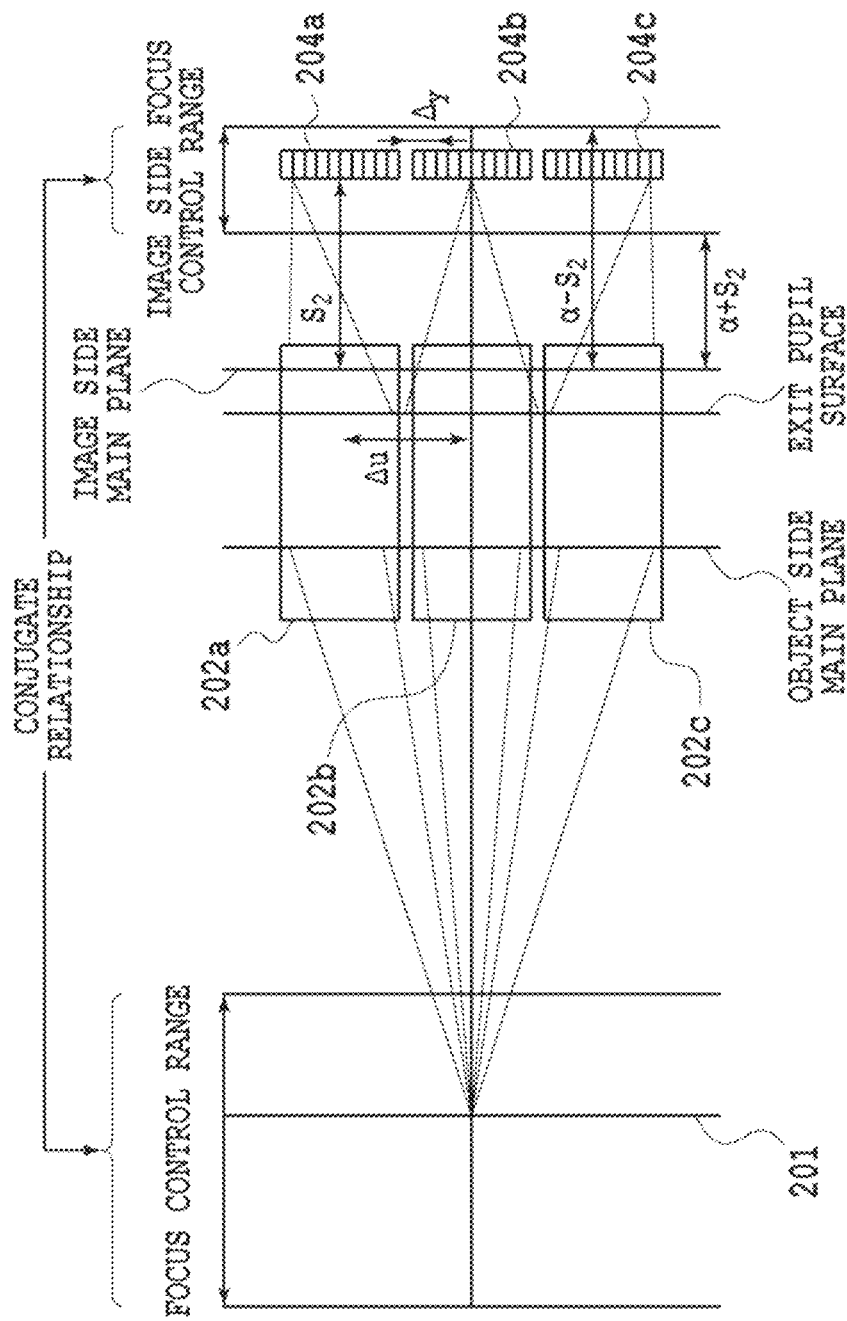
FIG. 35 schematically represents a relationship of an expression expressing the coefficients $\alpha_\pm$ of refocus in the fifth embodiment.

As in the third embodiment, in the image combination processing in the present embodiment also, the image from each viewpoint is superimposed on one another with the amount of shift corresponding to the distance of the subject desired to be brought into focus. The focus control range is also the same as that expressed by the expression (4) described previously. FIG. 35 is a diagram corresponding to FIG. 21 of the third embodiment, and in the case of the present embodiment, $\Delta y=\Delta$ and $\Delta u=P_{mono}/F_{mono}$ hold. Here, $F_{mono}$ represents the F-number in each of the image forming optical systems 1602a to 1602g and $P_{mono}$ represents the exit pupil distance corresponding to each image forming optical system. Then, in the present embodiment, $\Delta \ll P_{mono}$, and therefore, the expression (4) can be approximated as expression (14) below.

$$\alpha_{+}s_2 = s_2 \mp F_{mono}\Delta y = s_2 \mp F_{mono}\Delta \quad \text{expression (14)}$$

The flow of the processing in the image processing unit 1512 according to the present embodiment is the same as that in the flowchart in FIG. 23 according to the third embodiment, however, the configuration of the image capturing unit 1500 is different, and therefore, the focus control range is derived as follows (step 2302 and step 2306).

In the case of the present embodiment, each of the image forming optical systems 1602a to 1602g configuring the image capturing unit 1500 has an aperture the f-stop of which is variable. Because of this, at step 2302, the f-stop of each image forming optical system at the time of image capturing is acquired as an optical parameter.

At step 2306, based on the same concept as that of the third embodiment, the F-number of each of the image forming optical systems 1602a to 1602g at the time of image capturing obtained at step 2302 is substituted for $F_{mono}$ and the focus control range is derived. Here, by taking the resolution of the image formed by the image forming optical system having the F-number of $F_{mono}$ to be $R_{mono}$, conditional expression (15) that $d_{refocus}$ should satisfy is found.

$$-10.0 \leq \frac{d_{refocus}}{F_{mono}\Delta} \sqrt{\frac{R_{comp}}{R_{mono}}} \leq 10.0 \quad \text{expression (15)}$$

As in the third embodiment, by replacing the range, which is ±10.0 in the above-mentioned conditional expression (15), with ±6.0 or ±3.0, it is possible to obtain a clearer combined image.

In the following, specific examples are shown.

Number $R_{mono}$ of effective pixels of each of the image sensing elements 1604a to 1604g: 19.3×10⁶ (pix)

Pixel pitch $\Delta$: 0.0012 (mm)

Focal length f of each of the image forming optical systems 1602a to 1602g: 50.0 (mm)

F-number ($F_{mono}$): 1.8

The range of the conditional expression (15), the resolution $R_{comb}$ of the combined image corresponding to each range expressed by the conditional expression (15), and $d_{refocus}$ corresponding to each resolution of the combined image are, for example, as shown in Table (3) below.

TABLE (3)

|  | ±2.8 | ±5.7 | ±9.9 |
|---|---|---|---|
| $R_{comb}$ | 19.3 × 10⁶ pix | 10.0 × 10⁶ pix | 5.0 × 10⁶ pix |
| $d_{refocus}$ | 0.0060 (mm) | 0.0171 (mm) | 0.2904 (mm) |

Then, as in the third embodiment, by a user's input via the operation unit 1505, the resolution $R_{comb}$ of the combined image is selected, for example, from among the above-mentioned three kinds.

In the case where the F-number at the time of image capturing is a different one, $d_{refocus}$ is determined so as to satisfy the conditional expression (15).

Sixth Embodiment

The image combination processing explained in the third to fifth embodiments is implemented by using the parallax images acquired by the image capturing apparatus having the image capturing unit shown in FIG. 16 to FIG. 19 and obtained by performing image capturing from a plurality of different viewpoints. The image combination processing is not limited to the image combination processing using parallax images. It may also be possible to adjust the focus position and the depth of field of the data of a captured image from a single viewpoint later by image processing.

For example, as a method for changing the focus position by image processing, the method for performing filter processing on captured image data in accordance with the relative distance from the focus position is known. In this case, first, data of a captured image with a deep depth of field and distance information of the scene are acquired. The distance information is acquired by providing a distance sensor separately from the image capturing apparatus or by analyzing the captured image data of the image capturing apparatus. Next, for a subject (or subject distance) desired to be brought into focus, the original captured image data is used without performing filter processing, and for the areas other than the subject desired to be brought into focus, the relative distance from the subject is found from the distance information. Then, for the area whose relative distance from the subject desired to be brought into focus is short, filter processing to reduce the amount of blur is performed (for example, the setting to relatively reduce the filter size). On the other hand, for the area whose relative distance from the subject desired to be brought into focus is great, filter processing to increase the amount of blur is performed (for example, the setting to relatively increase the filter size). By the method such as this, the focus position may be changed.

As described above, by the method for performing filter processing on captured image data in accordance with the relative distance from the focus position for the single-viewpoint image, the focus control range is the depth of field at the time of acquisition of the single-viewpoint image.

It is also possible to adjust the degree of depth of field by image processing using a method similar to that described above. That is, in the filtering processing on the captured image data, by the setting to increase the filter size, the amount of blur increases and it is possible to generate data of an image with a narrow depth of field. On the contrary, in order to generate data of an image with a deep depth of field, the filter size is reduced.

Seventh Embodiment 7

In the third to sixth embodiments, an image in which the focus position etc. is changed is generated by performing image combination processing on an image from a plurality of viewpoints or an image from a single viewpoint. However, it is possible to obtain an image in which the focus position etc. is changed without the need to perform image combination processing.

For example, the method for acquiring a plurality of pieces of captured image data is known, which acquires a plurality of images by bracket image capturing while changing the image capturing parameter little by little. Specifically, data of captured images in which a focus adjustment ring and an aperture adjustment ring included in the image capturing apparatus are changed stepwise is acquired. It is assumed that in the captured image data by bracket image capturing, the parameters at the time of image capturing are held integrally with the captured images. That is, in the third to fifth embodiments, from one piece of captured image data including images from a plurality of viewpoints, a combined image in which the focus position etc. is changed is generated by an arithmetic operation, however, in the present embodiment, from a plurality of pieces of captured image data obtained by bracket image capturing, a desired captured image is selected and displayed.

In the bracket image capturing in which the focus position is changed stepwise (focus bracket image capturing), image capturing is performed a plurality of times by changing the focus position stepwise while using the operation unit configured to make focus adjustment included in the image capturing apparatus. In FIG. 26A described previously, the three kinds of subjects (person, building, mountain) exist at distances different from the image capturing apparatus and the "person" is located in the nearest position from the image capturing apparatus, the "building" in the intermediately distant position, and the "mountain" in the farthest position, respectively. In the present embodiment, captured image data in each focus position is acquired by continuously changing the focus position so that the subjects located from the nearest position to the farthest position are included. Due to this, it is possible to obtain captured images in which each subject of the "person", the "building", and the "mountain" is in focus. In the actual focus bracket image capturing, an image is also captured, in which the portion in which no main subject exists (for example, between the person and the building) is in focus. Then, in the obtained captured image data, the information of the focus position at the time of image capturing is recorded as distance information in association with the captured image. As in the sixth embodiment, it may also be possible to acquire the distance information of the scene by providing a distance sensor separately from the image capturing apparatus or by analyzing the captured image data of the image capturing apparatus.

As described above, by the bracket image capturing, data of captured images in which the focus position is changed stepwise is displayed without performing image combination processing. In this case, the focus control range is from the nearest focus position to the image capturing apparatus to the farthest focus position among the focus positions changed at the time of bracket image capturing. Further, it is possible to handle the depth of field substantially the same as the depth of field determined by the aperture adjustment ring of the image capturing apparatus at the time of bracket image capturing.

Furthermore, in the case where images in which the focus position is changed are displayed in addition to the focus information display image as in FIGS. 30A and 30B described previously, a desired captured image is selected and displayed in accordance with the focus position supplied from the focus position acquisition unit 2208.

It may also be possible to obtain data of images in which the focus position is changed using a plurality of pieces of captured image data obtained by the bracket image capturing as explained above.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
an acquisition unit configured to acquire an image including a plurality of subject areas and distance information corresponding to the plurality of subject areas;
a first generation unit configured to generate a rearranged image in which the plurality of subject areas is rearranged in the image based on the distance information; and
a second generation unit configured to generate an image comprising the rearranged image in which information on a focus state for image combination processing to change the focus state of the image including the plurality of subject areas is reflected in the rearranged image.

2. The image processing apparatus according to claim 1, wherein
the information on the focus state includes at least one of a focus position, a depth of field, and a focus control range.

3. The image processing apparatus according to claim 1, wherein
the first generation unit performs the rearrangement so that the plurality of subject areas is arranged in order in a depth direction in accordance with the distance information.

4. The image processing apparatus according to claim 1, wherein
the distance information is information indicative of the respective distance to the plurality of subject areas from the image capturing apparatus having captured the image including the plurality of subject areas, and
the image processing apparatus further comprises a distance derivation unit configured to derive the distance information.

5. The image processing apparatus according to claim 4, wherein
the acquisition unit acquires parallax image data, which is image data indicative of the image including the plurality of subject areas, which is obtained by capturing images from a plurality of viewpoints, and which is configured by a plurality of single-viewpoint images each corresponding to respective viewpoints, and
the distance derivation unit derives the distance information by performing stereo matching between the plurality of single-viewpoint images.

6. The image processing apparatus according to claim 1, wherein
the acquisition unit acquires parallax image data, which is image data indicative of the image including the plurality of subject areas, which is obtained by capturing images from a plurality of viewpoints, and which is configured by a plurality of single-viewpoint images each corresponding to the respective viewpoints, and
the second generation unit generates an image comprising the rearranged image in which information on the focus state for the image combination processing is reflected in the rearranged image based on one single-viewpoint image of the plurality of single-viewpoint images.

7. The image processing apparatus according to claim 1, wherein
the acquisition unit acquires parallax image data, which is image data indicative of the image including the plurality of subject areas, which is obtained by capturing images from a plurality of viewpoints, and which is configured by a plurality of single-viewpoint images each corresponding to the respective viewpoints, and
the second generation unit generates an image comprising the rearranged image in which information on the focus state for the image combination processing is reflected in the rearranged image based on the image generated by the image combination processing.

8. The image processing apparatus according to claim 1, wherein the image combination processing is processing to combine a plurality of parallax images obtained by capturing the plurality of subject areas from a plurality of different viewpoints.

9. The image processing apparatus according to claim 1, wherein the image combination processing is filtering processing on the image including the plurality of subject areas.

10. The image processing apparatus according to claim 1, further comprising an extraction unit configured to extract subject areas from the image including the plurality of subject areas based on the distance information, wherein the first generation unit generates the rearranged image by rearranging subject areas extracted by the extraction unit.

11. The image processing apparatus according to claim 10, wherein the extraction unit extracts an area along a contour of a subject or an area in an arbitrary shape including a subject as the subject area.

12. An image capturing apparatus having the image processing apparatus according to claim 1, the image capturing apparatus comprising:
a reception unit configured to receive a user's instructions;
a display unit configured to display an image in which information on the focus state is reflected; and
an adjustment unit configured to adjust the focus state of the image displayed in the display unit based on the user's instructions.

13. The image capturing apparatus having the image processing apparatus according to claim 12, wherein the display unit has a live view function and displays an image in which information on the focus state is reflected in a live view.

14. An image processing method comprising:
acquiring an image including a plurality of subject areas and distance information corresponding to the plurality of subject areas;
generating a rearranged image in which the plurality of subject areas is rearranged in the image based on the distance information; and
generating an image comprising the rearranged image in which information on a focus state for image combination processing to change the focus state of the image including the plurality of subject areas is reflected in the rearranged image.

15. A non-transitory computer readable storage medium storing a program for causing a computer to perform the image processing method according to claim 14.

* * * * *